US009516626B2

(12) United States Patent
Barany et al.

(10) Patent No.: US 9,516,626 B2
(45) Date of Patent: Dec. 6, 2016

(54) HIGH DATA RATE BROADCAST CHANNEL SYSTEMS, DEVICES, AND METHODS

(71) Applicant: QUALCOMM Incorporated, San Diego, CA (US)

(72) Inventors: Peter Anthony Barany, San Diego, CA (US); Roy Franklin Quick, Jr., San Diego, CA (US); Edwin C. Park, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 13/763,937

(22) Filed: Feb. 11, 2013

(65) Prior Publication Data

US 2014/0226569 A1    Aug. 14, 2014

(51) Int. Cl.
*H04W 4/00* (2009.01)
*H04W 72/04* (2009.01)
*H04W 28/22* (2009.01)

(52) U.S. Cl.
CPC ......... *H04W 72/0406* (2013.01); *H04W 28/22* (2013.01)

(58) Field of Classification Search
None
See application file for complete search history.

(56) References Cited

U.S. PATENT DOCUMENTS 5,389,973 A * 2/1995 Kitamura et al. ....... 375/240.03
7,116,682 B1 10/2006 Waclawsky et al.
7,161,907 B2 1/2007 Mott
7,499,439 B2 3/2009 Li et al.
8,125,946 B2 2/2012 Csapo
8,310,928 B2 11/2012 Samuels et al.
9,049,633 B2 * 6/2015 Das et al.
(Continued)

OTHER PUBLICATIONS

ISA/EPO, International Search Report and Written Opinion of the International Searching Authority, Int'l. App. No. PCT/US2014/015150, May 30, 2014, European Patent Office, Rijswijk, NL, 10 pgs.

(Continued)

*Primary Examiner* — Bob Phunkulh
(74) *Attorney, Agent, or Firm* — Holland & Hart LLP

(57) ABSTRACT

Methods, systems, and devices are provided that may enable wireless communications systems that utilize flexible bandwidths to transmit at the same or similar rates as wireless communications systems that utilize normal bandwidths. Some embodiments identify a target rate for a broadcast channel of a first bandwidth carrier system and transmit broadcast information utilizing the target rate. The target rate is higher than a scaled rate that results from scaling the rate for a broadcast channel of a second bandwidth carrier system by a bandwidth scaling factor. The first and second bandwidth carrier systems may be flexible and normal bandwidth carrier systems, respectively. To compensate for the bandwidth scaling and effectively maintain the rate at which information is transmitted in normal bandwidth carrier systems, different optimized schedules for system and master information transmission, different channelization codes and channels, and/or different scaled spreading factors may be identified and utilized.

88 Claims, 42 Drawing Sheets

(56) References Cited

U.S. PATENT DOCUMENTS

| | | | |
|---|---|---|---|
| 2002/0186657 A1 | 12/2002 | Jain et al. | |
| 2003/0123383 A1* | 7/2003 | Korobkov et al. | 370/208 |
| 2005/0111361 A1 | 5/2005 | Hosein | |
| 2005/0157806 A1* | 7/2005 | Walton et al. | 375/267 |
| 2006/0030345 A1 | 2/2006 | Jain et al. | |
| 2006/0146875 A1 | 7/2006 | Yang | |
| 2009/0088212 A1* | 4/2009 | Haga et al. | 455/561 |
| 2011/0058493 A1* | 3/2011 | Kapadia et al. | 370/252 |
| 2013/0114473 A1* | 5/2013 | Awoniyi et al. | 370/280 |
| 2013/0122906 A1* | 5/2013 | Klatt | 455/435.1 |

OTHER PUBLICATIONS

IPEA/EPO, Second Written Opinion of the International Preliminary Examining Authority, Int'l Appl. No. PCT/US2014/015150, Feb. 4, 2015, European Patent Office, Rijswijk, NL, 6 pgs.

* cited by examiner

| Trasport block size | 246 bits |
| --- | --- |
| CRC | 16 bits |
| Coding | CC, coding rate = 1/2 |
| TTI | 20 ms |
| Number of channelization codes | 1 |
| Spreading factor (SF) | 256 |
| Channelization code for Primary Channel | $C_{ch,256,1}$ |
| Channel symbol rate | 13.5 ksps |
| Channel bit rate | 27 kbps |
| User data rate | 12.3 kbps |

FIG. 5

| | |
|---|---|
| Trasport block size | 246 bits |
| CRC | 16 bits |
| Coding | CC, coding rate = 1/2 |
| TTI | 40 ms |
| Number of channelization codes | 1 |
| Spreading factor (SF) | 256 |
| Channelization code for Primary Channel | $C_{ch,256,1}$ |
| Channel symbol rate | 6.75 ksps |
| Channel bit rate | 13.5 kbps |
| User data rate | 6.15 kbps |

| | |
|---|---|
| Transport block size | 246 bits |
| CRC | 16 bits |
| Coding | CC, coding rate = 1/2 |
| TTI | 20 ms |
| Number of channelization codes | 1 |
| Spreading factor (SF) | 128 |
| Channelization code for Primary Channel | $C_{ch,128,1}$ |
| Channel symbol rate | 13.5 ksps |
| Channel bit rate | 27 kbps |
| User data rate | 12.3 kbps |

FIG. 11

| Trasport block size | 246 bits |
|---|---|
| CRC | 16 bits |
| Coding | CC, coding rate = 1/2 |
| TTI | 20 ms |
| Number of channelization codes | 2 |
| Spreading factor (SF) | 256 |
| Channelization code for Primary Channel 1 | $C_{ch,256,1}$ |
| Channelization code for Primary Channel 2 | $C_{ch,256,2}$ |
| Channel symbol rate | 13.5 ksps |
| Channel bit rate | 27 kbps |
| User data rate | 12.3 kbps |

| Trasport block size | 246 bits |
| --- | --- |
| CRC | 16 bits |
| Coding | CC, coding rate = 1/2 |
| TTI | 80 ms |
| Number of channelization codes | 1 |
| Spreading factor (SF) | 256 |
| Channelization code for Primary Channel | $C_{ch,256,1}$ |
| Channel symbol rate | 3.375 ksps |
| Channel bit rate | 6.75 kbps |
| User data rate | 3.075 kbps |

FIG. 16

| | |
|---|---|
| Trasport block size | 246 bits |
| CRC | 16 bits |
| Coding | CC, coding rate = 1/2 |
| TTI (2 transport blocks per TTI) | 40 ms |
| Number of channelization codes | 1 |
| Spreading factor (SF) | 64 |
| Channelization code for Primary Channel | $C_{ch,64,1}$ |
| Channel symbol rate | 13.5 ksps |
| Channel bit rate | 27 kbps |
| User data rate | 12.3 kbps |

FIG. 18

| | |
|---|---|
| Transport block size | 246 bits |
| CRC | 16 bits |
| Coding | CC, coding rate = 1/2 |
| TTI (2 transport blocks per TTI) | 40 ms |
| Number of channelization codes | 4 |
| Spreading factor (SF) | 256 |
| Channelization code for Primary Channel 1 | $C_{ch,256,1}$ |
| Channelization code for Primary Channel 2 | $C_{ch,256,2}$ |
| Channelization code for Primary Channel 3 | $C_{ch,256,3}$ |
| Channelization code for Primary Channel 4 | $C_{ch,256,4}$ |
| Channel symbol rate | 13.5 ksps |
| Channel bit rate | 27 kbps |
| User data rate | 12.3 kbps |

| | |
|---|---|
| Trasport block size | 246 bits |
| CRC | 16 bits |
| Coding | CC, coding rate = 1/2 |
| TTI (2 transport blocks per TTI) | 40 ms |
| Number of channelization codes | 2 |
| Spreading factor (SF) | 128 |
| Channelization code for Primary Channel 1 | $C_{ch,128,1}$ |
| Channelization code for Primary Channel 2 | $C_{ch,128,2}$ |
| Channel symbol rate | 13.5 ksps |
| Channel bit rate | 27 kbps |
| User data rate | 12.3 kbps |

FIG. 23A 500-h

| Trasport block size | 246 bits |
| --- | --- |
| CRC | 16 bits |
| Coding | CC, coding rate = 1/2 |
| TTI | 40 ms |
| Number of channelization codes | 1 |
| Spreading factor (SF) | 128 |
| Channelization code for Primary Channel | $C_{ch,128,1}$ |
| Channel symbol rate | 6.75 ksps |
| Channel bit rate | 13.5 ksps |
| User data rate | 6.15 ksps |

FIG. 24A

| | |
|---|---|
| Transport block size | 246 bits |
| CRC | 16 bits |
| Coding | CC, coding rate = 1/2 |
| TTI | 40 ms |
| Number of channelization codes | 2 |
| Spreading factor (SF) | 256 |
| Channelization code for Primary Channel 1 | $C_{ch,256,1}$ |
| Channelization code for Primary Channel 2 | $C_{ch,256,2}$ |
| Channel symbol rate | 6.75 ksps |
| Channel bit rate | 13.5 kbps |
| User data rate | 6.15 kbps |

FIG. 24B 500-j

| | |
|---|---|
| Trasport block size | 370 bits |
| CRC | 16 bits |
| Coding | CC, coding rate = 1/2 |
| TTI | 40 ms |
| Number of channelization codes | 2 |
| Spreading factor (SF) | 128, 256 |
| Channelization code for Primary Channel 1 | $C_{ch,128,1}$ |
| Channelization code for Primary Channel 2 | $C_{ch,256,1}$ |
| Channel symbol rate | 10.125 ksps |
| Channel bit rate | 20.25 kbps |
| User data rate | 9.25 kbps |

FIG. 25A 500-k

| | |
|---|---|
| Transport block size | 370 bits |
| CRC | 16 bits |
| Coding | CC, coding rate = 1/2 |
| TTI | 40 ms |
| Number of channelization codes | 3 |
| Spreading factor (SF) | 256 |
| Channelization code for Primary Channel 1 | $C_{ch,256,1}$ |
| Channelization code for Primary Channel 2 | $C_{ch,256,2}$ |
| Channelization code for Primary Channel 2 | $C_{ch,256,3}$ |
| Channel symbol rate | 10.125 ksps |
| Channel bit rate | 20.25 kbps |
| User data rate | 9.25 kbps |

FIG. 26A

HIGH DATA RATE BROADCAST CHANNEL SYSTEMS, DEVICES, AND METHODS

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiples of channel bandwidths, hence there may be unutilized parts of the spectrum. As the use of wireless devices has increased, the demand for and value of this spectrum has generally increased, as well. Nonetheless, in some cases, wireless communications systems may not utilize portions of the allocated spectrum because the portions are not big enough to fit a standard or normal waveform. The developers of the LTE standard, for example, recognized the problem and decided to support many different system bandwidths (e.g., 1.4, 3, 5, 10, 15 and 20 megahertz (MHz)). This may provide a partial solution to the problem. Flexible bandwidth carrier systems may provide another solution to these problems. However, different issues may arise when making transmission of broadcast information with respect to flexible bandwidth carrier systems.

SUMMARY

Methods, systems, and devices are provided that may enable wireless communications systems that utilize flexible bandwidths in conjunction with time dilation to transmit data at the same or similar rates as wireless communications systems that utilize normal bandwidths. Some embodiments identify a target rate for a broadcast channel of a first bandwidth carrier system employing time dilation and transmit broadcast information utilizing the target rate. The target rate is higher than a scaled rate that results from scaling the rate for a broadcast channel of a second bandwidth carrier system by a bandwidth scaling factor. The target rate may be a target data rate or a target repetition rate. The first and second bandwidth carrier systems may be flexible (e.g., with time dilation) and normal bandwidth carrier systems, respectively. In some embodiments, the second bandwidth carrier system also employs time dilation.

To compensate for the data rate scaling and effectively maintain the data rate at which information is transmitted in normal bandwidth carrier systems, flexible bandwidth carrier systems may identify and utilize, based on the bandwidth scaling factor, different optimized schedules for system and master information transmission, different channelization codes and channels, and/or different scaled spreading factors. The optimized scheduling may include identifying in which frame or frames in a frame cycle is the system information transmitted. Without compensation, the performance of certain procedures by a user equipment (UE) may be affected by the data rate scaling. For example, procedures that depend on the UE being able to read master information blocks (MIBs) and system information blocks (SIBs) in a timely manner may be affected. Such procedures may include, but are not limited to, public land mobile network (PLMN) selection, cell selection/reselection, and handover from one cell to another. In some embodiments, compensating for the data rate scaling may take into account the amount of transmit power that is utilized by the base station to transmit information in the broadcast channel at a compensated or higher data rate.

Flexible bandwidth carrier systems may involve wireless communications systems that may utilize portions of spectrum that may not be big enough to fit a normal waveform utilizing flexible waveforms. A flexible bandwidth carrier system may be generated with respect to a normal carrier bandwidth system through dilating the time (e.g., frame duration), in conjunction with scaling down the chip rate of the flexible bandwidth carrier system with respect to the normal carrier bandwidth system. Some embodiments increase the bandwidth of a flexible waveform through expanding, or scaling up the chip rate in conjunction with reducing the time (e.g., frame duration) of the flexible carrier bandwidth system.

In some embodiments, a method for data communication includes identifying a target rate for a broadcast channel of a first bandwidth carrier system, where the target rate is higher than a scaled rate for the broadcast channel, and where the scaled rate being a rate for a broadcast channel of a second bandwidth carrier system scaled by a bandwidth scaling factor. The bandwidth scaling factor may be an integer value or a rational value. The target rate may be a target data rate or a target repetition rate. Broadcast information of the first bandwidth carrier system may be transmitted using the target rate. The broadcast information may include one or more of signal strength information for access, service provider information, and neighboring cells information. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, an additional broadcast channel of the first bandwidth carrier system is added and the broadcast information is transmitted through both broadcast channels of the first bandwidth carrier system using the target rate. In some embodiments, the target rate is an information data rate that is substantially the same as the rate for the broadcast channel of the second bandwidth carrier system.

In some embodiments, a location of each information block transmitted in a radio frame cycle for the broadcast channel of the first bandwidth carrier system is used to facilitate transmitting the broadcast information using the target rate. The location of each information block may be scheduled in the radio frame cycle. An information block may be an SIB or an MIB. The information blocks may be mapped to radio frames in a radio frame cycle for the broadcast channel of the first bandwidth carrier system to facilitate transmitting the broadcast information using the target rate, where a duration of the radio frames is based on the bandwidth scaling factor.

In some embodiments, a scaled spreading factor with respect to one or more Primary Common Control Physical Channels (PCCPCHs) for the broadcast channel of the first bandwidth carrier system is used to facilitate transmitting the broadcast information using the target rate, where the scaled spreading factor is scaled by the bandwidth scaling factor or by a fraction of the bandwidth scaling factor.

In some embodiments, a method for data communication includes receiving, at a user equipment, broadcast information transmitted through a broadcast channel of a first bandwidth carrier system, where a target rate at which the broadcast information is received is higher than a scaled rate for the broadcast channel, and where the scaled rate is a rate for a broadcast channel of a second bandwidth carrier system scaled by a bandwidth scaling factor. The bandwidth scaling factor may be an integer value or a rational value. The target rate may be a target data rate or a target repetition rate. The broadcast information may be processed to identify candidate cells for communication with the user equipment. The broadcast information may include one or more of signal strength information for access, service provider information, and neighboring cells information. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the broadcast information is received at the target rate through the broadcast channel of the first bandwidth carrier system and through an additional broadcast channel of the first bandwidth carrier system.

In some embodiments, a radio frame cycle is received for the broadcast channel of the first bandwidth carrier system, where information blocks are mapped to radio frames in the radio frame cycle based on the target rate, and where a duration of the radio frames is based on the bandwidth scaling factor. The information blocks may include at least one SIB and/or at least one MIB.

In some embodiments, the broadcast information is received at the target rate based on a scaled spreading factor with respect to one or more PCCPCHs for the broadcast channel of the first bandwidth carrier system, where the scaled spreading factor is scaled by the bandwidth scaling factor or by a fraction of the bandwidth scaling factor.

In some embodiments, a wireless communications system includes means for identifying a target rate for a broadcast channel of a first bandwidth carrier system, where the target rate is higher than a scaled rate for the broadcast channel, and where the scaled rate is a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the wireless communications system includes means for transmitting broadcast information of the first bandwidth carrier system using the target rate. The broadcast information may include one or more of signal strength information for access, service provider information, and neighboring cells information. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the wireless communications system includes means for adding an additional broadcast channel of the first bandwidth carrier system and means for transmitting the broadcast information through both broadcast channels of the first bandwidth carrier system using the target rate. In some embodiments, the target rate is an information data rate that is substantially the same as the rate for the broadcast channel of the second bandwidth carrier system.

In some embodiments, the wireless communications system includes means for using a location of each information block transmitted in a radio frame cycle for the broadcast channel of the first bandwidth carrier system to facilitate transmitting the broadcast information using the target rate. In some embodiments, the wireless communications system includes means for scheduling the location of each information block in the radio frame cycle. An information block may be an SIB or an MIB. In some embodiments, the wireless communications system includes means for mapping information blocks to radio frames in a radio frame cycle for the broadcast channel of the first bandwidth carrier system to facilitate transmitting the broadcast information using the target rate, where a duration of the radio frames is based on the bandwidth scaling factor.

In some embodiments, the wireless communications system includes means for using a scaled spreading factor with respect to one or more PCCPCHs for the broadcast channel of the first bandwidth carrier system to facilitate transmitting the broadcast information using the target rate, where the scaled spreading factor is scaled by the bandwidth scaling factor or by a fraction of the bandwidth scaling factor.

In some embodiments, a wireless communications system includes means for receiving, at a user equipment, broadcast information transmitted through a broadcast channel of a first bandwidth carrier system, where a target rate at which the broadcast information is received is higher than a scaled rate for the broadcast channel, and where the scaled rate is a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the wireless communications system includes means for processing the broadcast information to identify candidate cells for communication with the user equipment. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the wireless communications system includes means for receiving the broadcast information at the target rate through the broadcast channel of the first bandwidth carrier system and through an additional broadcast channel of the first bandwidth carrier system. In some embodiments, the wireless communications system includes means for receiving one or more of signal strength information for access, service provider information, and neighboring cells information.

In some embodiments, the wireless communications system includes means for receiving a radio frame cycle for the broadcast channel of the first bandwidth carrier system, where information blocks are mapped to radio frames in the radio frame cycle based on the target rate, and where a duration of the radio frames is based on the bandwidth scaling factor. The information blocks may include at least one SIB and/or at least one MIB.

In some embodiments, the wireless communications system includes means for receiving the broadcast information at the target rate based on a scaled spreading factor with respect to one or more PCCPCHs for the broadcast channel of the first bandwidth carrier system, wherein the scaled spreading factor is scaled by the bandwidth scaling factor or by a fraction of the bandwidth scaling factor.

In some embodiments, a wireless communications device includes at least one processor communicatively coupled with a memory, the memory having executable code that, when executed by the at least one processor, causes at least one processor to identify a target rate for a broadcast channel of a first bandwidth carrier system, where the target rate is higher than a scaled rate for the broadcast channel, and where the scaled rate is a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the executable code causes the at least one processor to transmit broadcast information of the first bandwidth carrier system using the target rate. The broadcast information may include one or more of signal strength information for access, service provider information, and neighboring cells information. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the executable code causes the at least one processor to add an additional broadcast channel of the first bandwidth carrier system, and transmit the broadcast information through both broadcast channels of the first bandwidth carrier system using the target rate. In some embodiments, the target rate is an information data rate that is substantially the same as the rate for the broadcast channel of the second bandwidth carrier system.

In some embodiments, the executable code causes the at least one processor to use a location of each information block transmitted in a radio frame cycle for the broadcast channel of the first bandwidth carrier system to facilitate transmitting the broadcast information using the target rate. In some embodiments, the executable code causes the at least one processor to schedule the location of each information block in the radio frame cycle. An information block may be an SIB or an MIB. In some embodiments, the executable code causes the at least one processor to map information blocks to radio frames in a radio frame cycle for the broadcast channel of the first bandwidth carrier system to facilitate transmitting the broadcast information using the target rate, where a duration of the radio frames is based on the bandwidth scaling factor.

In some embodiments, the executable code causes the at least one processor to use a scaled spreading factor with respect to one or more PCCPCHs for the broadcast channel of the first bandwidth carrier system to facilitate transmitting the broadcast information using the target rate, where the scaled spreading factor is scaled by the bandwidth scaling factor or by a fraction of the bandwidth scaling factor.

In some embodiments, a wireless communications device includes at least one processor communicatively coupled with a memory, the memory having executable code that, when executed by the at least one processor, causes the at least one processor to receive, at a user equipment, broadcast information transmitted through a broadcast channel of a first bandwidth carrier system, where a target rate at which the broadcast information is received is higher than a scaled rate for the broadcast channel, and where the scaled rate is a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the executable code causes the at least one processor to process the broadcast information to identify candidate cells for communication with the user equipment. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the executable code causes the at least one processor to receive the broadcast information at the target rate through the broadcast channel of the first bandwidth carrier system and through an additional broadcast channel of the first bandwidth carrier system. In some embodiments, the executable code causes the at least one processor to receive, through the broadcast information, one or more of signal strength information for access, service provider information, and neighboring cells information.

In some embodiments, the executable code causes the at least one processor to receive, through the broadcast information, a radio frame cycle for the broadcast channel of the first bandwidth carrier system, where information blocks are mapped to radio frames in the radio frame cycle based on the target rate, and where a duration of the radio frames is based on the bandwidth scaling factor. The information blocks may include at least one SIB and/or at least one MIB.

In some embodiments, the executable code causes the at least one processor to receive the broadcast information at the target rate based on a scaled spreading factor with respect to one or more PCCPCHs for the broadcast channel of the first bandwidth carrier system, where the scaled spreading factor is scaled by the bandwidth scaling factor or by a fraction of the bandwidth scaling factor.

In some embodiments, a computer program product for data communication includes a non-transitory computer-readable medium having code configured to identify a target rate for a broadcast channel of a first bandwidth carrier system, where the target rate is higher than a scaled rate for the broadcast channel, and where the scaled rate is a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the non-transitory computer-readable medium includes code configured to transmit broadcast information of the first bandwidth carrier system using the target rate. The broadcast information may include one or more of signal strength information for access, service provider information, and neighboring cells information. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the non-transitory computer-readable medium includes code configured to add an additional broadcast channel of the first bandwidth carrier system and code configured to transmit the broadcast information through both broadcast channels of the first bandwidth carrier system using the target rate. In some embodiments, the target rate is an information data rate that is substantially the same as the rate for the broadcast channel of the second bandwidth carrier system.

In some embodiments, the non-transitory computer-readable medium includes code configured to use a location of each information block transmitted in a radio frame cycle for the broadcast channel of the first bandwidth carrier system to facilitate transmitting the broadcast information using the target rate. In some embodiments, the non-transitory computer-readable medium includes code configured to schedule the location of each information block in the radio frame cycle. An information block may be an SIB or an MIB. In some embodiments, the non-transitory computer-readable medium includes code configured to map information blocks to radio frames in a radio frame cycle for the broadcast channel of the first bandwidth carrier system to facilitate transmitting the broadcast information using the target rate, where a duration of the radio frames is based on the bandwidth scaling factor.

In some embodiments, the non-transitory computer-readable medium includes code configured to use a scaled spreading factor with respect to one or more PCCPCHs for the broadcast channel of the first bandwidth carrier system to facilitate transmitting the broadcast information using the target rate, where the scaled spreading factor is scaled by the bandwidth scaling factor or by a fraction of the bandwidth scaling factor.

In some embodiments, a computer program product for data communication includes a non-transitory computer-readable medium having code configured to receive, at a user equipment, broadcast information transmitted through a broadcast channel of a first bandwidth carrier system, where a target rate at which the broadcast information is received is higher than a scaled rate for the broadcast channel, and where the scaled rate is a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the non-transitory computer-readable medium includes code configured to process the broadcast information to identify candidate cells for communication with the user equipment. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the non-transitory computer-readable medium includes code configured to receive the broadcast information at the target rate through the broadcast channel of the first bandwidth carrier system and through an additional broadcast channel of the first bandwidth carrier system. In some embodiments, the non-transitory computer-readable medium includes code configured to receive, through the broadcast information, one or more of signal strength information for access, service provider information, and neighboring cells information.

In some embodiments, the non-transitory computer-readable medium includes code configured to receive, through the broadcast information, a radio frame cycle for the broadcast channel of the first bandwidth carrier system, where information blocks are mapped to radio frames in the radio frame cycle based on the target rate, and where a duration of the radio frames is based on the bandwidth scaling factor. The information blocks may include at least one SIB and/or at least one MIB.

In some embodiments, the non-transitory computer-readable medium includes code configured to receive the broadcast information at the target rate based on a scaled spreading factor with respect to one or more PCCPCHs for the broadcast channel of the first bandwidth carrier system, where the scaled spreading factor is scaled by the bandwidth scaling factor or by a fraction of the bandwidth scaling factor.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 shows a table illustrating parameters for broadcast channel transmissions in accordance with various embodiments;

FIG. 9 shows a table illustrating parameters for broadcast channel transmissions in accordance with various embodiments;

FIG. 11 shows a table illustrating parameters for broadcast channel transmissions in accordance with various embodiments;

FIG. 14 shows a table illustrating parameters for broadcast channel transmissions in accordance with various embodiments;

FIG. 16 shows a table illustrating parameters for broadcast channel transmissions in accordance with various embodiments;

FIG. 18 shows a table illustrating parameters for broadcast channel transmissions in accordance with various embodiments;

FIG. 21 shows a table illustrating parameters for broadcast channel transmissions in accordance with various embodiments;

FIG. 23A shows a table illustrating parameters for broadcast channel transmissions in accordance with various embodiments;

FIG. 24A shows a table illustrating parameters for broadcast channel transmissions in accordance with various embodiments;

FIG. 24B shows a table illustrating parameters for broadcast channel transmissions in accordance with various embodiments;

FIG. 25A shows a table illustrating parameters for broadcast channel transmissions in accordance with various embodiments;

FIG. 26A shows a table illustrating parameters for broadcast channel transmissions in accordance with various embodiments;

DETAILED DESCRIPTION

Figure 1:
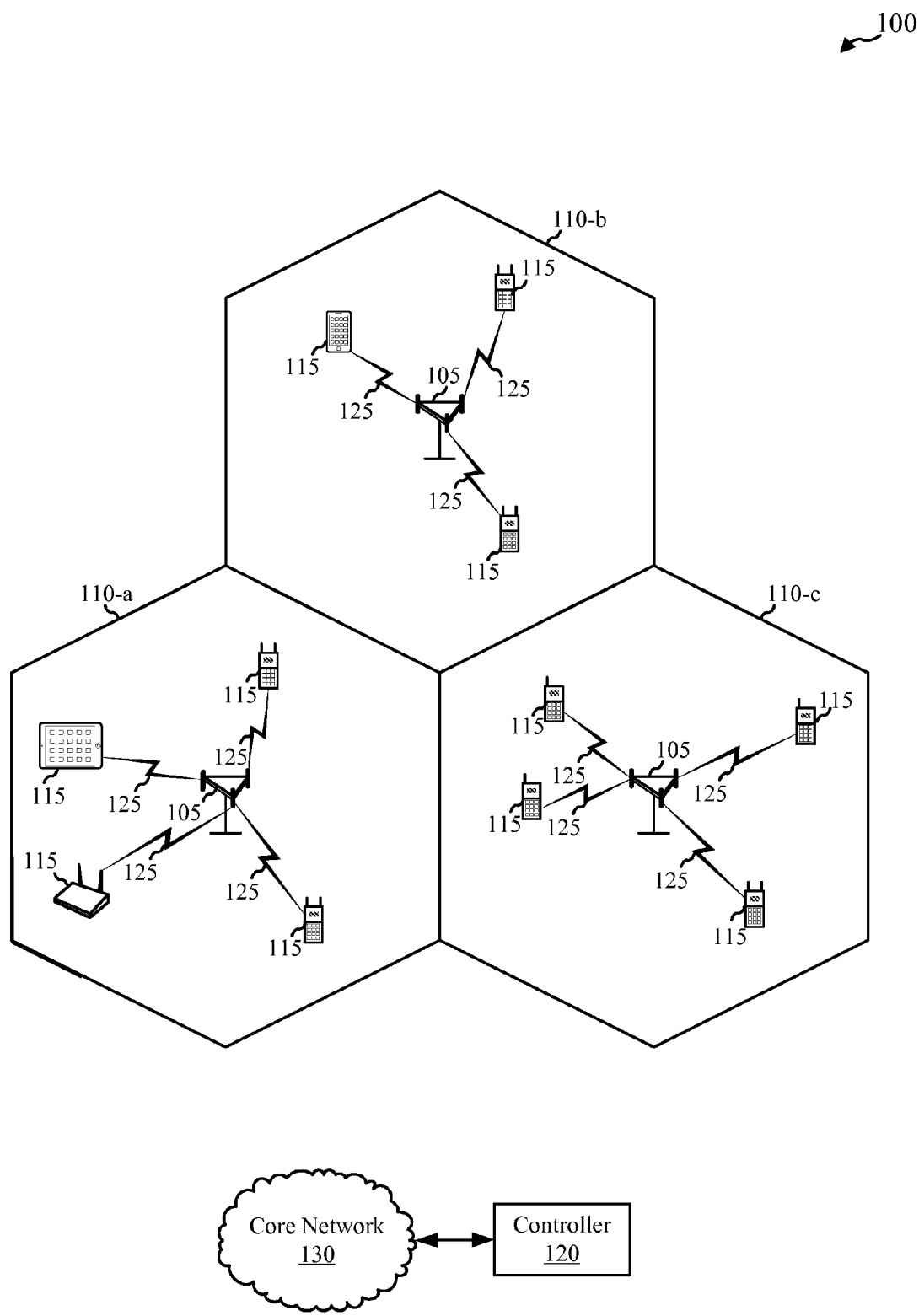
FIG. 1 shows a block diagram of a wireless communications system in accordance with various embodiments.

Methods, systems, and devices are provided that may allow wireless communications systems that utilize flexible bandwidths in conjunction with time dilation to transmit data at the same or similar rates as wireless communications systems that utilize normal bandwidths. Some embodiments identify a target rate for a broadcast channel of a first bandwidth carrier system employing time dilation and transmit broadcast information utilizing the target data rate. The target rate is higher than a scaled rate that results from scaling the data rate for a broadcast channel of a second bandwidth carrier system by a bandwidth scaling factor. The target rate may be a target data rate or a target repetition rate. The first and second bandwidth carrier systems may be flexible (e.g., with time dilation) and normal bandwidth carrier systems, respectively. In some embodiments, the second bandwidth carrier system also employs time dilation. The target rate may be a target data rate or a target repetition rate, for example.

To compensate for the data rate scaling and effectively maintain the data rate at which information is transmitted in normal bandwidth carrier systems, flexible bandwidth carrier systems employing time dilation may identify and utilize, based on the bandwidth scaling factor, different schedules for system and master information transmission, different channelization codes and channels, and/or different scaled spreading factors. The scheduling may be associated with, for example, a target repetition rate. The scheduling may be optimized or modified so that the important information is more available since simply increasing the data rate need not improve the timing at which the system information is transmitted. The optimized or modified scheduling may include identifying in which frame or frames in a frame cycle is the system information transmitted. Without compensation, the performance of certain procedures by a user equipment (UE) or NodeB may be affected by the data rate scaling. For example, procedures that depend on the UE being able to read master information blocks (MIBs) and system information blocks (SIBs) in a timely manner may be affected. Such procedures may include, but are not limited to, public land mobile network (PLMN) selection, cell selection/reselection, and handover from one cell to another. In some embodiments, compensating for the data rate scaling may take into account the amount of transmit power that is utilized by the base station to transmit information in the broadcast channel at a compensated or higher data rate.

Flexible bandwidth carrier systems may involve wireless communications systems that may utilize portions of spectrum that may not be big enough to fit a normal waveform utilizing flexible waveforms. Flexible bandwidth carrier systems may refer to as flexible bandwidth carrier systems or flexible bandwidth cells, for example. Similarly, normal bandwidth carrier systems may also refer to as normal bandwidth carrier systems or normal bandwidth cells, for example. A flexible bandwidth carrier system may be generated with respect to a normal carrier bandwidth system through dilating the time (e.g., frame duration), in conjunction with scaling down the chip rate of the flexible bandwidth carrier system with respect to the normal bandwidth carrier system. Some embodiments increase the bandwidth of a flexible waveform through expanding, or scaling up the chip rate in conjunction with reducing the time (e.g., frame duration) of the flexible bandwidth carrier system.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (Wi-MAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a controller 120, and a core network 130 (the controller 120 may be referred to as a radio network controller or RNC and may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, mobile device, access terminal, subscriber unit, or user equipment. The user equipment 115 may include cellular phones and wireless communications devices, but may also include personal digital assistants (PDAs), smartphones, tablets, other handheld devices, netbooks, notebook computers, etc. Thus, the term user equipment should be interpreted broadly hereinafter, including the claims, to include any type of wireless or mobile communications device.

The base stations 105 may wirelessly communicate with the user equipment 115 via a base station antenna. The base stations 105 may be configured to communicate with the user equipment 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-a, 110-b, or 110-c. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth and waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates and/or bandwidth scaling factors to generate and/or utilize flexible bandwidth and/or waveforms. Some aspects of system 100 may form a flexible bandwidth subsystem (such as certain user equipment 115 and/or base stations 105) that may be generated with respect to a normal subsystem (that may be implemented using other user equipment 115 and/or base stations 105) in conjunction with dilating, or scaling down, the time of the flexible subsystem with respect to the time of the normal subsystem.

In some embodiments, the different aspects of system 100, such as the user equipment 115, the base stations 105, the core network 130, and/or the controller 120 may be configured to facilitate higher data rates for broadcast channel transmissions in flexible bandwidth carrier systems employing time dilation to compensate for the data rate scaling that results in those systems. In some embodiments, the base station 105 is configured to identify a target rate for a broadcast channel of a first bandwidth carrier system employing time dilation. The target rate, which is the compensated or higher rate desired for the broadcast channel, is higher than a scaled rate for the broadcast channel. The scaled rate is a rate for a broadcast channel of a second bandwidth carrier system scaled by a bandwidth scaling factor. In some embodiments, the second bandwidth carrier system employs time dilation. The target rate may be a target data rate or a target repetition rate. The base station 105 may then transmit broadcast information of the first bandwidth carrier system utilizing the target rate. In some embodiments, the first bandwidth carrier system is a flexible bandwidth carrier system employing time dilation and the second bandwidth carrier system is a normal bandwidth carrier system. The data rate may be achieved by adding additional broadcast channels, by optimizing the scheduling of SIBs and/or MIBs in a radio frame cycle, and/or by utilizing a scaled spreading factor. The optimization of the scheduling of SIBs and/or MIBs may include mapping SIBs and/or MIBs to particular radio frames in a radio frame cycle. In some embodiments, the user equipment 115 is configured to receive the broadcast information transmitted through the broadcast channel of the first bandwidth carrier system at the target rate.

Some embodiments may include user equipment and/or base stations that may generate flexible waveforms and/or normal waveforms. Flexible waveforms may occupy less bandwidth than a normal waveform. For example, at a band edge, there may not be enough available spectrum to place a normal waveform. For a flexible waveform in some embodiments, as time gets dilated, the frequency occupied by a waveform goes down, thus making it possible to fit a flexible waveform into spectrum that may not be broad enough to fit a normal waveform. Flexible waveforms may also be generated in some embodiments through using a bandwidth scaling factor. Other embodiments may generate a flexible waveform to fit a portion of spectrum through altering a rate or chip rate (e.g., a spreading factor may change). Some embodiments may change a frequency of processing to change a chip rate or utilize a bandwidth scaling factor. Changing frequency of processing may include changing an interpolation rate, an interrupt rate, and/or a decimation rate. In some embodiments, a chip rate may be changed or a bandwidth scaling factor utilized through filtering, by decimation, and/or by changing a frequency of an analog-to-digital converter (ADC), a digital-to-analog converter (DAC), and/or an offline clock. A divider may be used to change the frequency of at least one clock.

In some embodiments, a flexible system or waveform may be a fractional system or waveform. A fractional system or waveform may be flexible because it may offer more possibilities than a normal system or waveform (e.g., N=1 system). A normal system or waveform may refer to a standard and/or legacy system or waveform.

Figure 2A:
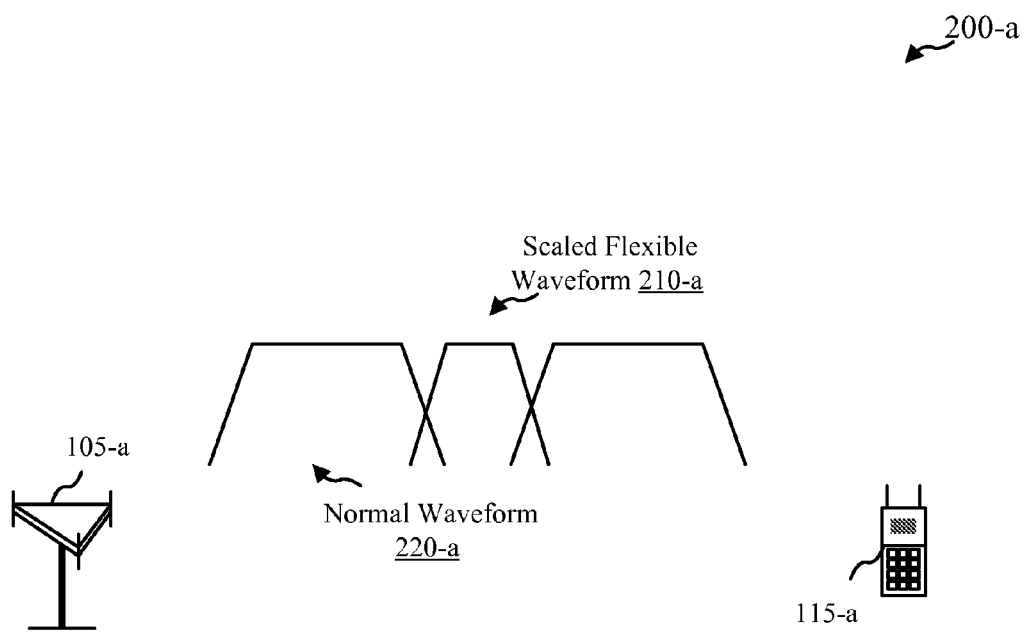
FIG. 2A shows an example of a wireless communications system where a flexible waveform fits into a portion of spectrum not broad enough to fit a normal waveform in accordance with various embodiments.
Figure 2B:
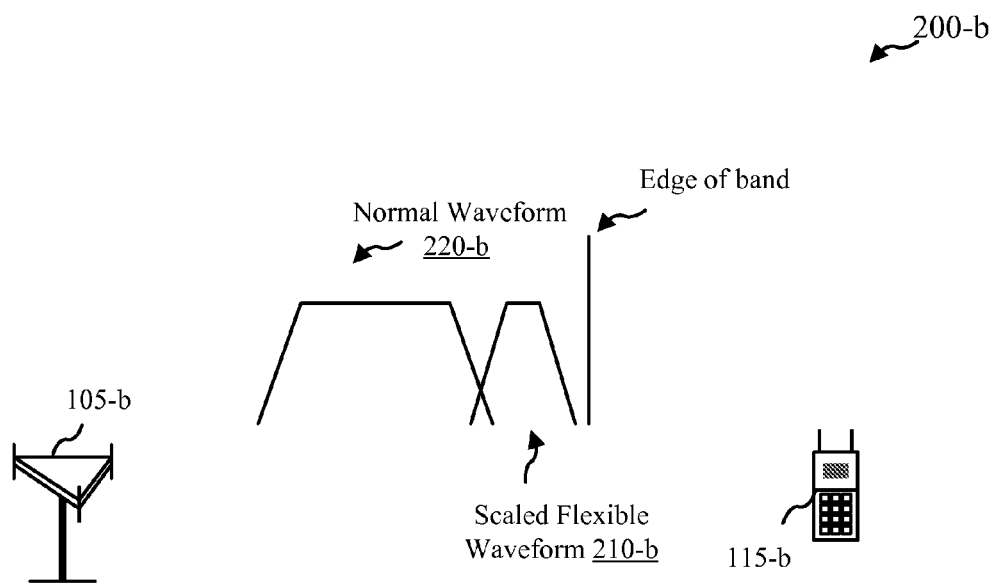
FIG. 2B shows an example of a wireless communications system where a flexible waveform fits into a portion of spectrum near an edge of a band in accordance with various embodiments.

FIG. 2A shows an example of a wireless communications system 200-a with a base station 105-a and a user equipment 115-a in accordance with various embodiments, where a flexible waveform 210-a fits into a portion of spectrum not broad enough to fit a normal waveform 220-a. System 200-a may be an example of system 100 of FIG. 1. In some embodiments, the flexible waveform 210-a may overlap with the normal waveform 220-a, where the normal waveform 220-a may be transmitted either by the base station 105-a and/or the user equipment 115-a. Some embodiments may also utilize multiple flexible waveforms 210. In some embodiments, another base station and/or user equipment (not shown) may transmit the normal waveform 220-a and/or the flexible waveform 210-a. FIG. 2B shows an example of a wireless communications system 200-b with a base station 105-b and user equipment 115-b, where a flexible waveform 210-b fits into a portion of spectrum near an edge of a band, which may be a guard band, where a normal waveform such as the normal waveform 220-b may not fit. System 200-b may be an example of system 100 of FIG. 1. Similar techniques for supporting voice services utilizing scaled flexible waveform 210-b may be applicable as discussed above.

Figure 3:
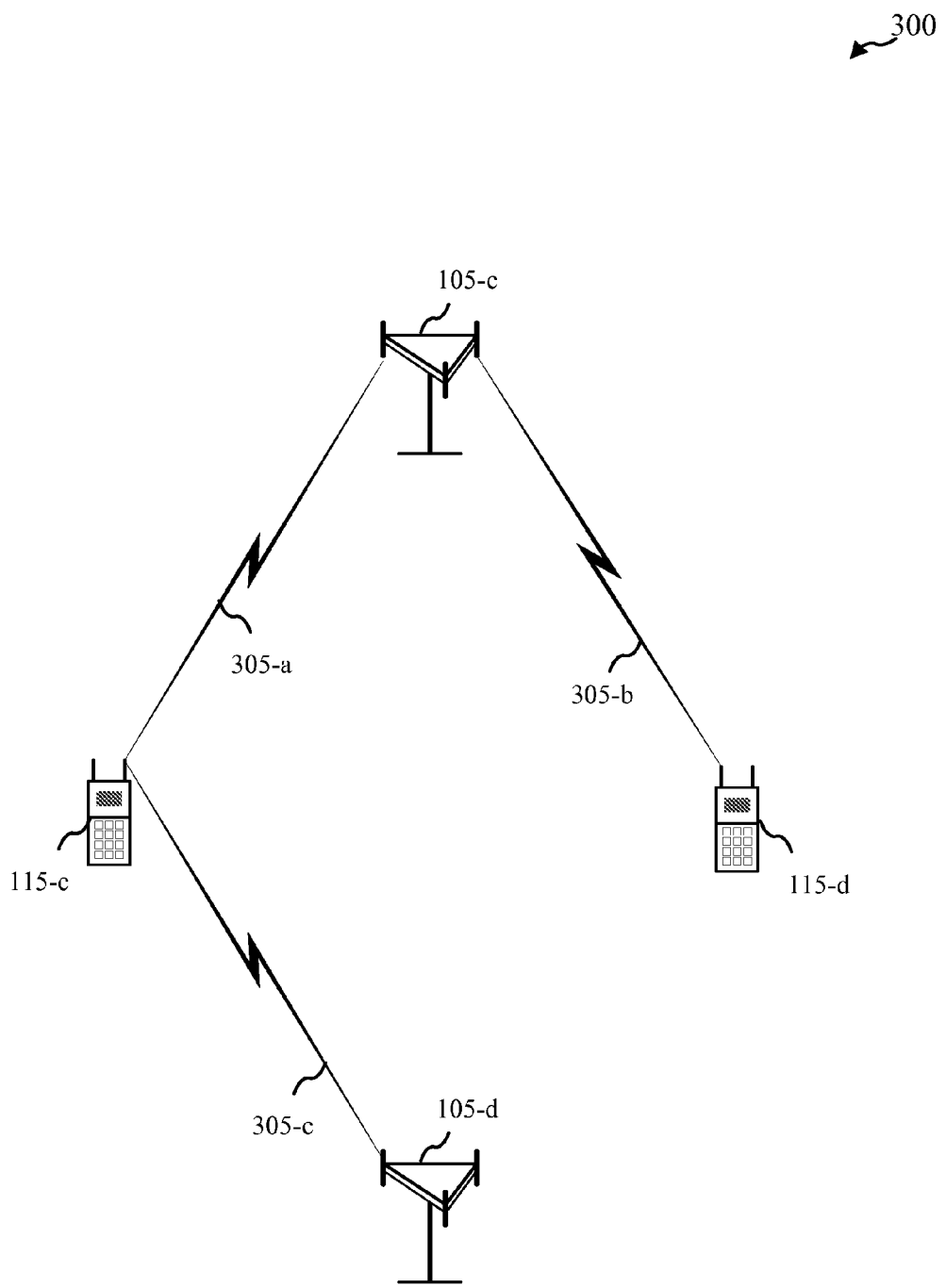
FIG. 3 shows a block diagram of a wireless communications system in accordance with various embodiments.

FIG. 3 shows a wireless communications system 300 with a base station 105-c and 105-d and user equipment 115-c and 115-d, in accordance with various embodiments. In some embodiments, the base stations 105-c/105-d and/or the user equipment 115-c/115-d may be configured for providing services, such as voice services, within a flexible bandwidth carrier system. For example, transmissions 305-a, 305-b, and/or 305-c between the user equipment 115-c/115-d and the base station 105-c may involve transmissions that have been scaled utilizing flexible waveforms.

The flexible waveforms may be generated to occupy less (or more) bandwidth than a normal waveform. For example, at a band edge, there may not be enough available spectrum to place a normal waveform. For a flexible waveform, as time gets dilated, the frequency occupied by a waveform goes down, thus making it possible to fit a flexible waveform into spectrum that may not be broad enough to fit a normal waveform. In some embodiments, the flexible waveform may be scaled utilizing a bandwidth scaling factor N with respect to a normal waveform. Bandwidth scaling factor N may take on numerous different values including, but not limited to, integer values such as 1, 2, 4, etc. N, however, does not have to be an integer.

As shown in FIG. 3, base station 105-c and/or the user equipment 115-c may communicate through transmissions 305-a. When the communication utilizes flexible waveforms, base station 105-c may identify a target rate for a broadcast channel that utilizes the flexible waveforms. The target rate can be a data rate that compensates for the lower data rate that results from the scaling associated with flexible waveforms. This compensation allows the base station 105-c to effectively maintain the data rate at which broadcast information is typically transmitted to the user equipment 115-c such that certain procedures performed by the user equipment 115-c to identify and select a cell for communication may not be affected.

The base stations 105-c and 105-d may support both a flexible bandwidth cell and a normal bandwidth cell, and may communicate with the user equipment 115-c and 115-d utilizing flexible waveforms and/or normal waveforms. When the communication between the base station 105-c and the user equipment 115-c and 115-d is through flexible waveforms, the base station 105-c may utilize one target data rate to communicate broadcast information to the user equipment 115-c and may utilize a different or the same target data rate to communicate broadcast information to the user equipment 115-d. When both base stations 105-c and 105-d communicate with the user equipment 115-c through flexible waveforms, the base station 105-c may utilize one target data rate to communicate broadcast information to the user equipment 115-c and the base station 105-d may utilize a different or the same target data rate to communicate broadcast information to the user equipment 115-c.

Some embodiments utilize different approaches to implement target rates that compensate for the rate scaling that results from utilizing flexible waveforms. In some embodiments, the approaches involve identifying a target rate that is the same or substantially the same as the typical or normal rate utilized with normal waveforms. That is, the target rate may not only be higher than the scaled rate but it may be as high as the typical rate. In other embodiments, the approaches involve identifying a target rate that is somewhat higher than the scaled rate but not necessarily as high as the normal rate. Because any increase in the rate comes with an increase in the amount of transmission power utilized by the base station, whichever approach is selected may take into account the tradeoff between getting the target rate as close as possible to the normal rate and limitations in transmission power at the base station.

Some embodiments may utilize additional terminology. A new unit D may be utilized. The unit D is dilated. The unit is unitless and has the value of N. One can talk about time in the flexible system in terms of "dilated time." For example, a slot of say 10 milliseconds (ms) in normal time may be represented as 10 Dms in flexible time (note: even in normal time, this will hold true since N=1 in normal time; that is, D has a value of 1 in normal time, so 10 Dms=10 ms). In time scaling, one can replace most "seconds" with "dilated-seconds." Note frequency in Hertz is 1/s. Some embodiments may also utilize a chip rate divider ("Dcr"), which may also have the value N.

As discussed above, a flexible waveform may be a waveform that occupies less bandwidth than a normal waveform. Thus, in a flexible bandwidth carrier system, the same number of symbols and bits may be transmitted over a longer duration compared to a normal bandwidth carrier system. This may result in time stretching, whereby slot duration, frame duration, etc., may increase by a bandwidth scaling factor N. Bandwidth scaling factor N may represent the ratio of the normal bandwidth to flexible bandwidth (BW). Thus, data rate in a flexible bandwidth carrier system may equal (Normal Rate×1/N), and delay may equal (Normal Delay×N). In general, a flexible systems channel BW=channel BW of normal systems/N. Delay×BW may remain unchanged. Furthermore, in some embodiments, a flexible waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a bandwidth scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a bandwidth scaling factor that may be not equal to one (e.g., N=2, 4, 8, ½, ¼, etc.). For N>1, or if a chip rate is decreased, the bandwidth of a waveform may decrease. Some embodiments may utilize bandwidth scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system).

Figure 4A:
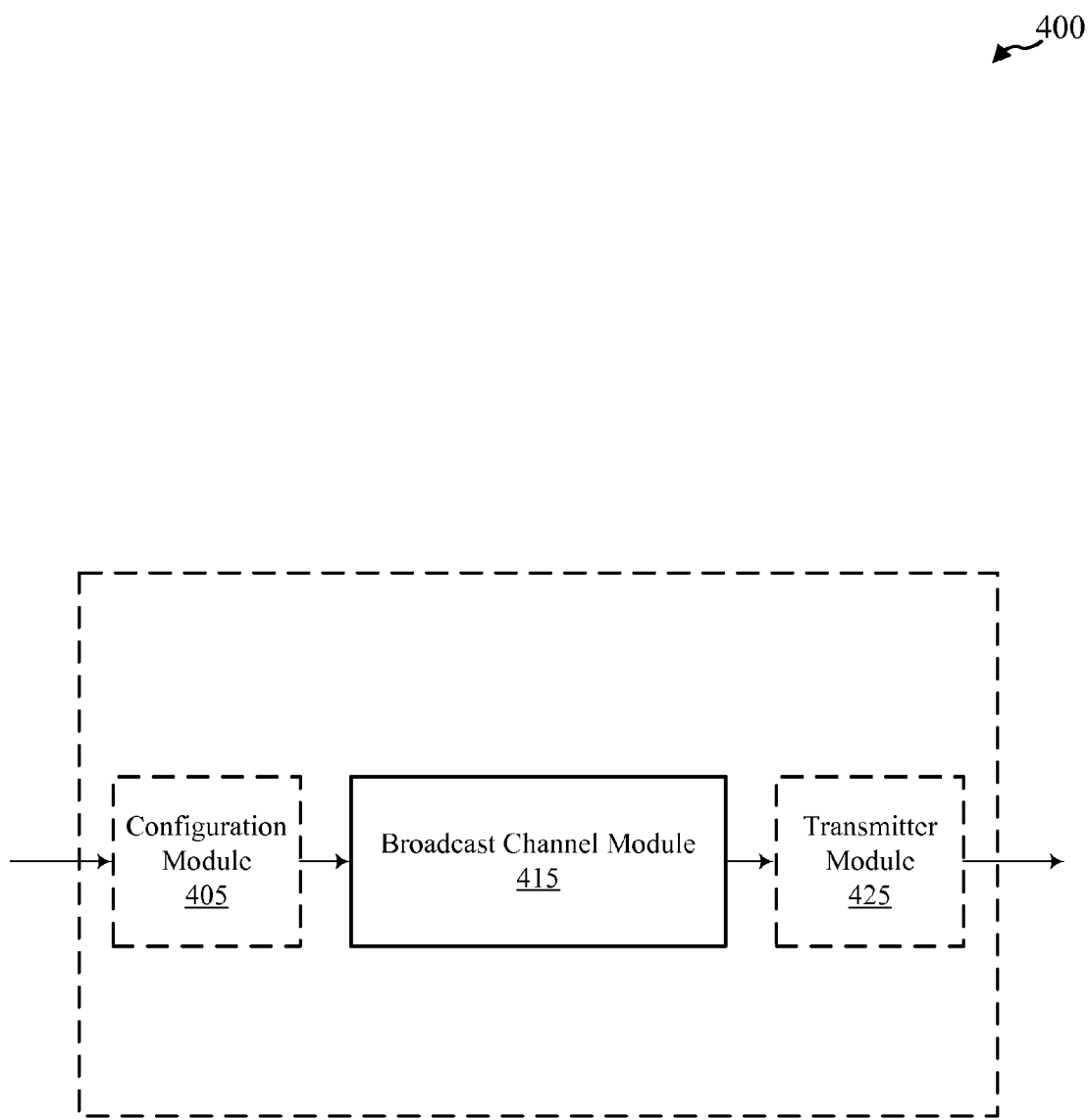
FIG. 4A shows a block diagram of a device configured to facilitate higher data rates in broadcast channel transmissions in accordance with various embodiments.

Turning next to FIG. 4A, a block diagram illustrates a device 400 configured to facilitate higher data rates in broadcast channel transmissions in accordance with various embodiments. The device 400 may also be an example of one or more aspects of base stations 105 described with reference to FIG. 1, FIGS. 2A and 2B, FIG. 3, FIG. 27, and/or FIG. 29. The device 400 may also be a processor. The device 400 may be an example of one or more aspects of user equipment 115 described with reference to FIG. 1, FIGS. 2A and 2B, FIG. 3, FIG. 27, FIG. 28, and/or FIG. 29. The device 400 may also be a processor. The device 400 may include a configuration module 405, a broadcast channel module 415, and/or a transmitter module 425. Each of these components may be in communication with each other.

Device 400, through the configuration module 405, the broadcast channel module 415, and/or the transmitter module 420, may be configured facilitate higher data rates in broadcast channel transmissions for different types of bandwidth carrier systems, including flexible bandwidth carrier systems. When the device 400 is an example of a base station 105, the configuration module 405 may receive information from a UE through a network. The broadcast channel module 415 may be configured to identify a target rate for a broadcast channel of a first bandwidth carrier system employing time dilation, where the target rate is higher than a scaled rate for the broadcast channel. The data rate may be a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. In some embodiments, the target rate refers to an information data rate and the information data rate is substantially the same as the rate for the broadcast channel of the second bandwidth carrier system.

Once the target rate is identified, the broadcast channel module 415 and/or the transmitter module 425 may transmit broadcast information of the first bandwidth carrier system using the target rate. The broadcast information may include one or more of signal strength information for access, service provider information, and neighboring cells information. The broadcast information may include information that is utilized for one or more of PLMN selection, cell selection/reselection, and handover from one cell to another.

The broadcast channel module 415 may be configured to add an additional broadcast channel of the first bandwidth carrier system so that the broadcast information may be transmitted through both broadcast channels of the first bandwidth carrier system using the target rate. The broadcast channel module 415 may be configured to utilize a location of each SIB and/or MIB transmitted in a radio frame cycle for the broadcast channel of the first bandwidth carrier system to facilitate transmitting the broadcast information using the target rate. The broadcast channel module 415 may be configured to schedule the location of each SIB and/or MIB in the radio frame cycle. The broadcast channel module 415 may be configured to map the SIBs and/or MIBs to particular radio frames in the radio frame cycle, where the duration of the radio frames is based on the bandwidth scaling factor. The broadcast channel module 415 may be configured to utilize a scaled spreading factor with respect to one or more primary broadcast channels of the first bandwidth carrier system to facilitate transmitting the broadcast information using the target rate, where the scaled spreading factor is scaled by the bandwidth scaling factor or by a fraction of the bandwidth scaling factor. In some embodiments, such as for Universal Mobile Telecommunication System (UMTS), the primary broadcast channels are Primary Common Control Physical Channels (PCCPCHs).

When the device 400 is an example of a user equipment 115, the configuration module 405 may be configured to receive broadcast information transmitted through the broadcast channel of the first bandwidth carrier system at the target rate. The broadcast channel module 415 and/or another component (not shown) of the device 400, may process the broadcast information to identify candidate cells for communication with the user equipment. The identification of the candidate cells and/or communication with those cells may occur, at least partially, through the transmitter module 425. The broadcast information may be received by the configuration module 405 and/or the broadcast channel module 415 at the target rate through the broadcast channel of the first bandwidth carrier system and through an additional broadcast channel of the first bandwidth carrier system. As noted above, the broadcast information may include one or more of signal strength information for access, service provider information, and neighboring cells information, for example. The broadcast information may include information that is utilized by the device 400 for one or more of PLMN selection, cell selection/reselection, and handover from one cell to another.

The configuration module 405 and/or the broadcast channel module 415 may be configured to receive a radio frame cycle for the broadcast channel of the first bandwidth carrier system in which SIBs and/or MIBs are mapped to particular radio frames in the radio frame cycle based on the target rate and the duration of the radio frames is based on the bandwidth scaling factor. The configuration module 405 and/or the broadcast channel module 415 may be configured to receiving the broadcast information at the target rate based on a scaled spreading factor with respect to one or more primary broadcast channels of the first bandwidth carrier system, where the scaled spreading factor is scaled by the bandwidth scaling factor or by a fraction of the bandwidth scaling factor. In some embodiments, such as for UMTS, the primary broadcast channels are PCCPCHs.

Figure 4B:
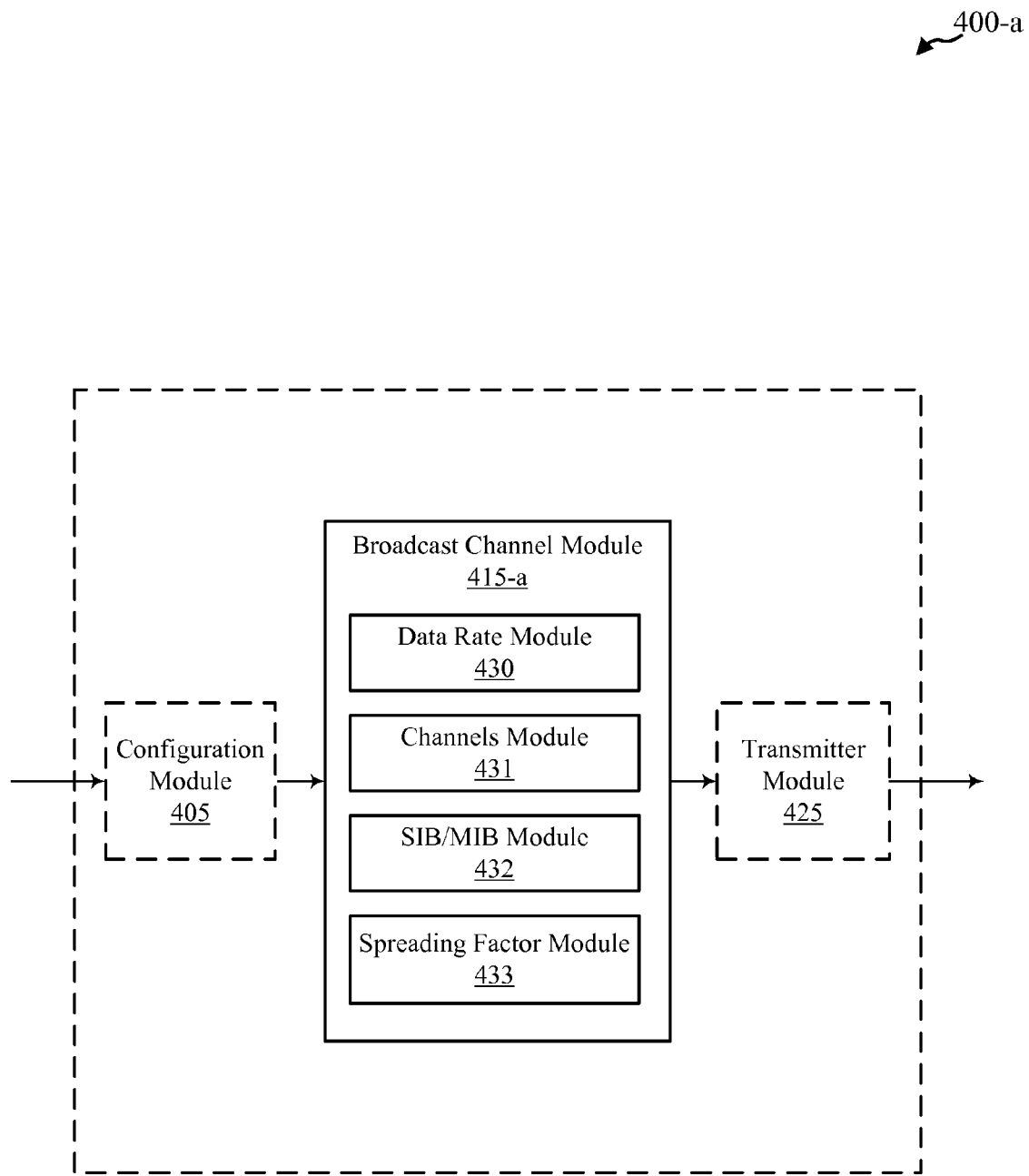
FIG. 4B shows a block diagram of a device configured to facilitate higher data rates in broadcast channel transmissions in accordance with various embodiments.

Turning to FIG. 4B, a block diagram illustrates a device 400-a configured to facilitate higher data rates in broadcast channel transmissions in accordance with various embodiments. The device 400-a may be an example of the device 400 in FIG. 4A. The device 400-a may also be a processor. The device 400-a may include the configuration module 405, a broadcast channel module 415-a, and/or the transmitter module 425. Each of these components may be in communication with each other.

The broadcast channel module 415-a may be an example of the broadcast channel module 415 in FIG. 4A. The broadcast channel module 415-a may include multiple modules to handle various aspects related to facilitating higher data rates in broadcast channel transmissions for different types of bandwidth carrier systems, including flexible bandwidth carrier systems. The broadcast channel module 415-a may include a data rate module 430, channels module 431, an SIB/MIB module 432, and a spreading factor module 433.

When the device 400-a is an example of a base station 105, the data rate module 430 may be configured to identify a target rate for a broadcast channel of a first bandwidth carrier system employing time dilation, where the target rate is higher than a scaled rate for the broadcast channel. The scaled rate may be a rate for a broadcast channel of a second bandwidth carrier system scaled by a bandwidth scaling factor in conjunction with time dilation. The target rate may be a target data rate or a target repetition rate. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. The channels module 431 may be configured to add an additional broadcast channel of the first bandwidth carrier system so that the broadcast information may be transmitted through both broadcast channels of the first bandwidth carrier system using the target rate. The SIB/MIB module 432 may be configured to utilize a location of each SIB and/or MIB transmitted in a radio frame cycle for the broadcast channel of the first bandwidth carrier system to facilitate transmitting the broadcast information using the target rate. The SIB/MIB module 432 may be configured to schedule the location of each SIB and/or MIB in the radio frame cycle. The SIB/MIB module 432 may be configured to map the SIBs and/or MIBs to particular radio frames in the radio frame cycle, where the duration of the radio frames is based on the bandwidth scaling factor. The spreading factor module 433 may be configured to utilize a scaled spreading factor with respect to one or more primary broadcast channels of the first bandwidth carrier system to facilitate transmitting the broadcast information using the target rate, where the scaled spreading factor is scaled by the bandwidth scaling factor or by a fraction of the bandwidth scaling factor. In some embodiments, such as for Universal Mobile Telecommunication System (UMTS), the primary broadcast channels are Primary Common Control Physical Channels (PCCPCHs). In some embodiments, one or more of the modules in the broadcast channel module 415-a operate together to perform at least some of the features and aspects described above when the device 400-a is an example of a base station 105.

When the device 400-a is an example of a user equipment 115, the data rate module 430 may be configured to receive broadcast information transmitted through the broadcast channel of the first bandwidth carrier system at the target rate. The broadcast channel module 415-a and/or another component (not shown) of the device 400-a, may process the broadcast information to identify candidate cells for communication with the user equipment. The channels module 431 may be configured to handle receiving the broadcast information at the target rate through more than one broadcast channel of the first bandwidth carrier system. The SIB/MIB module 432 may be configured to handle receiving the broadcast information when an optimized SIB/MIB schedule in a radio frame cycle is utilized to produce the target rate. The spreading factor module 433 may be configured to handle receiving the broadcast information when a scaled spreading factor is utilized to produce the target rate. In some embodiments, one or more of the modules in the broadcast channel module 415-a operate together to perform at least some of the features and aspects described above when the device 400-a is an example of a user equipment 115.

The components of the devices 400 and 400-a in FIGS. 4A and/or 4B may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

While the various examples and descriptions presented below are related to adaptations to the UMTS broadcast channel (BCH) parameters and/or operation to facilitate higher data rates in flexible bandwidth carrier systems, the same or similar concepts and/or features described in connection with UMTS BCH may be applied to other types of wireless communication systems and/or channels.

In UMTS, the broadcast channel may support a user data rate of 12.3 kilobits-per-second (kbps). For a flexible bandwidth carrier system employing time dilation, that rate may be scaled by the bandwidth scaling factor (N). For example, when N=2, the broadcast channel may support a user data rate of 6.15 kbps (12.3 kbps/2). In another example, when N=4, the broadcast channel may support a user data rate of 3.075 kbps (12.3 kbps/4). The lower user data rates may affect the performance of those procedures performed by a user equipment that depend on reading the MIB and SIBs in a timely manner. The MIB is transmitted frequently (e.g., every 80 milliseconds) and provides timing information for scheduling blocks (SBs) and for some SIBs. There are some SIBs, such as SIB1, SIB3, SIB5, SIB7, and SIB11, for example, which are involved in determining the cell in which the user equipment may camp. If the reading of those SIBs is affected by the lower (i.e., scaled) user data rate, then the ability of the user equipment to identify and select a cell for communication may also be affected.

Turning next to FIG. 5, a table 500 illustrates different parameters utilized in a UMTS broadcast channel. The parameters listed in table 500 include the transport block size, the cyclic redundancy check (CRC), the coding, the transmission time interval (TTI), the number of channelization codes, the spreading factor (SF), the channelization code for the primary broadcast channel (PCCPCH), the channel symbol rate, the channel bit rate, and the user data rate. The user data rate need not include the CRC and tail bits. The values of the parameters illustrated in table 500 are the values typically used with normal bandwidth carrier systems. At least some of those values may be adapted or changed to facilitate higher data rate for broadcast channels in flexible bandwidth carrier systems employing time dilation.

Figure 6:
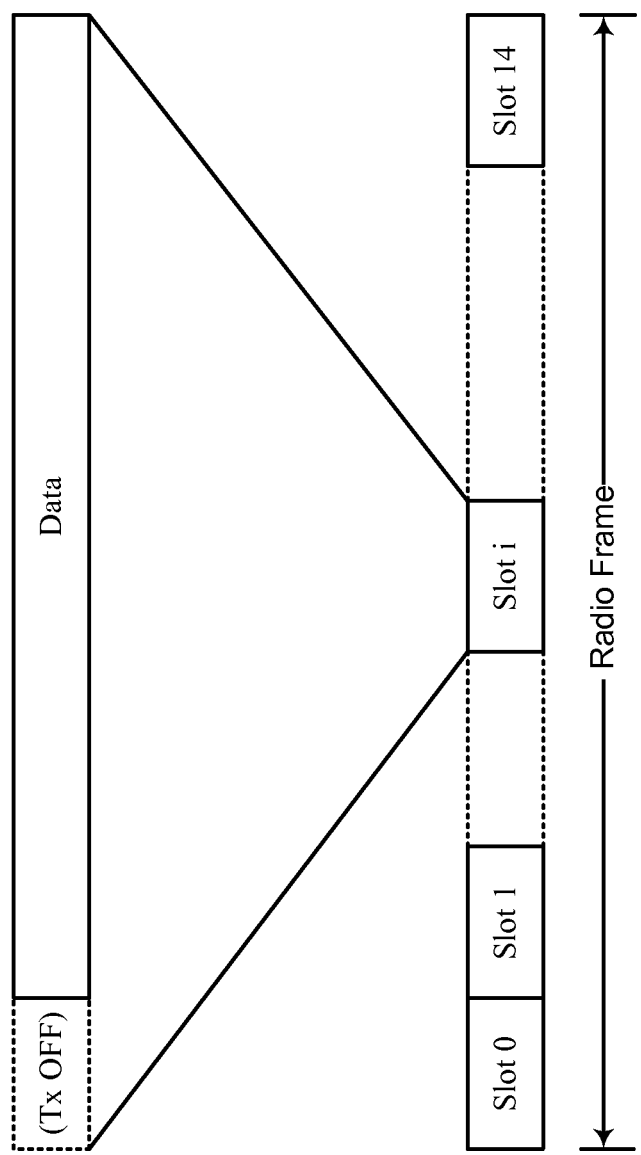
FIG. 6 shows a broadcast channel frame structure in accordance with various embodiments.

Turning to FIG. 6, a radio frame structure 600 for a UMTS PCCPCH is shown that includes 15 slots and each slot has 2560 chips or 20 bits. The first 256 chips in each slot are not utilized (90% duty cycle). The data portion of the radio frame structure 600 includes 2304 chips or 18 bits of information. The duration of the radio frame structure 600 is 10 milliseconds (ms) and there are two radio frame structures 600 for each broadcast channel transport block. The duration of each of the slots in the radio frame structure 600 is 0.67 ms.

Figure 7:
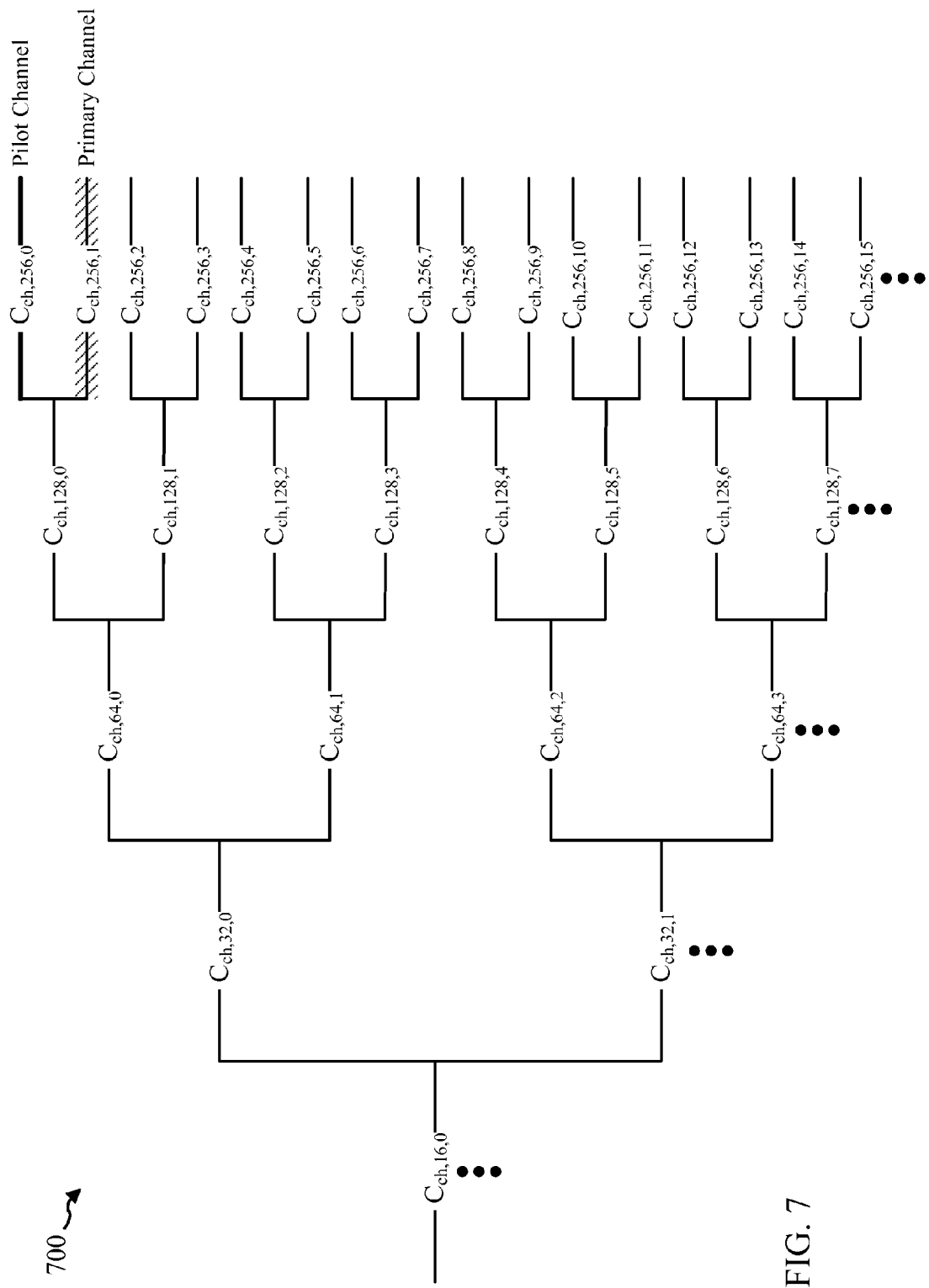
FIG. 7 shows a channelization code tree for broadcast channel transmissions in accordance with various embodiments.

Turning to FIG. 7, a channelization code tree 700 for the UMTS BCH is shown that illustrates the position of the UMTS PCCPCH in the tree. For example, the pilot channel, the Common Pilot Channel (CPICH) in UMTS, is located in the $C_{ch,256,0}$ code, while the primary broadcast channel, the PCCPCH, is located in the $C_{ch,256,1}$ code.

Figure 8:
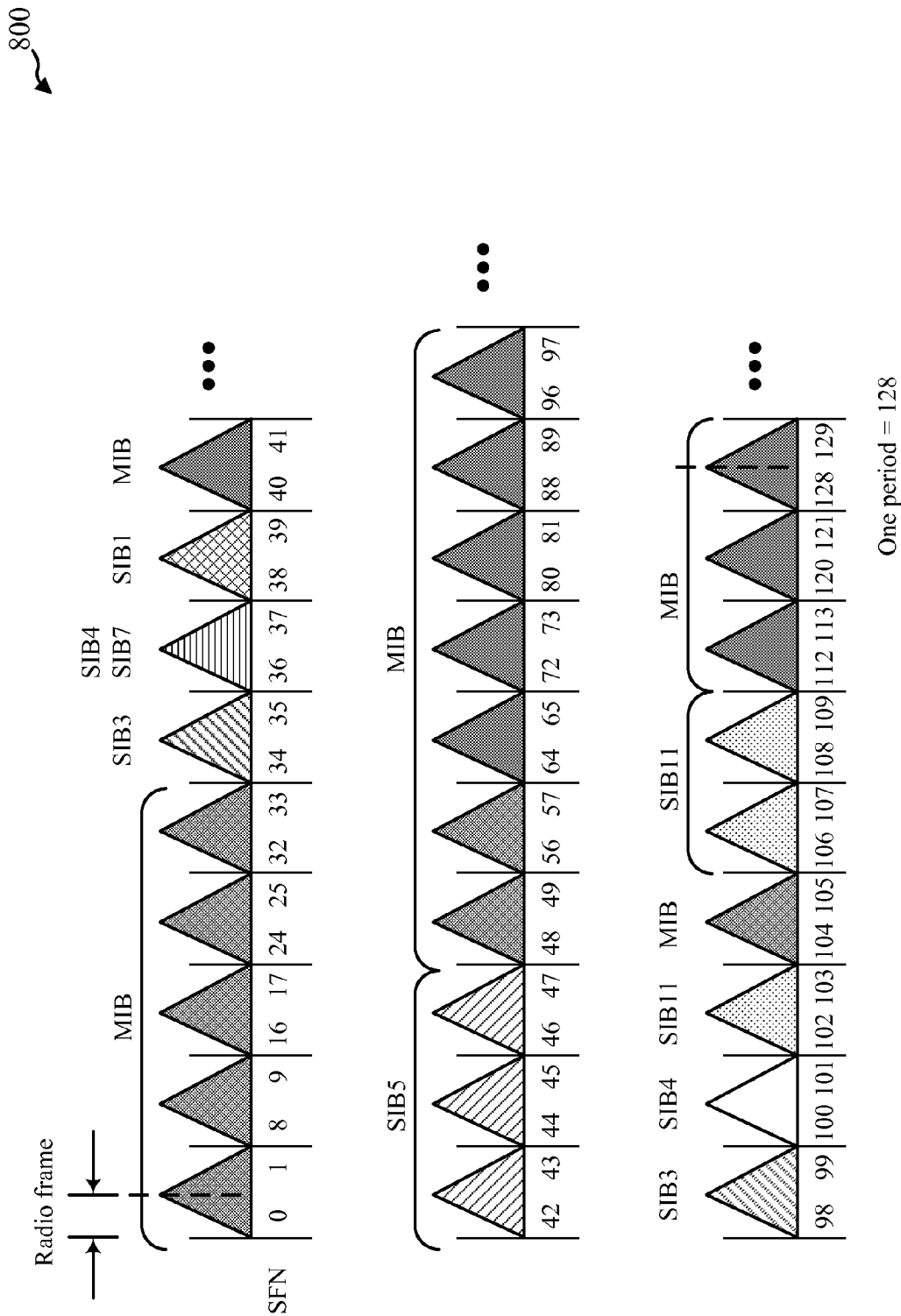
FIG. 8 shows a radio frame cycle with scheduled system information blocks (SIBs) in accordance with various embodiments.

Turning to FIG. 8, a radio frame cycle 800 for UMTS SIB scheduling is shown that has a 128 frame cycle period and a 10 ms frame duration. The radio frame cycle 800 shows the mapping or scheduling of MIB, SIB1, SIB3, SIB4, SIB5, SIB7, and SIB11 to particular system frame numbers (SFNs), or ranges of SFNs, in the radio frame cycle. The radio frame cycle 800 may also be referred to as the radio frame SFN cycle 800. The scheduling of the SIBs may be represented by at least the following scheduling parameters: SEG_COUNT, which indicates the number of segments for a particular SIB, SIB_REP, which indicates how often those segments repeat in the radio frame cycle, and SIB_POS, which indicates the first position or location of the SIB in the radio frame cycle (denoted in SFN units, where the range of an SFN repeating cycle is 0 to 4095).

For SIB1, for example, which has a single segment and appears once in the radio frame cycle at frame 38, the scheduling parameters are SEG_COUNT=1, SIB_REP=128, and SIB_POS=38. SIB7 has the same values for SEG_COUNT and SIB_REP, with SIB_POS=36. For SIB3 and SIB4, which have a single segment and appear twice in the radio frame cycle, SEG_COUNT=1 and SIB_REP=64. For SIB3, however, SIB_POS=34 to indicate that the first location of SIB3 is in frame 34, while for SIB4, SIB_POS=36 to indicate that the first location of SIB4 is in frame 36. For SIB5 and SIB11, which have three segments and appear once in the radio frame cycle, SEG_COUNT=3 and SIB_REP=128, with SIB_POS=42 for SIB5 and SIB_POS=102 for SIB11.

The information provided above for FIGS. 5-8 illustrates the typical operation associated with UMTS broadcast channel for normal bandwidth carrier systems. For example, the channelization code 700 may represent the exact codes that are used for normal bandwidth carrier systems while the radio frame SFN cycle 800 may represent a typical example of the type of scheduling used. For flexible bandwidth carrier systems employing time dilation, one or more of the parameters described above may be changed, modified, or adapted to compensate for the scaling that results from utilizing flexible waveforms. Below are provided various examples of approaches that may be taken to change, modify, or adapt one or more parameters of the broadcast channel to facilitate higher user data rates for flexible bandwidth carrier systems employing time dilation.

Turning next to FIG. 9, a table 500-a illustrates a first example of modified parameters for a UMTS broadcast channel to facilitate higher user data rates for flexible bandwidth carrier systems employing time dilation when the bandwidth scaling factor N=2. The channel symbol rate, the channel bit rate, and the user data rate are half the value of the same parameters in table 500. Moreover, the TTI now corresponds to 40 ms, due to time dilation, from the 20 ms shown in table 500. To compensate for the lower user data rate (i.e., 6.15 kbps vs. 12.3 kbps), the SIB scheduling may be optimized. One optimization approach is to utilize the radio frame SFN cycle 800 in FIG. 8 with the radio frame now being 20 ms instead of 10 ms and the slot being 1.33 ms instead of 0.67 ms, all of which are now due to time dilation. The SFN increments every 20 ms radio frame. Another optimization approach is described below with respect to FIG. 10. The example illustrated in FIG. 9 may be utilized when a compromise is made between the desire to increase the user data rate back to 12.3 kbps and limits or restrictions in the amount of power that may be available at a base station to transmit at the higher data rate.

Figure 10:
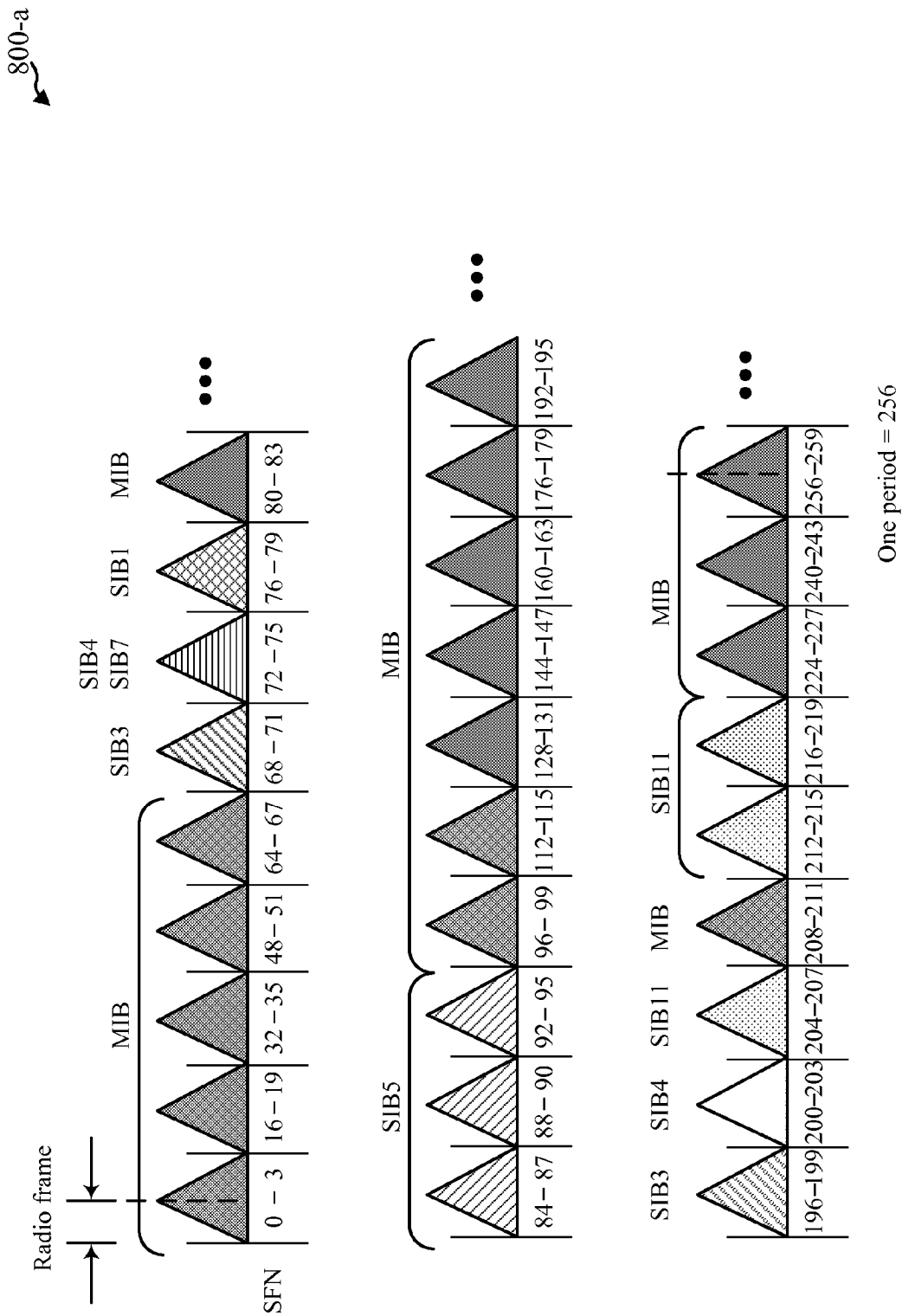
FIG. 10 shows a radio frame cycle with scheduled SIBs in accordance with various embodiments.

Turning now to FIG. 10, a radio frame SFN cycle 800-a for UMTS SIB scheduling is shown that has a 256 frame cycle period and a 20 ms radio frame duration due to time dilation. However, the SFN does not increment every 20 ms radio frame. Instead, the SFN increments every 10 ms. The radio frame cycle 800-a shows the mapping or scheduling of MIB, SIB1, SIB3, SIB4, SIB5, SIB7, and SIB11 to particular ranges of SFNs in the radio frame cycle. For SIB1, for example, which has a single segment and appears once in the radio frame cycle at frame 76, the scheduling parameters are SEG_COUNT=1, SIB_REP=256, and SIB_POS=76. SIB7 has the same values for SEG_COUNT and SIB_REP, with SIB_POS=72. For SIB3 and SIB4, which have a single segment and appear twice in the radio frame cycle, SEG_COUNT=1 and SIB_REP=128. For SIB3, however, SIB_POS=68 to indicate that the first location of SIB3 is in frame 68, while for SIB4, SIB_POS=72 to indicate that the first location of SIB4 is in frame 72. For SIB5 and SIB11, which have three segments and appear once in the radio frame cycle, SEG_COUNT=3 and SIB_REP=256, with SIB_POS=84 for SIB1 and SIB_POS=204 for SIB 11. Both SIB_REP and SIB_POS for all the SIBs are scaled by N=2 compared to the values shown in the radio frame SFN cycle 800.

Figure 12:
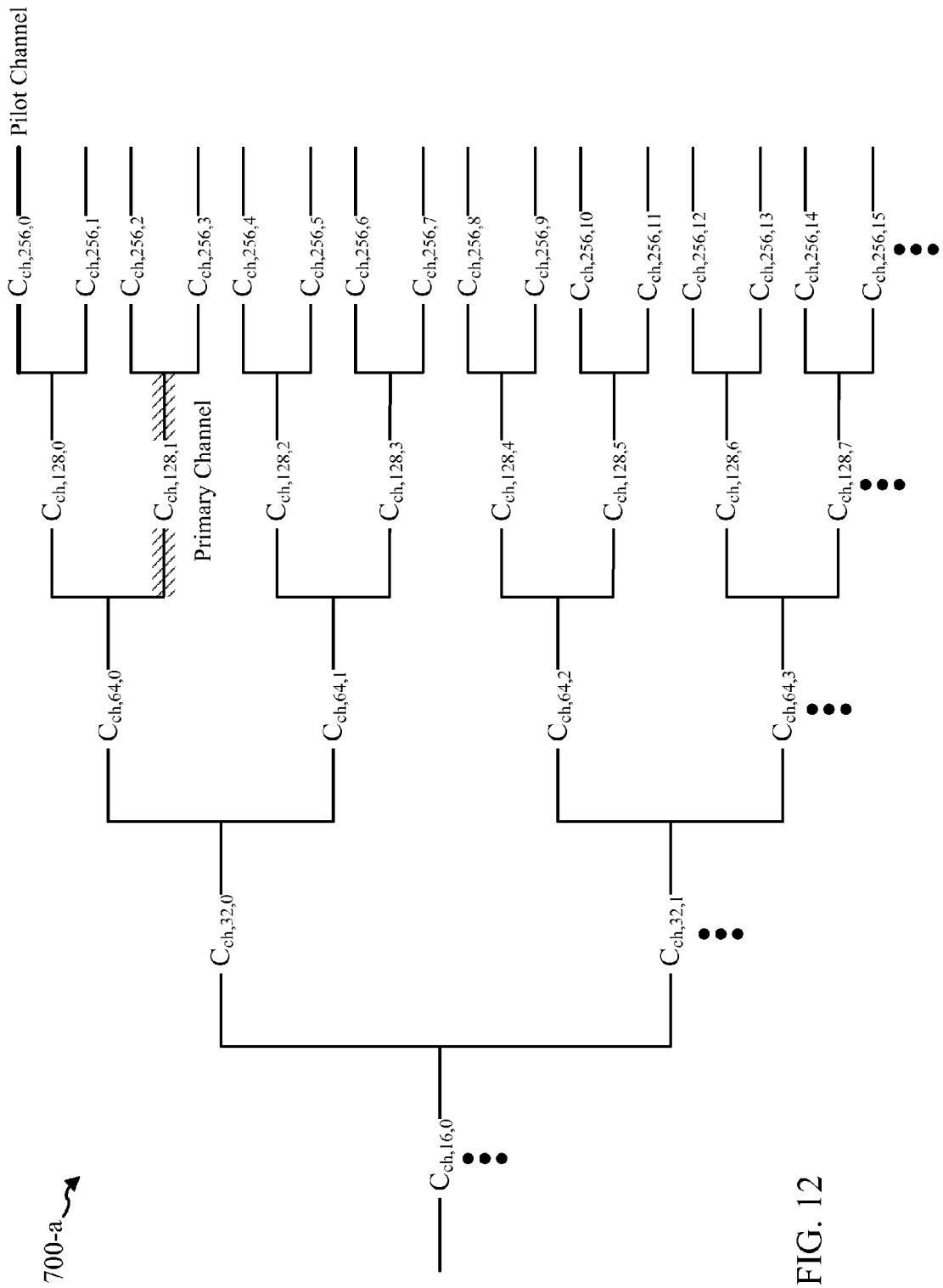
FIG. 12 shows a channelization code tree for broadcast channel transmissions in accordance with various embodiments.

Turning next to FIG. 11, a table 500-b illustrates a second example of modified parameters for a UMTS broadcast channel to facilitate higher user data rates for flexible bandwidth carrier systems when the bandwidth scaling factor N=2. In this case, the spreading factor (SF=128) is half the value of the spreading factor (SF=256) in table 500. This approach allows for the user data rate to remain at 12.3 kbps by changing the channelization code of the primary broadcast channel to the $C_{ch,128,1}$ code. FIG. 12 illustrates the channelization code tree for this case and FIGS. 13A and 13B illustrate SIB scheduling optimizations for this case.

Turning to FIG. 12, a channelization code tree 700-a is shown for the second example of modified parameters for a UMTS broadcast channel when N=2 described above with respect to FIG. 11. In this instance, the pilot channel, the CPICH, is located in the $C_{ch,256,0}$ code, like in the channelization code tree 700. The primary broadcast channel, the PCCPCH or primary channel, may now be located in the $C_{ch,128,1}$ code. In some embodiments, the pilot channel is located in the $C_{ch,256}$ codes and the primary broadcast channel is located in any of the $C_{ch,128}$ codes that does not conflict with the pilot channel.

Figure 13A:
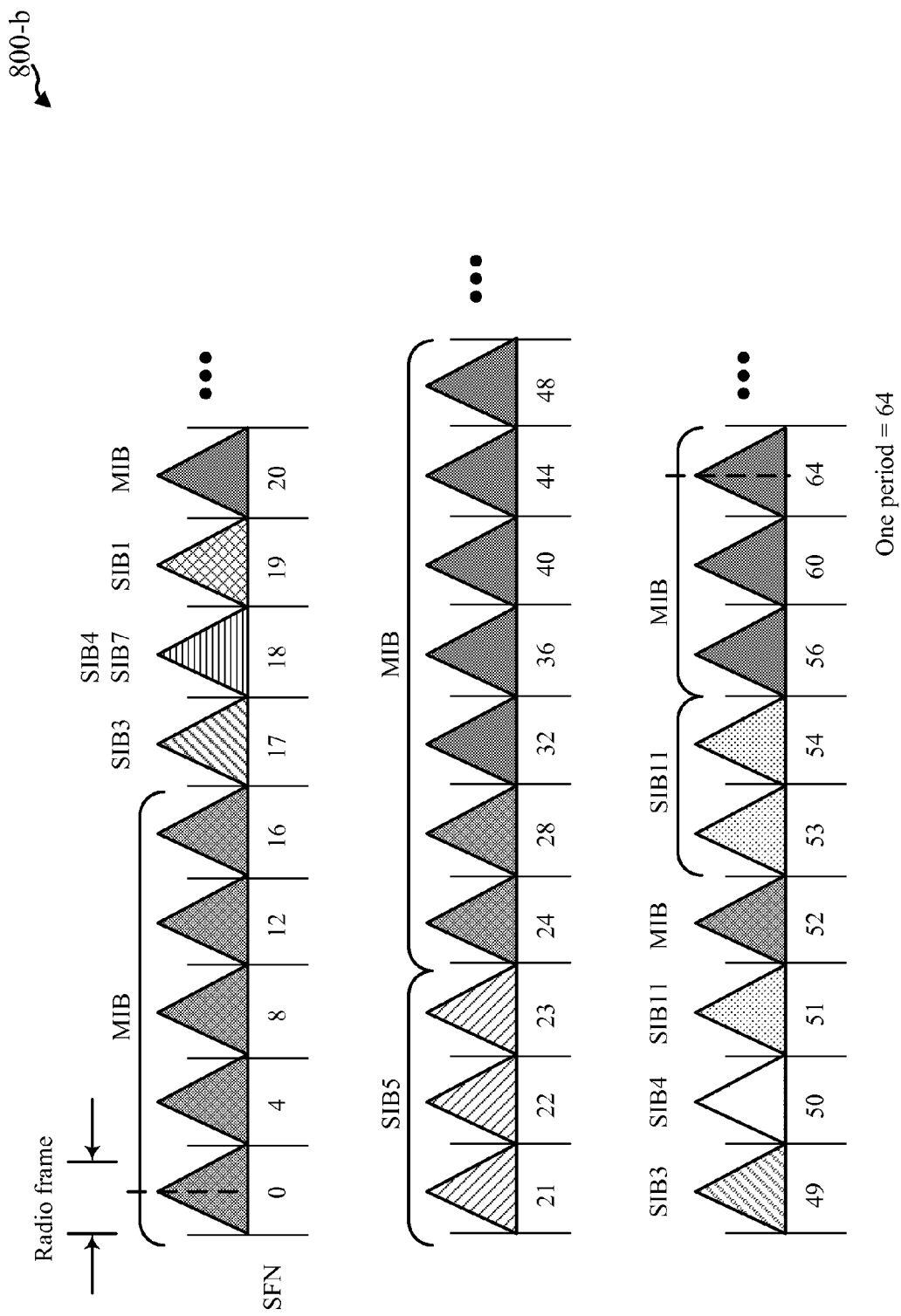
FIG. 13A shows a radio frame cycle with scheduled SIBs in accordance with various embodiments.

Turning now to FIG. 13A, a radio frame cycle SFN 800-b for UMTS SIB scheduling is shown that has a 64 frame cycle period and a 20 ms radio frame duration due to time dilation. The SFN increments every 20 ms radio frame. The radio frame SFN cycle 800-b may be one SIB scheduling optimization of the example illustrated in FIG. 11. The radio frame SFN cycle 800-b shows the mapping or scheduling of MIB, SIB1, SIB3, SIB4, SIB5, SIB7, and SIB11 to particular SFNs in the radio frame cycle. For SIB1, for example, which has a single segment and appears once in the radio frame cycle at frame 19, the scheduling parameters are SEG_COUNT=1, SIB_REP=64, and SIB_POS=19. SIB7 has the same values for SEG_COUNT and SIB_REP, with SIB_POS=18. For SIB3 and SIB4, which have a single segment and appear twice in the radio frame cycle, SEG_COUNT=1 and SIB_REP=32. For SIB3, however, SIB_POS=17 to indicate that the first location of SIB3 is in frame 17, while for SIB4, SIB_POS=18 to indicate that the first location of SIB4 is in frame 18. For SIB5 and SIB11, which have three segments and appear once in the radio frame cycle, SEG_COUNT=3 and SIB_REP=64, with SIB_POS=21 for SIB5 and SIB_POS=51 for SIB11. Both SIB_REP and SIB_POS for all the SIBs are scaled by ½ compared to the values shown in the radio frame SFN cycle 800.

Figure 13B:
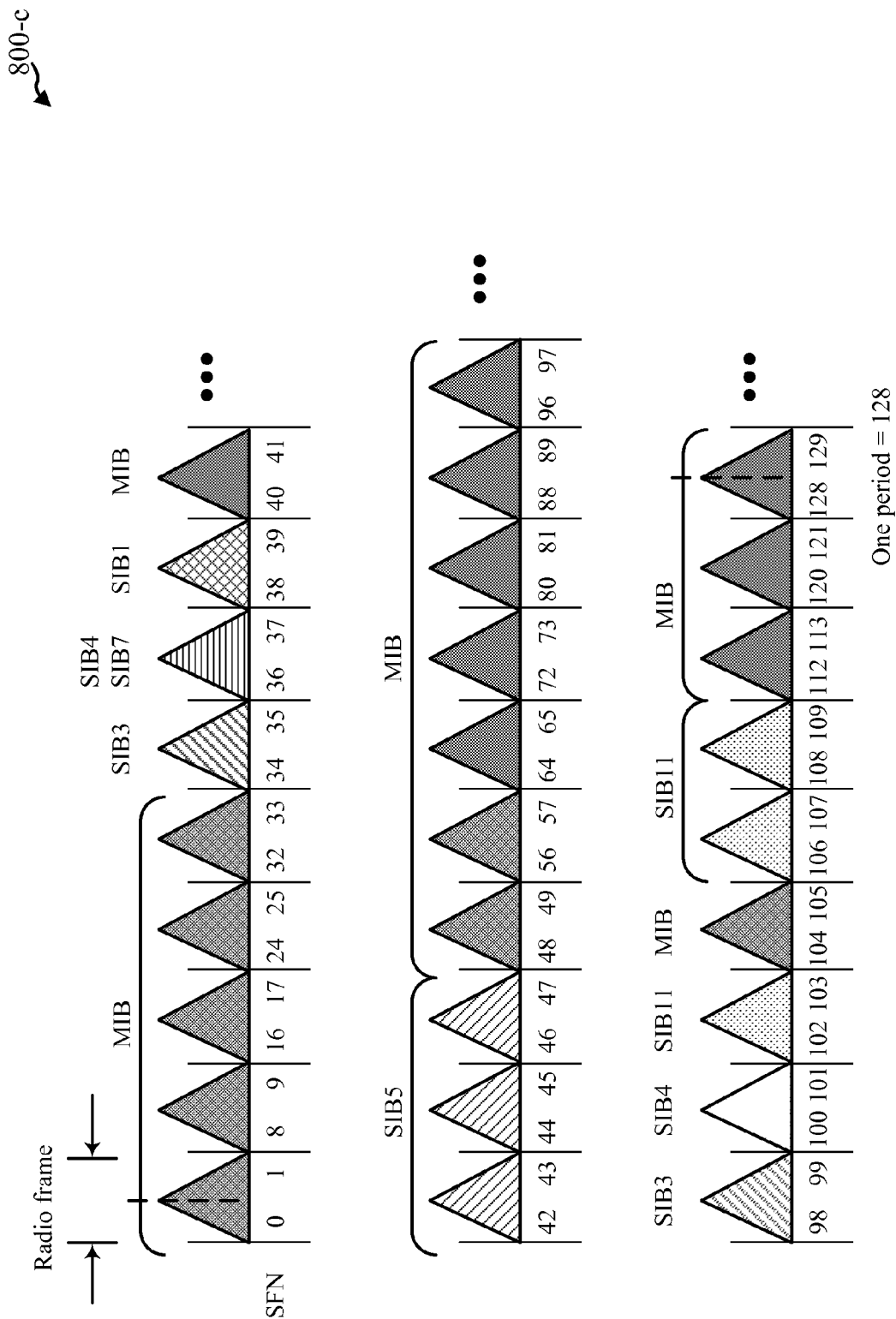
FIG. 13B shows a radio frame cycle with scheduled SIBs in accordance with various embodiments.

Turning to FIG. 13B, a radio frame SFN cycle 800-c for UMTS SIB scheduling is shown that has a 128 frame cycle period and a 20 ms radio frame duration due to time dilation. However, the SFN does not increment every 20 ms radio frame. Instead, the SFN increments every 10 ms. The radio frame SFN cycle 800-c may be another SIB scheduling optimization of the example illustrated in FIG. 11. The radio frame SFN cycle 800-c shows the mapping or scheduling of MIB, SIB1, SIB3, SIB4, SIB5, SIB7, and SIB11 to particular SFNs in the radio frame cycle. The mapping or scheduling of SIBs in the radio frame cycle SFN 800-c is the same as the mapping or scheduling described in the radio frame SFN cycle 800.

Figure 15:
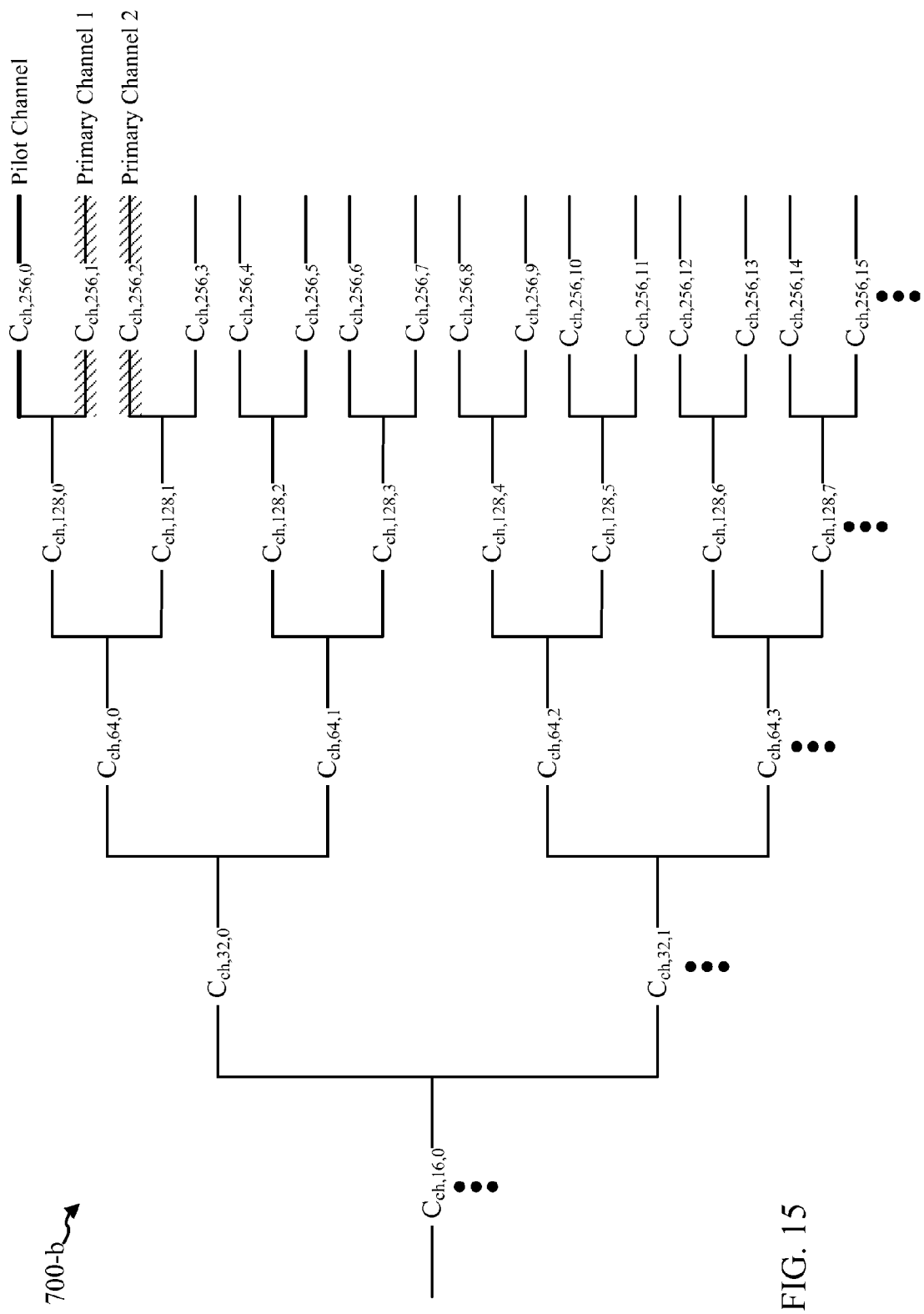
FIG. 15 shows a channelization code tree for broadcast channel transmissions in accordance with various embodiments.

Turning next to FIG. 14, a table 500-c illustrates a third example of modified parameters for a UMTS broadcast channel to facilitate higher user data rates for flexible bandwidth carrier systems employing time dilation when the bandwidth scaling factor N=2. In this case, there are two channelization codes with SF=256 instead of one channelization code as in table 500. This approach allows for the user data rate to remain at 12.3 kbps by adding one more $C_{ch,256}$ code. FIG. 15 illustrates the channelization code tree for this case. Moreover, there may be two approaches to optimize the SIB scheduling of the example illustrated in FIG. 14. A first approach may utilize the 20 ms radio frame SFN cycle 800-b (i.e., SFN increments every 20 ms radio frame) and a second approach may utilize the radio frame SFN cycle 800-c (i.e., the SFN increments every 10 ms).

Turning to FIG. 15, a channelization code tree 700-b is shown for the third example of modified parameters for a UMTS broadcast channel when N=2 described above with respect to FIG. 14. In this instance, the pilot channel, the CPICH, is located in the $C_{ch,256,0}$ code, like in the channelization code tree 700. There are now two primary broadcast channels or PCCPCHs, the primary channel 1, which is located in the $C_{ch,256,1}$ code, and the primary channel 2, which may be located in the $C_{ch,256,2}$ code. The example illustrated in FIG. 15 shows the two primary channels in adjacent $C_{h,256}$ codes, however the primary channel 2 may be located in any other of the $C_{ch,256}$ codes other than the code of the pilot channel and of the primary channel 1.

Turning next to FIG. 16, a table 500-d illustrates a first example of modified parameters for a UMTS broadcast channel to facilitate higher user data rates for flexible bandwidth carrier systems employing time dilation when the bandwidth scaling factor N=4. The channel symbol rate, the channel bit rate, and the user data rate are scaled down by 4 compared to the value of the same parameters in table 500. Moreover, the TTI now corresponds to 80 ms, due to time dilation, from the 20 ms shown in table 500. To compensate for the lower user data rate (i.e., 3.075 kbps vs. 12.3 kbps), the SIB scheduling may be optimized. One optimization approach is to utilize the radio frame SFN cycle 800 in FIG. 8 with the radio frame now being 40 ms instead of 10 ms and the slot being 2.67 ms instead of 0.67 ms, all of which are due to time dilation. The SFN increments every 40 ms radio frame. Another optimization approach is described below with respect to FIG. 17.

Figure 17:
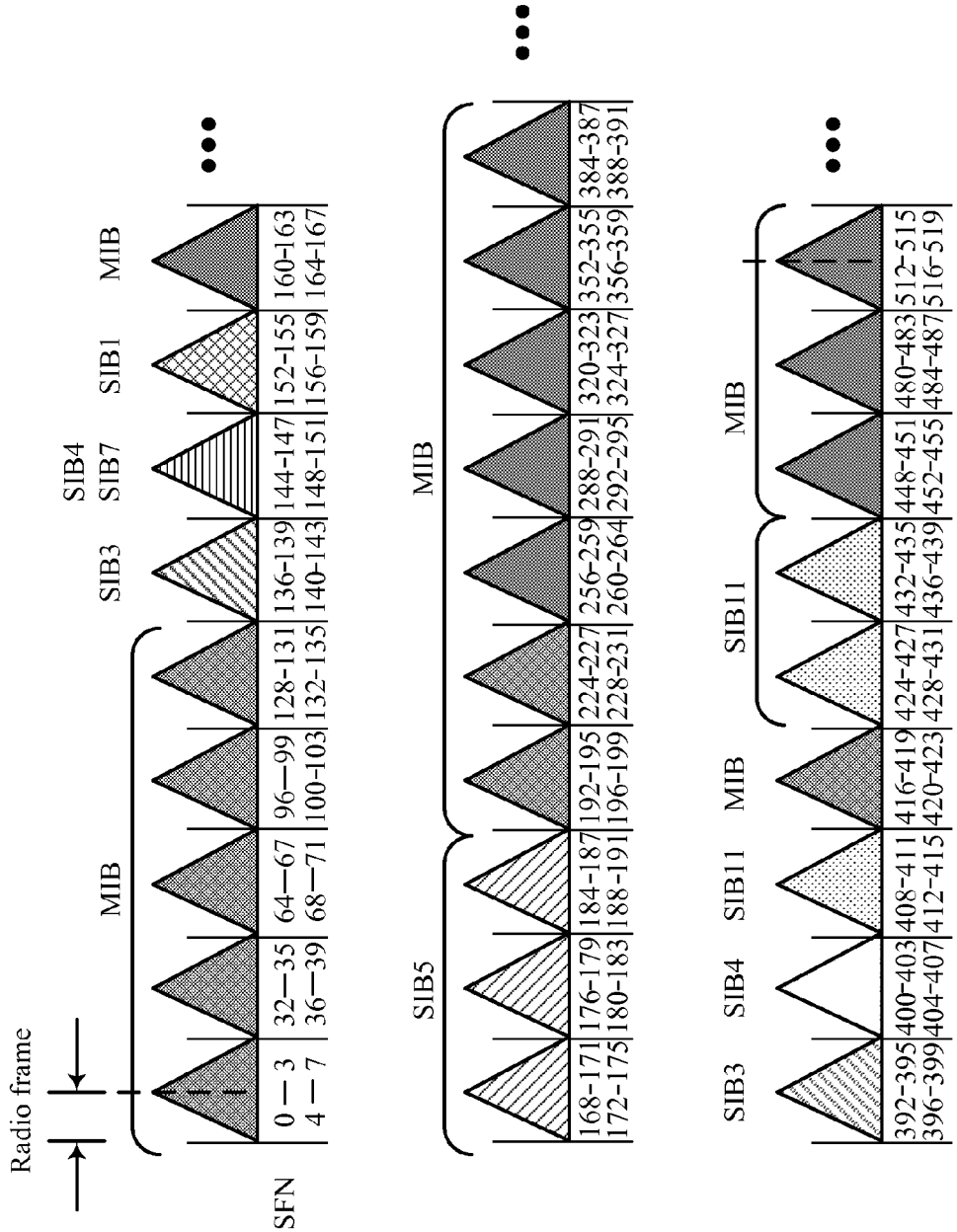
FIG. 17 shows a radio frame cycle with scheduled SIBs in accordance with various embodiments.

Turning now to FIG. 17, a radio frame SFN cycle 800-*d* for UMTS SIB scheduling is shown that has a 512 frame cycle period and a 40 ms radio frame duration due to time dilation. However, the SFN does not increment every 40 ms radio frame. Instead, the SFN increments every 10 ms. The radio frame SFN cycle 800-*d* shows the mapping or scheduling of MIB, SIB1, SIB3, SIB4, SIB5, SIB7, and SIB11 to particular ranges of SFNs in the radio frame cycle. For SIB1, for example, which has a single segment and appears once in the radio frame cycle at frame 152, the scheduling parameters are SEG_COUNT=1, SIB_REP=512, and SIB_POS=152. SIB7 has the same values for SEG_COUNT and SIB_REP, with SIB_POS=144. For SIB3 and SIB4, which have a single segment and appear twice in the radio frame cycle, SEG_COUNT=1 and SIB_REP=256. For SIB3, however, SIB_POS=136 to indicate that the first location of SIB3 is in frame 136, while for SIB4, SIB_POS=144 to indicate that the first location of SIB4 is in frame 144. For SIB5 and SIB11, which have three segments and appear once in the radio frame cycle, SEG_COUNT=3 and SIB_REP=512, with SIB_POS=168 for SIB5 and SIB_POS=408 for SIB11. Both SIB_REP and SIB_POS for all the SIBs are scaled by N=4 compared to the values shown in the radio frame cycle 800.

Turning next to FIG. 18, a table 500-*e* illustrates a second example of modified parameters for a UMTS broadcast channel to facilitate higher user data rates for flexible bandwidth carrier systems employing time dilation when the bandwidth scaling factor N=4. In this case, TTI now corresponds to 40 ms, due to time dilation, instead of 20 ms as in table 500, and the spreading factor (SF=64) is one fourth the value of the spreading factor (SF=256) in table 500. However, there are now two broadcast channel transport blocks per TTI instead of only one as in table 500. This approach allows for the user data rate to remain at 12.3 kbps by changing the channelization code of the primary broadcast channel to a $C_{ch,64,1}$ code. FIG. 12 illustrates the channelization code tree for this case and FIGS. 13A and 13B illustrate SIB scheduling optimizations for this case.

Figure 19:
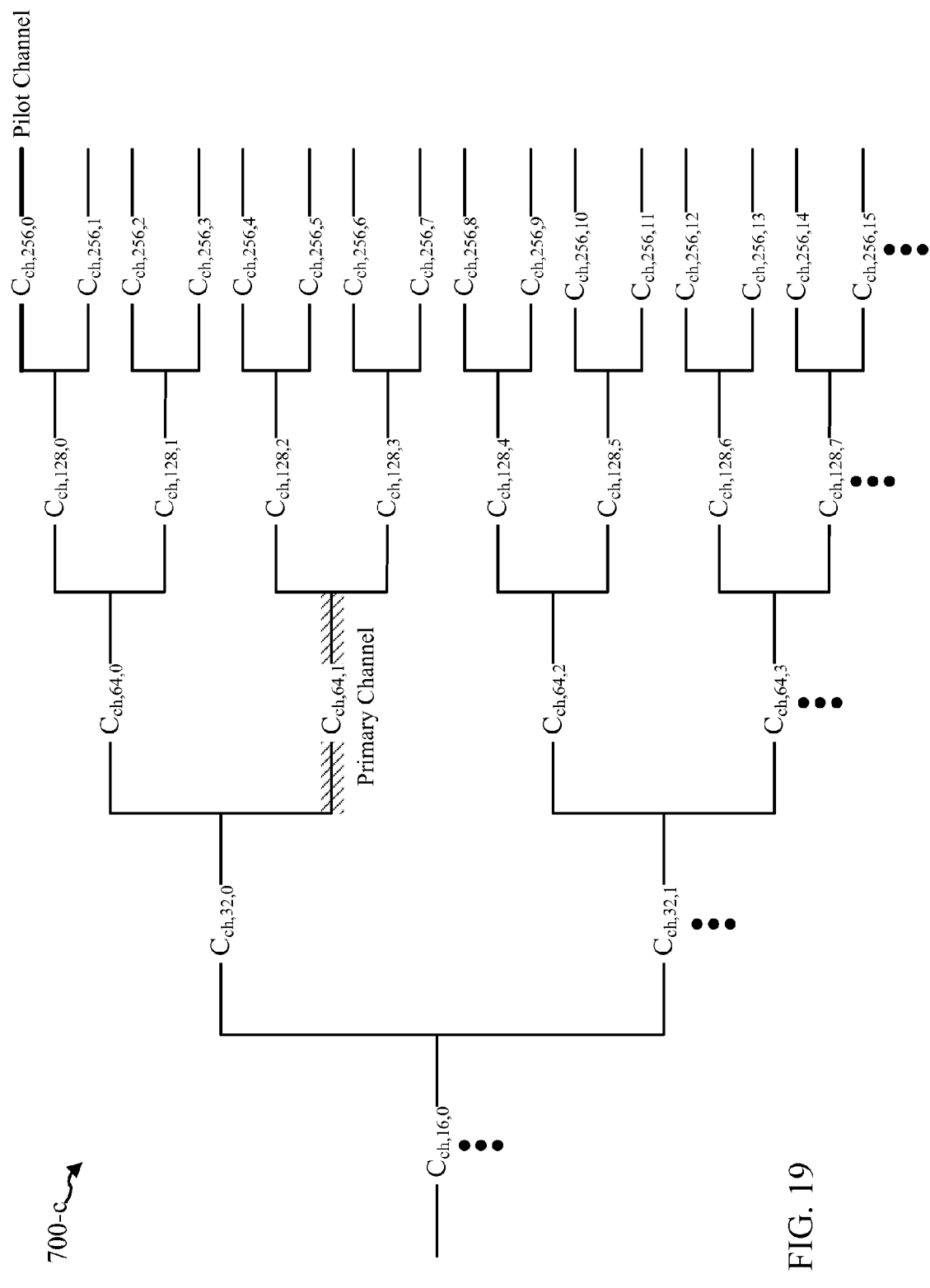
FIG. 19 shows a channelization code tree for broadcast channel transmissions in accordance with various embodiments.

Turning to FIG. 19, a channelization code tree 700-*c* is shown for the second example of modified parameters for a UMTS broadcast channel when N=4 described above with respect to FIG. 18. In this instance, the pilot channel, the CPICH, is located in the $C_{ch,256,0}$ code, like in the channelization code tree 700. The primary broadcast channel, the PCCPCH or primary channel, may now be located in the $C_{ch,64,1}$ code. In some embodiments, the primary broadcast channel is located in any of the $C_{ch,64}$ codes that does not conflict with the pilot channel.

Figure 20A:
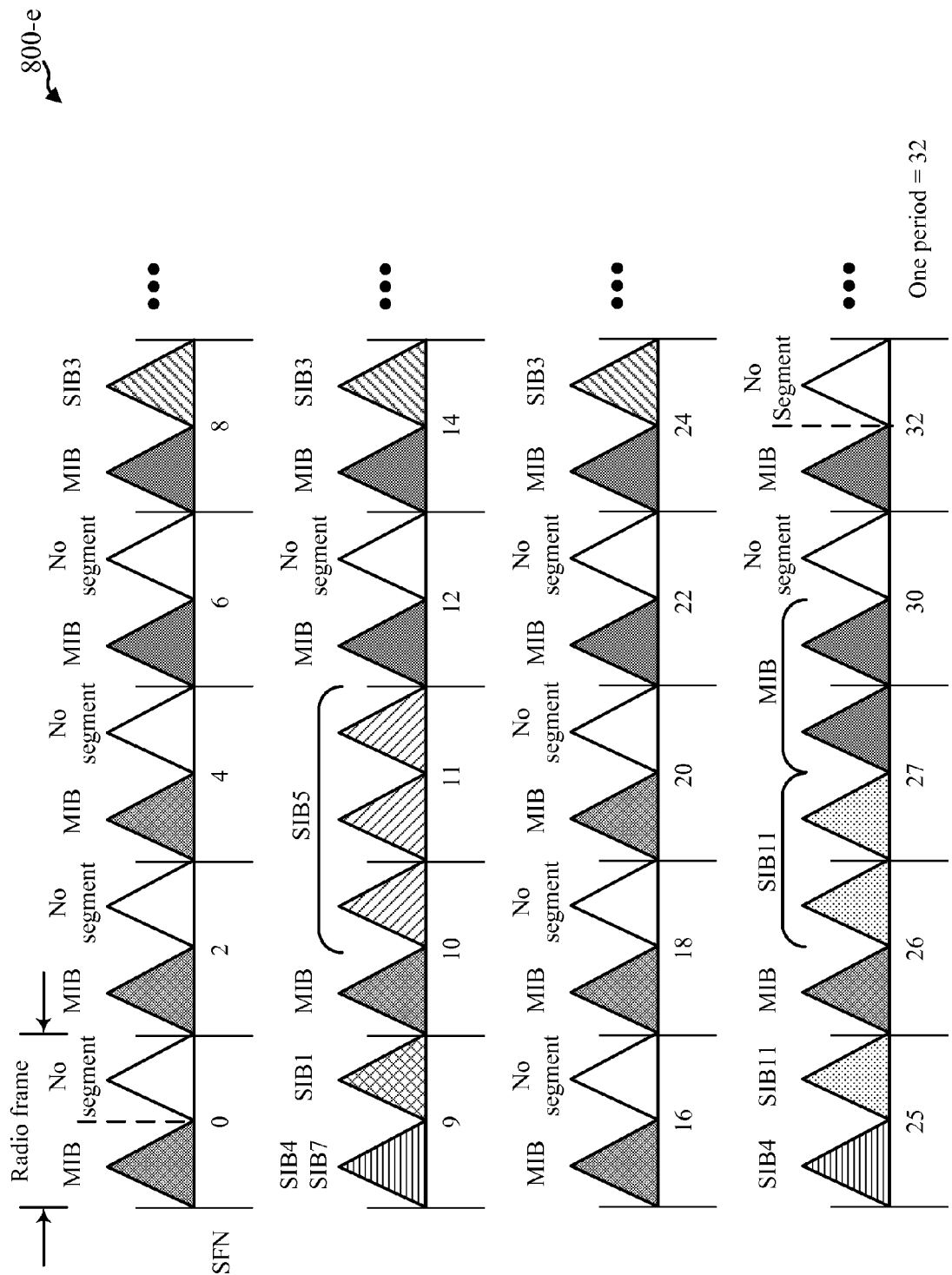
FIG. 20A shows a radio frame cycle with scheduled SIBs in accordance with various embodiments.

Turning now to FIG. 20A, a radio frame SFN cycle 800-*e* for UMTS SIB scheduling is shown that has a 32 frame cycle period, a 40 ms radio frame duration, and two transport blocks (TB1, TB2) for each 40 ms TTI. The SFN increments every 40 ms radio frame. The radio frame SFN cycle 800-*e* may be one SIB scheduling optimization of the example illustrated in FIG. 19. The radio frame SFN cycle 800-*e* shows the mapping or scheduling of MIB, SIB1, SIB3, SIB4, SIB5, SIB7, and SIB11 to particular transport blocks of the SFNs in the radio frame cycle. For SIB 1, for example, which has a single segment and appears once in the radio frame cycle at frame 9 and TB2, the scheduling parameters are SEG_COUNT=1, SIB_REP=32, and SIB_POS=9 (BCH TB2). SIB7 has the same values for SEG_COUNT and SIB_REP, with SIB_POS=9 (BCH TB1). For SIB3 and SIB4, which have a single segment and appear twice in the radio frame cycle, SEG_COUNT=1 and SIB_REP=32. For SIB3, however, SIB_POS=8 (BCH TB2) to indicate that the first location of SIB3 is in frame 8 and TB2, while for SIB4, SIB_POS=9 (BCH TB1) to indicate that the first location of SIB4 is in frame 9 and TB1. For SIB5 and SIB11, which have three segments and appear once in the radio frame cycle, SEG_COUNT=3 and SIB_REP=32, with SIB_POS=10 (BCH TB2) for SIB5 and SIB_POS=11 (BCH TB1) for SIB11. Both SIB_REP and SIB_POS for all the SIBs are scaled by ¼ compared to the values shown in the radio frame cycle 800.

Figure 20B:
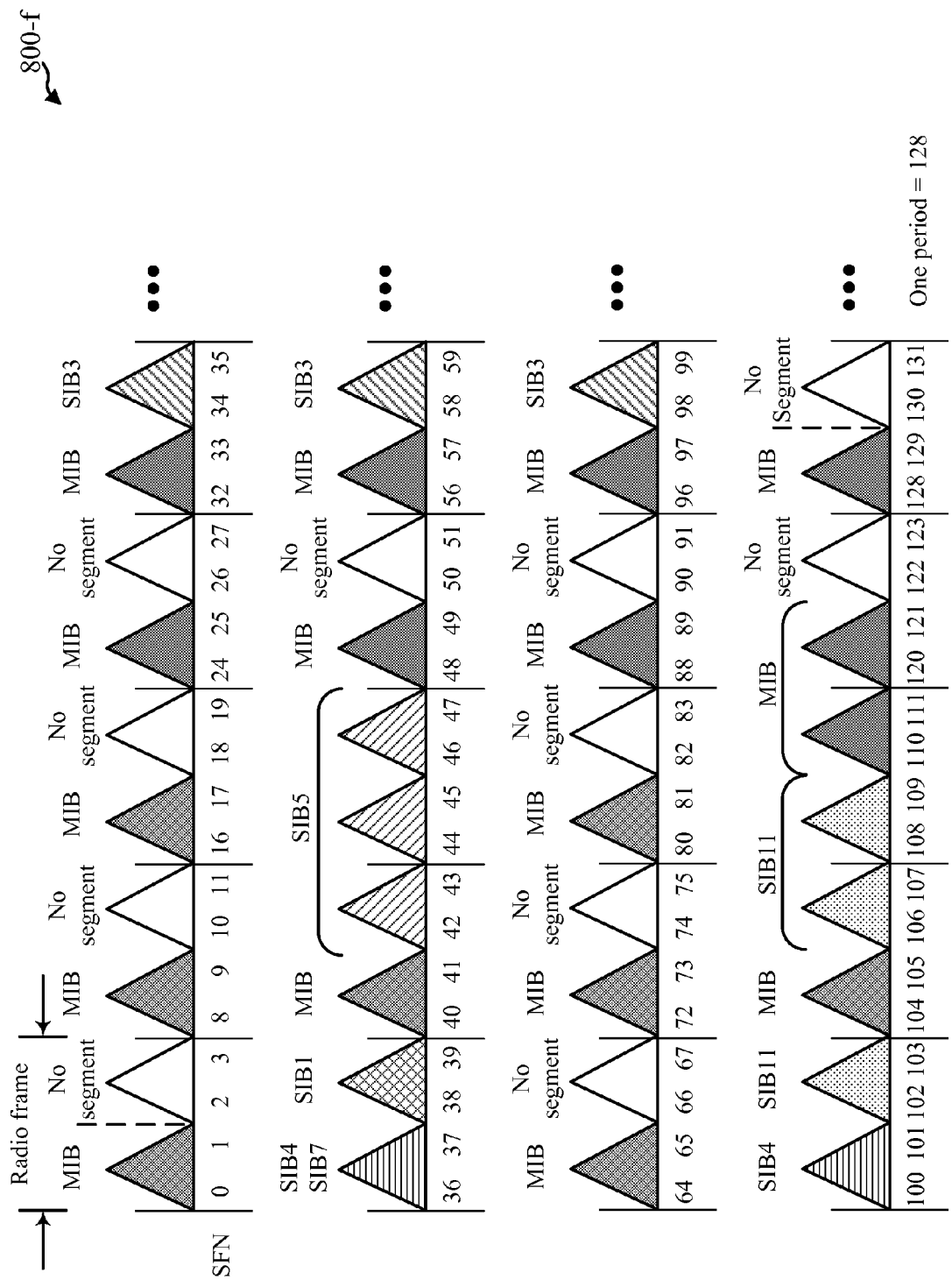
FIG. 20B shows a frame cycle with scheduled SIBs in accordance with various embodiments.

Turning to FIG. 20B, a radio frame SFN cycle 800-*f* for UMTS SIB scheduling is shown that has a 128 frame cycle period and a 40 ms radio frame duration due to time dilation. However, the SFN does not increment every 40 ms radio frame. Instead, the SFN increments every 10 ms. The radio frame cycle 800-*f* may be another SIB scheduling optimization of the example illustrated in FIG. 19. The radio frame cycle 800-*c* shows the mapping or scheduling of MIB, SIB1, SIB3, SIB4, SIB5, SIB7, and SIB11 to particular SFNs in the radio frame cycle. The mapping or scheduling of SIBs in the radio frame cycle 800-*f* is the same as the mapping or scheduling described in the radio frame cycle 800 with additional no segments introduced between MIB segments.

Figure 22:
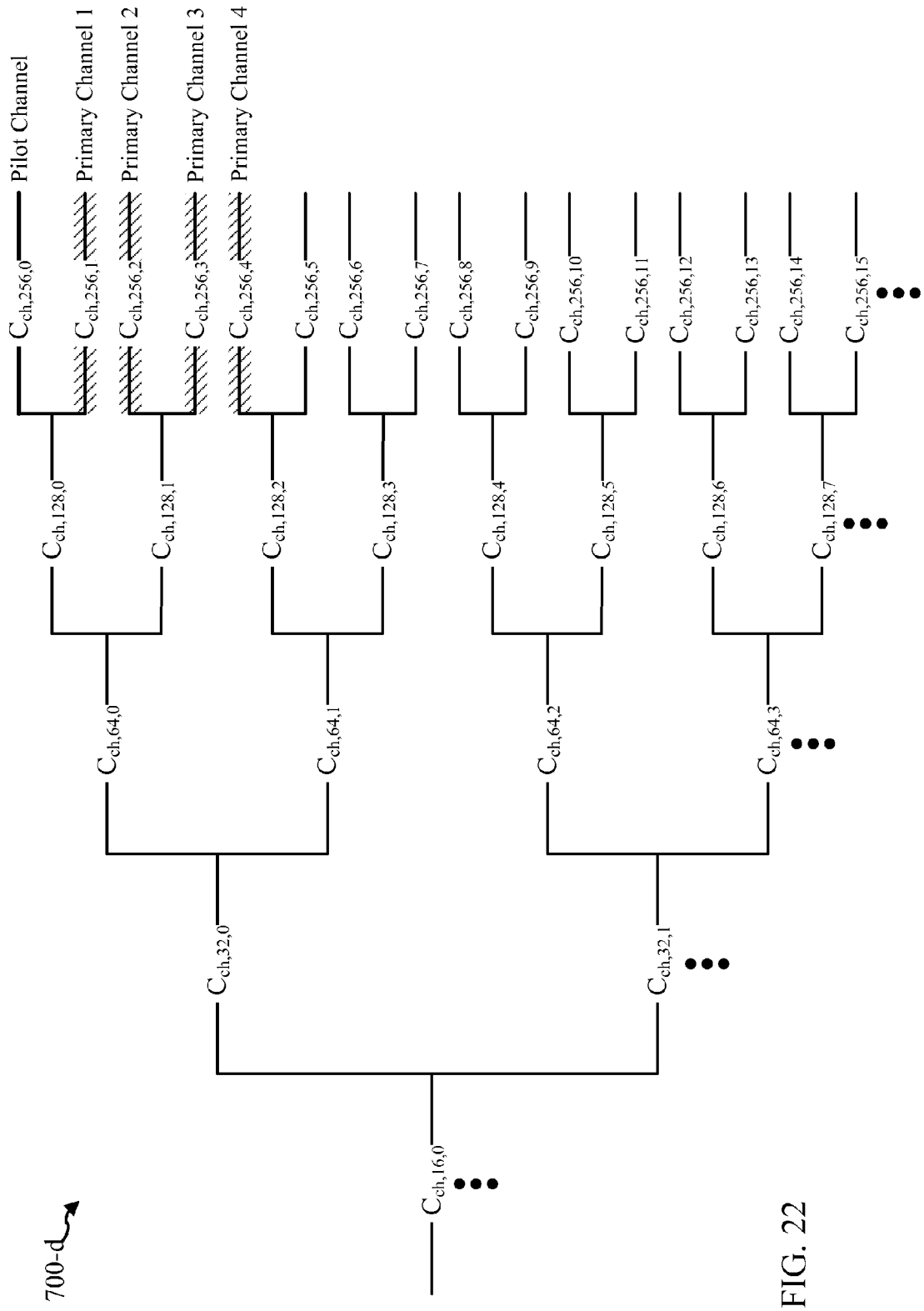
FIG. 22 shows a channelization code tree for broadcast channel transmissions in accordance with various embodiments.

Turning next to FIG. 21, a table 500-*f* illustrates a third example of modified parameters for a UMTS broadcast channel to facilitate higher user data rates for flexible bandwidth carrier systems employing time dilation when the bandwidth scaling factor N=4. In this case, the TTI now corresponds to 40 ms, due to time dilation, compared to 20 ms in table 500, and there are four channelization codes instead of one channelization code as in table 500. However, there are now two broadcast channel transport blocks per TTI as opposed to only one as in table 500. This approach allows for the user data rate to remain at 12.3 kbps by adding three more $C_{ch,256}$ codes. FIG. 22 illustrates the channelization code tree for this case. Moreover, there may be two approaches to optimize the SIB scheduling of the example illustrated in FIG. 21. A first approach may utilize the radio frame SFN cycle 800-*e* (i.e., increments every 40 ms radio frame) and a second approach may utilize the radio frame SFN cycle 800-*f* (i.e., increments every 10 ms radio frame).

Turning to FIG. 22, a channelization code tree 700-*d* is shown for the third example of modified parameters for a UMTS broadcast channel when N=4 described above with respect to FIG. 21. In this instance, the pilot channel, the CPICH, is located in the $C_{ch,256,0}$ code, like in the channelization code tree 700. There are now four primary broadcast channels or PCCPCHs, the primary channel 1, which is located in the $C_{ch,256,1}$ code, the primary channel 2, which may be located in the $C_{ch,256,2}$ code, the primary channel 3, which may be located in the $C_{ch,256,3}$ code, and the primary channel 4, which may be located in the $C_{ch,256,4}$ code. The example illustrated in FIG. 22 shows the four primary channels in adjacent $C_{h,256}$ codes, however, that need not be the case.

Figure 23B:
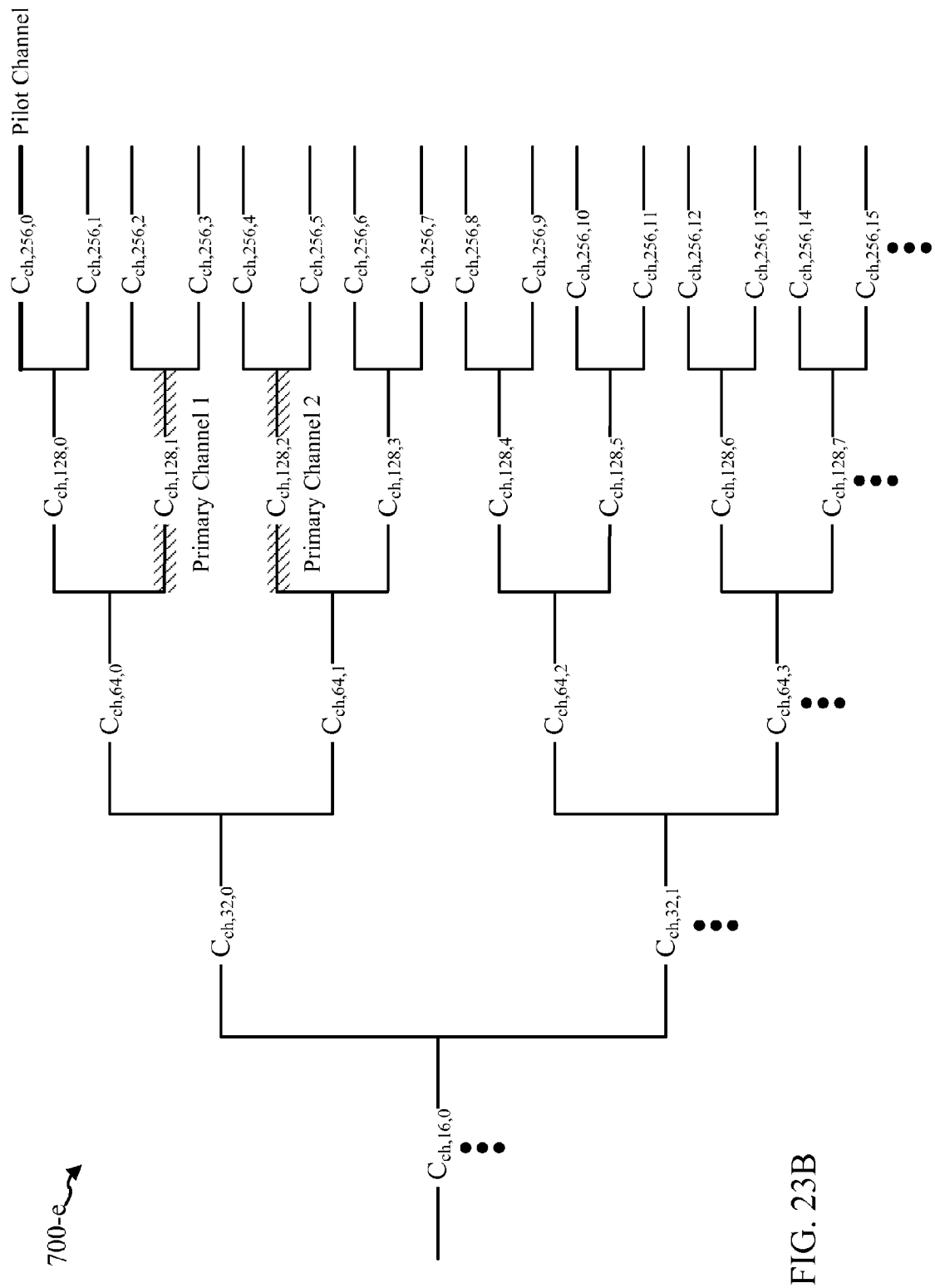
FIG. 23B shows a channelization code tree for broadcast channel transmissions in accordance with various embodiments.

Turning next to FIG. 23A, a table 500-*g* illustrates a fourth example of modified parameters for a UMTS broadcast channel to facilitate higher user data rates for flexible bandwidth carrier systems employing time dilation when the bandwidth scaling factor N=4. In this case, the TTI now corresponds to 40 ms, due to time dilation, compared to 20 ms in table 500, the spreading factor is now 128 instead of 256 as in table 500, and there are two channelization codes instead of one channelization code as in table 500. However, there are now two broadcast channel transport blocks per TTI as opposed to only one as in table 500. This approach allows for the user data rate to remain at 12.3 kbps by utilizing two $C_{ch,128}$ codes. FIG. 23B illustrates the channelization code tree for this case. Moreover, there may be two approaches to optimize the SIB scheduling of the example illustrated in FIG. 23A. A first approach may utilize the radio frame SFN cycle 800-e (i.e., SFN increments every 40 ms radio frame) and a second approach may utilize the radio frame SFN cycle 800-f (i.e., SFN increments every 10 ms).

Turning to FIG. 23B, a channelization code tree 700-e is shown for the fourth example of modified parameters for a UMTS broadcast channel when N=4 described above with respect to FIG. 23A. In this instance, the pilot channel, the CPICH, is located in the $C_{ch,256,0}$ code, like in the channelization code tree 700. There are now two primary broadcast channels or PCCPCHs, the primary channel 1, which may be located in the $C_{ch,128,1}$ code, and the primary channel 2, which may be located in the $C_{ch,128,2}$ code. The example illustrated in FIG. 23B shows the two primary channels in adjacent $C_{h,128}$ codes, however, that need not be the case.

Turning next to FIG. 24A, a table 500-h illustrates a fifth example of modified parameters for a UMTS broadcast channel to facilitate higher user data rates for flexible bandwidth carrier systems employing time dilation when the bandwidth scaling factor N=4. The channel symbol rate, the channel bit rate, and the user data rate are half the value of the same parameters in table 500, and the TTI now corresponds to 40 ms, due to time dilation, from the 20 ms shown in table 500. The spreading factor is now 128 instead of 256 as in table 500 and the channelization code is a $C_{ch,128,1}$ code as in FIG. 12. To compensate for the lower user data rate (i.e., 6.15 kbps vs. 12.3 kbps), the SIB scheduling may be optimized. One optimization approach is to utilize the radio frame SFN cycle 800-b in FIG. 13A with the radio frame now being 40 ms. Another optimization approach is to utilize the radio frame SFN cycle 800-c in FIG. 13B. The example illustrated in FIG. 24A may be utilized when a compromise is made between the desire to increase the user data rate back to 12.3 kbps and limits or restrictions in the amount of power that may be available at a base station to transmit at the higher data rate.

Turning next to FIG. 24B, a table 500-i illustrates a sixth example of modified parameters for a UMTS broadcast channel to facilitate higher user data rates for flexible bandwidth carrier systems employing time dilation when the bandwidth scaling factor N=4. The channel symbol rate, the channel bit rate, and the user data rate are half the value of the same parameters in table 500, and the TTI now corresponds to 40 ms, due to time dilation, from the 20 ms shown in table 500. There are now two channelization codes ($C_{ch,256,1}$ and $C_{ch,256,2}$). To compensate for the lower user data rate (i.e., 6.15 kbps vs. 12.3 kbps), the SIB scheduling may be optimized. One optimization approach is to utilize the radio frame cycle SFN 800-b in FIG. 13A with the radio frame now being 40 ms. Another optimization approach is to utilize the radio frame cycle SFN 800-c in FIG. 13B. The example illustrated in FIG. 24B may be utilized when a compromise is made between the desire to increase the user data rate back to 12.3 kbps and limits or restrictions in the amount of power that may be available at a base station to transmit at the higher data rate.

Figure 25B:
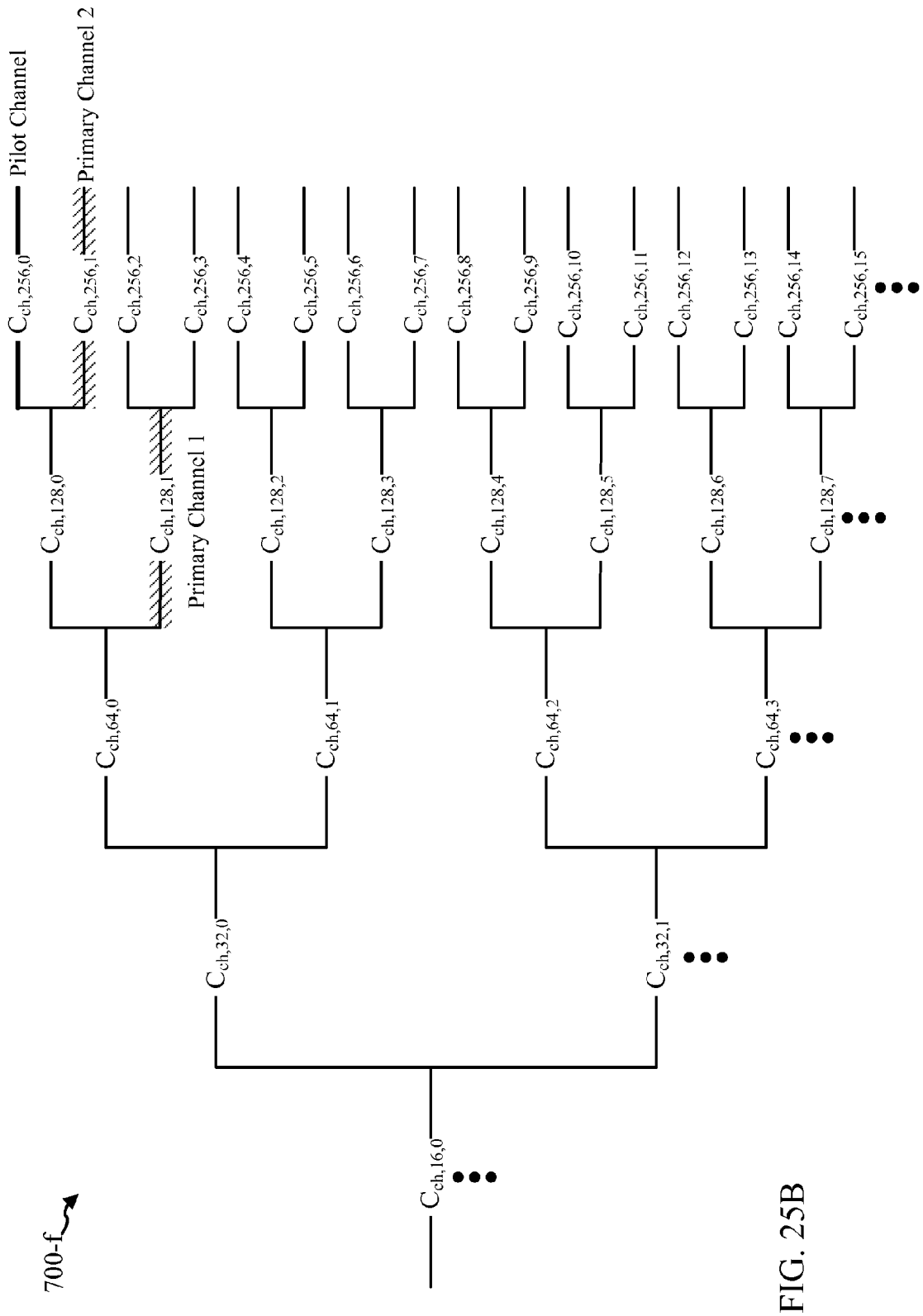
FIG. 25B shows a channelization code tree for broadcast channel transmissions in accordance with various embodiments.

Turning next to FIG. 25A, a table 500-j illustrates a seventh example of modified parameters for a UMTS broadcast channel to facilitate higher user data rates for flexible bandwidth carrier systems employing time dilation when the bandwidth scaling factor N=4. In this case, the transport block size has 370 bits instead of the 246 bits in table 500. The TTI now corresponds to 40 ms, due to time dilation, compared to 20 ms in table 500, the spreading factor now includes SF=128 and SF=256, and there are two channelization codes instead of one channelization code as in table 500, where each channelization code is associated with a different spreading factor. This approach enables the UMTS broadcast channel to at least partially compensate for the lower user data rate (i.e., 9.25 kbps vs. 12.3 kbps) as a compromise to the limits or restrictions in the amount of power that may be available at a base station to transmit at the higher data rate. FIG. 25B illustrates the channelization code tree for this case.

Turning to FIG. 25B, a channelization code tree 700-f is shown for the seventh example of modified parameters for a UMTS broadcast channel when N=4 described above with respect to FIG. 25A. In this instance, the pilot channel, the CPICH, is located in the $C_{ch,256,0}$ code, like in the channelization code tree 700. There are now two primary broadcast channels or PCCPCHs, the primary channel 1, is located in the $C_{ch,128,1}$ code, and the primary channel 2, which may be located in the $C_{ch,256,1}$ code.

Figure 26B:
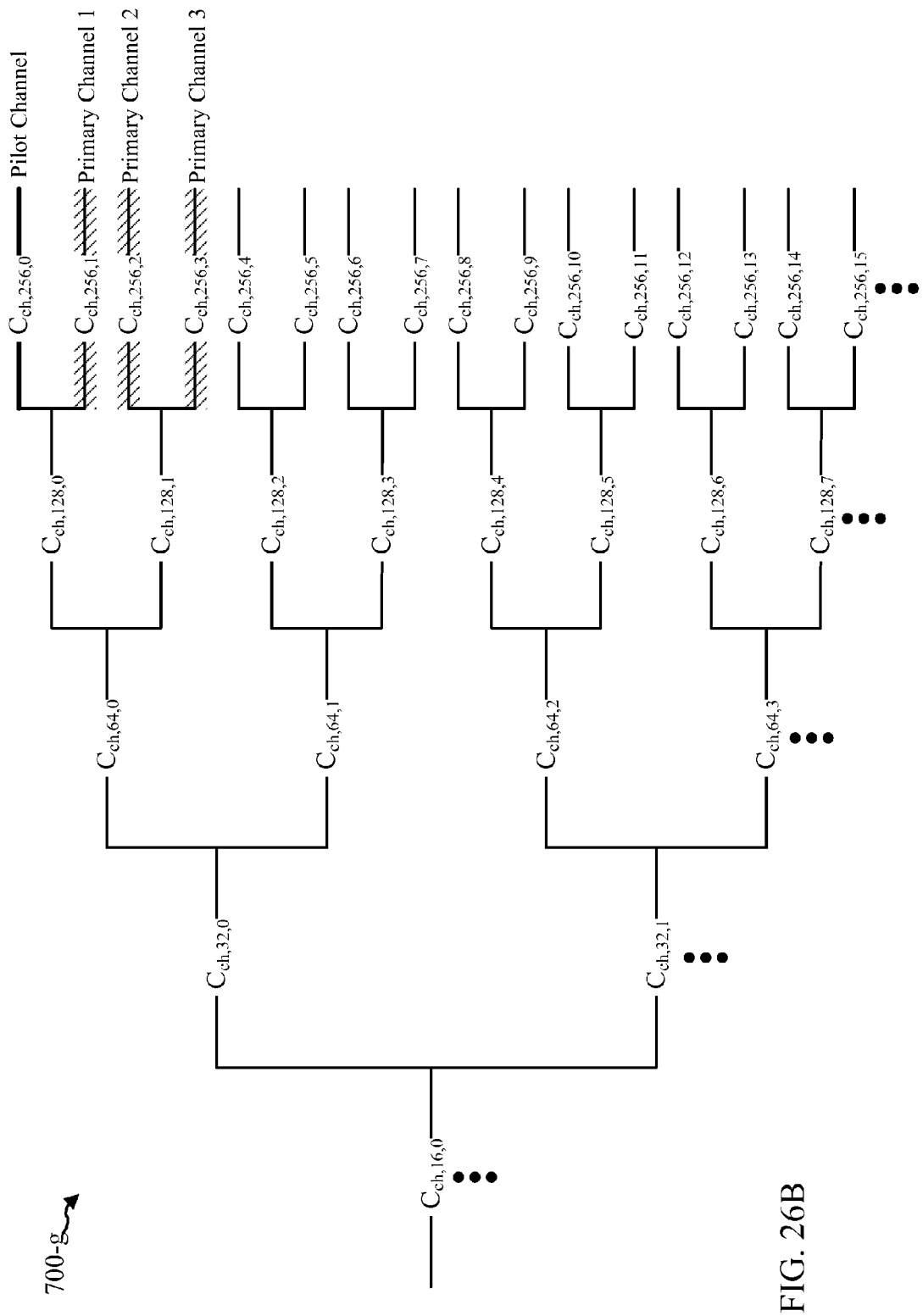
FIG. 26B shows a channelization code tree for broadcast channel transmissions in accordance with various embodiments.

Turning next to FIG. 26A, a table 500-k illustrates an eighth example of modified parameters for a UMTS broadcast channel to facilitate higher user data rates for flexible bandwidth carrier systems employing time dilation when the bandwidth scaling factor N=4. In this case, the transport block size has 370 bits instead of the 246 bits in table 500. The TTI now corresponds to 40 ms, due to time dilation, compared to 20 ms in table 500 and there are three channelization codes instead of one channelization code as in table 500. This approach enables the UMTS broadcast channel to at least partially compensate for the lower user data rate (i.e., 9.25 kbps vs. 12.3 kbps) as a compromise to the limits or restrictions in the amount of power that may be available at a base station to transmit at the higher data rate. FIG. 26B illustrates the channelization code tree for this case.

Turning to FIG. 26B, a channelization code tree 700-g is shown for the eighth example of modified parameters for a UMTS broadcast channel when N=4 described above with respect to FIG. 26A. In this instance, the pilot channel, the CPICH, is located in the $C_{ch,256,0}$ code, like in the channelization code tree 700. There are now three primary broadcast channels or PCCPCHs, the primary channel 1, is located in the $C_{ch,256,1}$ code, the primary channel 2, which may be located in the $C_{ch,256,2}$ code, and the primary channel 3, which may be located in the $C_{ch,256,3}$ code. The example illustrated in FIG. 26B shows the three primary channels in adjacent $C_{h,256}$ codes, however, that need not be the case.

The examples described above with respect to N=2 and N=4 are provided by way of illustration and the same or similar approaches may be utilized for other bandwidth scaling factors, including fractional values of N. Moreover, the examples described above may be implemented in different types of communications devices, including a base station 105 and/or a user equipment 115, to facilitate higher user data rates for flexible bandwidth carrier systems employing time dilation.

Figure 27:
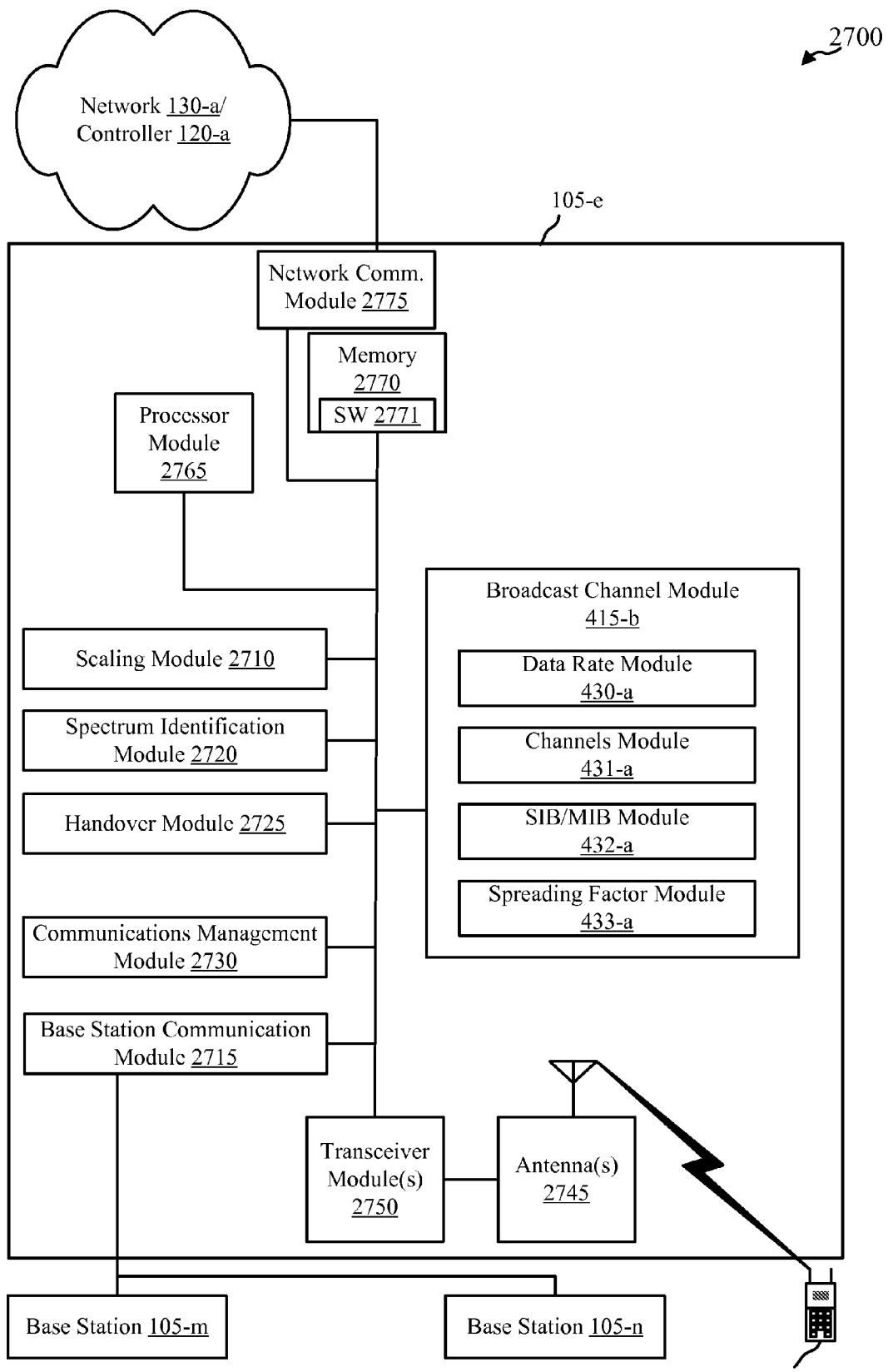
FIG. 27 shows a block diagram of a wireless communications system in accordance with various embodiments.

FIG. 27 shows a block diagram of a communications system 2700 in accordance with various embodiments. This system 2700 may be an example of aspects of the system 100 depicted in FIG. 1, systems 200-a and 200-b of FIGS. 2A and 2B, and/or system 300 of FIG. 3. The base station 105-e may include antennas 2745, a transceiver module 2750, memory 2770, and a processor module 2765, which each may be in communication, directly or indirectly, with each other (e.g., over one or more buses). The transceiver module 2750 may be configured to communicate bi-directionally, via the antennas 2745, with the user equipment 115-*e*, which may be a multi-mode user equipment. The transceiver module 2750 (and/or other components of the base station 105-*e*) may also be configured to communicate bi-directionally with one or more networks. In some cases, the base station 105-*e* may communicate with the network 130-*a* and/or controller 120-*a* through network communications module 2775. Base station 105-*e* may be an example of an eNodeB base station, a Home eNodeB base station, a NodeB base station, and/or a Home NodeB base station. Controller 120-*a* may be integrated into base station 105-*e* in some cases, such as with an eNodeB base station.

Base station 105-*e* may also communicate with other base stations 105, such as base station 105-*m* and base station 105-*n*. Each of the base stations 105 may communicate with user equipment 115-*e* using different wireless communications technologies, such as different Radio Access Technologies. In some cases, base station 105-*e* may communicate with other base stations such as 105-*m* and/or 105-*n* utilizing base station communication module 2715. In some embodiments, base station communication module 2715 may provide an X2 interface within an LTE wireless communication technology to provide communication between some of the base stations 105. In some embodiments, base station 105-*e* may communicate with other base stations through controller 120-*a* and/or network 130-*a*.

The memory 2770 may include random access memory (RAM) and read-only memory (ROM). The memory 2770 may also store computer-readable, computer-executable software code 2771 containing instructions that are configured to, when executed, cause the processor module 2765 to perform various functions described herein (e.g., call processing, database management, message routing, etc.). Alternatively, the software code 2771 may not be directly executable by the processor module 2765 but be configured to cause the computer, e.g., when compiled and executed, to perform functions described herein.

The processor module 2765 may include an intelligent hardware device, e.g., a central processing unit (CPU) such as those made by Intel® Corporation or AMD®, a microcontroller, an application-specific integrated circuit (ASIC), etc. The processor module 2765 may include a speech encoder (not shown) configured to receive audio via a microphone, convert the audio into packets (e.g., 20 ms in length) representative of the received audio, provide the audio packets to the transceiver module 2750, and provide indications of whether a user is speaking. Alternatively, an encoder may only provide packets to the transceiver module 2750, with the provision or withholding/suppression of the packet itself providing the indication of whether a user is speaking.

The transceiver module 2750 may include a modem configured to modulate the packets and provide the modulated packets to the antennas 2745 for transmission, and to demodulate packets received from the antennas 2745. While some examples of the base station 105-*e* may include a single antenna 2745, the base station 105-*e* preferably includes multiple antennas 2745 for multiple links which may support carrier aggregation. For example, one or more links may be used to support macro communications with user equipment 115-*e*.

According to the architecture of FIG. 27, the base station 105-*e* may further include a communications management module 2730. The communications management module 2730 may manage communications with other base stations 105. By way of example, the communications management module 2730 may be a component of the base station 105-*e* in communication with some or all of the other components of the base station 105-*e* via a bus. Alternatively, functionality of the communications management module 2730 may be implemented as a component of the transceiver module 2750, as a computer program product, and/or as one or more controller elements of the processor module 2765.

The components for base station 105-*e* may be configured to implement aspects discussed above with respect to devices 400 and 400-*a* in FIGS. 4A and 4B and may not be repeated here for the sake of brevity. For example, the broadcast channel module 415-*b* may be an example of the broadcast channel modules 400 and 400-*a* of FIGS. 4A and 4B. In this regard, the data rate module 430-*a*, the channels module 431-*a*, the SIB/MIB module 432-*a*, and/or the spreading factor module 433-*a* may be examples of the corresponding modules shown in FIG. 4B.

The base station 105-*e* may also include a spectrum identification module 2720. The spectrum identification module 2720 may be utilized to identify spectrum available for flexible waveforms. In some embodiments, a handover module 2725 may be utilized to perform handover procedures of the user equipment 115-*e* from one base station 105 to another. For example, the handover module 2725 may perform a handover procedure of the user equipment 115-*e* from base station 105-*e* to another where normal waveforms are utilized between the user equipment 115-*e* and one of the base stations and flexible waveforms are utilized between the user equipment and another base station. A scaling module 2710 may be utilized to scale and/or alter chip rates to generate flexible waveforms.

In some embodiments, the transceiver module 2750 in conjunction with antennas 2745, along with other possible components of base station 105-*e*, may transmit information regarding flexible waveforms and/or bandwidth scaling factors from the base station 105-*e* to the user equipment 115-*e*, to other base stations 105-*m*/105-*n*, or core network 130-*a*. In some embodiments, the transceiver module 2750 in conjunction with antennas 2745, along with other possible components of base station 105-*e*, may transmit information to the user equipment 115-*e*, to other base stations 105-*m*/105-*n*, or core network 130-*a*, such as flexible waveforms and/or bandwidth scaling factors, such that these devices or systems may utilize flexible waveforms. Moreover, in some embodiments, the transceiver module 2750 in conjunction with antennas 2745, along with other possible components of base station 105-*e*, may transmit information to the user equipment 115-*e*, to other base stations 105-*m*/105-*n*, or core network 130-*a*, such as broadcast information through one or more broadcast channels at a target rate. The target rate may be a compensated data rate for broadcast channels of flexible bandwidth carrier systems employing time dilation.

Figure 28:
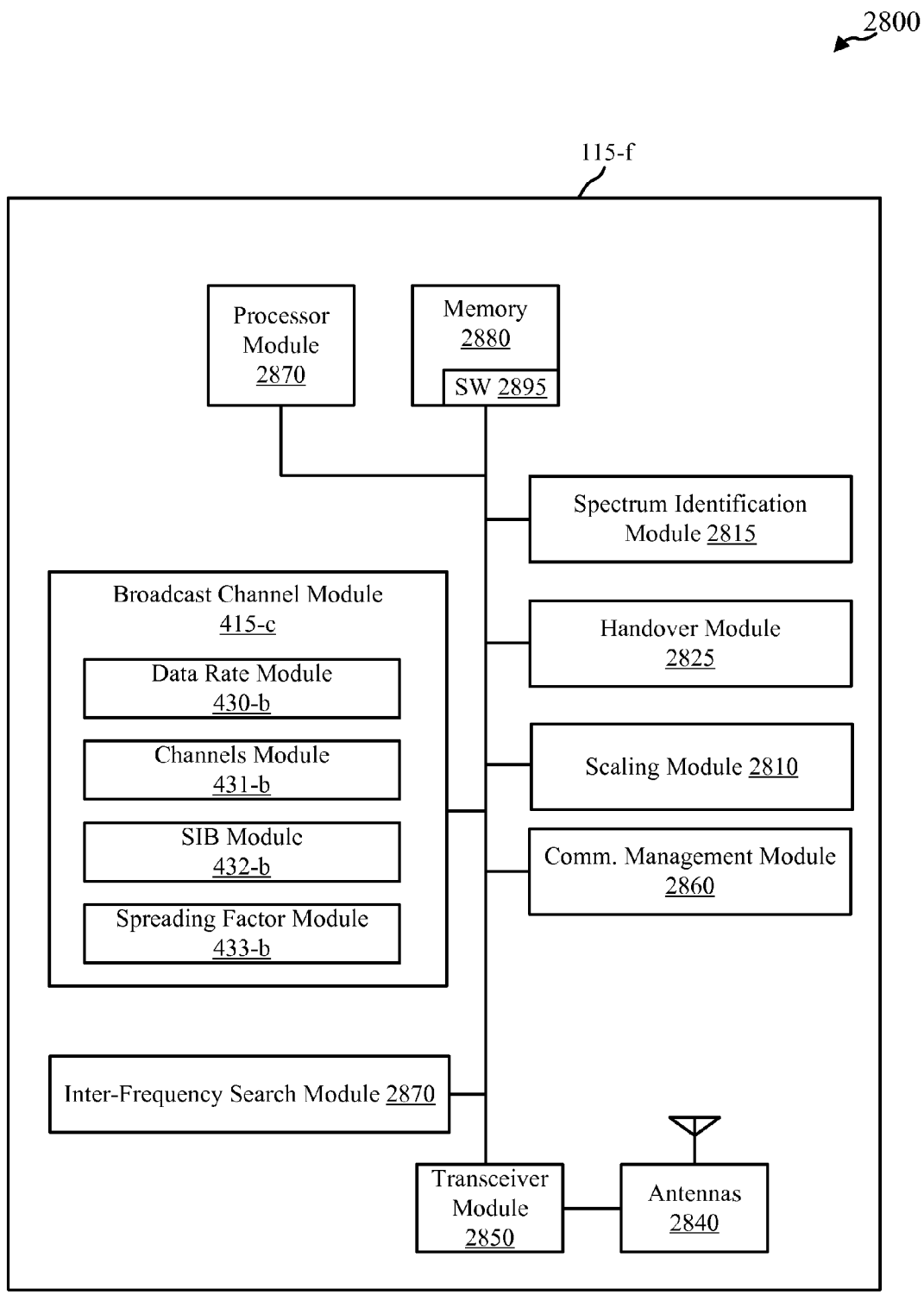
FIG. 28 shows a block diagram of a user equipment in accordance with various embodiments.

FIG. 28 is a block diagram 2800 of a user equipment 115-*f* configured to facilitate higher data rates for broadcast channel transmissions in flexible bandwidth carrier systems in accordance with various embodiments. The user equipment 115-*f* may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-*f* may have an internal power supply (not shown), such as a small battery, to facilitate mobile operation. In some embodiments, the user equipment 115-*f* may be the user equipment 115 of FIG. 1, FIGS. 2A and 2B, FIG. 3, FIG. 27, and/or FIG. 29, and/or the devices 400 and 400-*a* of FIGS. 4A and 4B. The user equipment 115-*f* may be a multi-mode user equipment. The user equipment-f may be referred to as a wireless communications device or a user equipment in some cases.

The user equipment 115-f may include antennas 2840, a transceiver module 2850, memory 2880, and a processor module 2870, which each may be in communication, directly or indirectly, with each other (e.g., via one or more buses). The transceiver module 2850 may be configured to communicate bi-directionally, via the antennas 2840 and/or one or more wired or wireless links, with one or more networks, as described above. For example, the transceiver module 2850 may be configured to communicate bi-directionally with base stations 105 of FIG. 1, FIGS. 2A and 2B, FIG. 3, FIG. 27, and/or FIG. 29. The transceiver module 2850 may include a modem configured to modulate the packets and provide the modulated packets to the antennas 2840 for transmission, and to demodulate packets received from the antennas 2840. While the user equipment 115-f may include a single antenna, the user equipment 115-f will typically include multiple antennas 2840 for multiple links.

The memory 2880 may include random access memory (RAM) and read-only memory (ROM). The memory 2880 may store computer-readable, computer-executable software code 2895 containing instructions that are configured to, when executed, cause the processor module 2870 to perform various functions described herein (e.g., call processing, database management, message routing, etc.). Alternatively, the software code 2895 may not be directly executable by the processor module 2870 but be configured to cause the computer (e.g., when compiled and executed) to perform functions described herein.

The processor module 2870 may include an intelligent hardware device, e.g., a central processing unit (CPU) such as those made by Intel® Corporation or AMD®, a microcontroller, an application-specific integrated circuit (ASIC), etc. The processor module 2870 may include a speech encoder (not shown) configured to receive audio via a microphone, convert the audio into packets (e.g., 30 ms in length) representative of the received audio, provide the audio packets to the transceiver module 2850, and provide indications of whether a user is speaking. Alternatively, an encoder may only provide packets to the transceiver module 2850, with the provision or withholding/suppression of the packet itself providing the indication of whether a user is speaking.

According to the architecture of FIG. 28, the user equipment 115-f may further include a communications management module 2860. The communications management module 2860 may manage communications with other user equipment 115. By way of example, the communications management module 2860 may be a component of the user equipment 115-f in communication with some or all of the other components of the user equipment 115-f via a bus. Alternatively, functionality of the communications management module 2860 may be implemented as a component of the transceiver module 2850, as a computer program product, and/or as one or more controller elements of the processor module 2870.

The components for user equipment 115-f may be configured to implement aspects discussed above with respect to devices 400 and 400-a of FIGS. 4A and 4B, and may not be repeated here for the sake of brevity. For example, the broadcast channel module 415-c may be an example of the broadcast channel modules 415 and 415-a of FIGS. 4A and 4B. In this regard, the data rate module 430-b, the channels module 431-b, the SIB/MIB module 432-b, and the spreading factor module 433-b may be examples of the corresponding modules shown in FIG. 4B.

The user equipment 115-f may also include a spectrum identification module 2815. The spectrum identification module 2815 may be utilized to identify spectrum available for flexible waveforms. In some embodiments, a handover module 2825 may be utilized to perform handover procedures of the user equipment 115-f from one base station to another. For example, the handover module 2825 may perform a handover procedure of the user equipment 115-f from one base station to another where normal waveforms are utilized between the user equipment 115-f and one of the base stations and flexible waveforms are utilized between the user equipment and another base station. A scaling module 2810 may be utilized to scale and/or alter chip rates to generate flexible waveforms. An inter-frequency search module 2870 may be utilized to perform measurements that allow the user equipment 115-f to identify candidate cells and select one of those cells for communication.

In some embodiments, the transceiver module 2850 in conjunction with antennas 2840, along with other possible components of user equipment 115-f, may transmit information regarding flexible waveforms and/or bandwidth scaling factors from the user equipment 115-f to base stations or a core network. In some embodiments, the transceiver module 2850, in conjunction with antennas 2840 along with other possible components of user equipment 115-f, may transmit information, such as flexible waveforms and/or bandwidth scaling factors, to base stations or a core network such that these devices or systems may utilize flexible waveforms. Moreover, in some embodiments, the transceiver module 2850 in conjunction with antennas 2840, along with other possible components of user equipment 115-f, may receive broadcast information through one or more broadcast channels at a target rate. The target rate may be a compensated data rate for broadcast channels of flexible bandwidth carrier systems employing time dilation.

Figure 29:
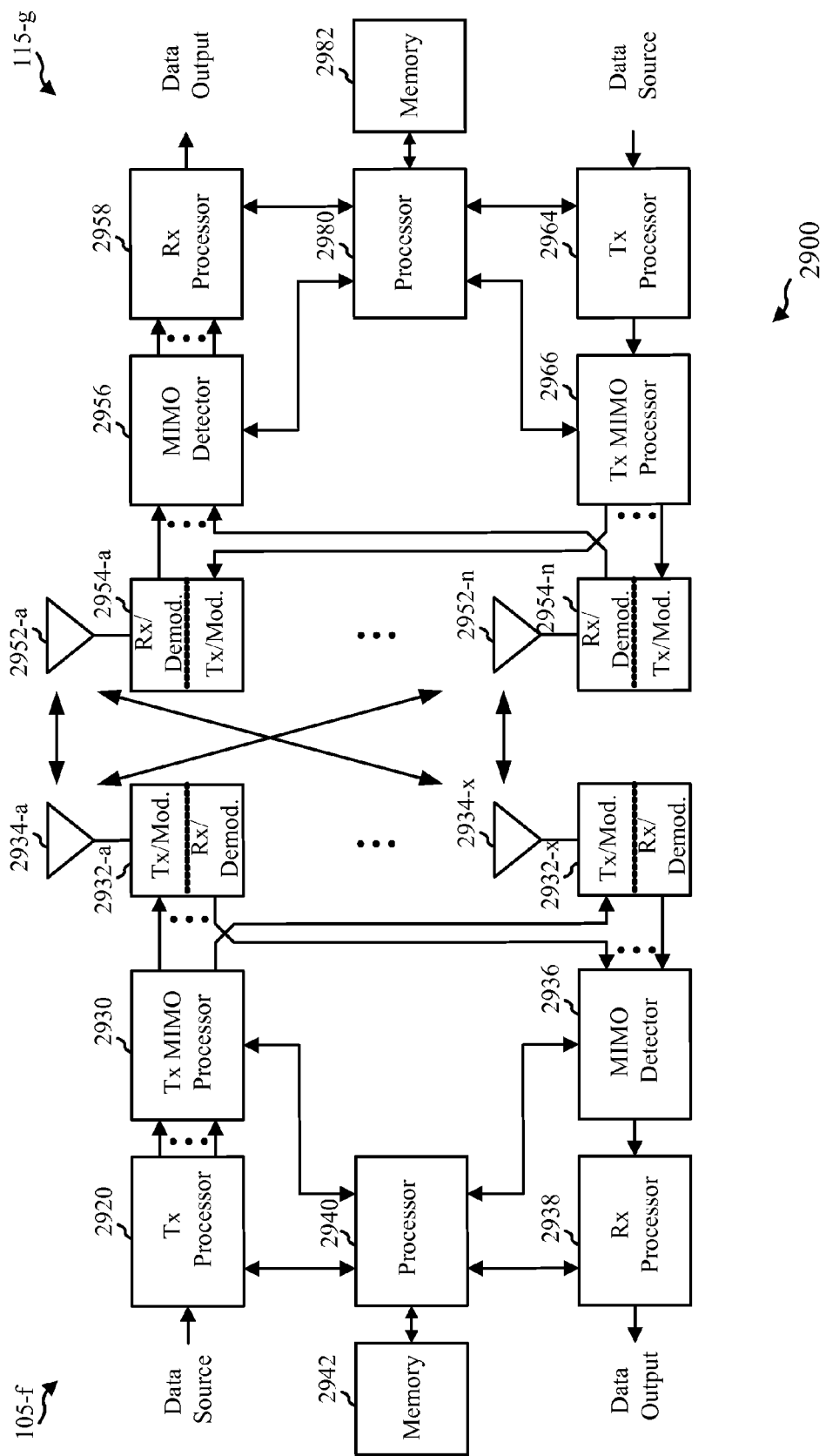
FIG. 29 shows a block diagram of a wireless communications system that includes a base station and a user equipment in accordance with various embodiments.

FIG. 29 is a block diagram of a system 2900 including a base station 105-f and a user equipment 115-g in accordance with various embodiments. This system 2900 may be an example of the system 100 of FIG. 1, systems 200-a and 200-b of FIGS. 2A and 2B, and/or the system 300 of FIG. 3. The base station 105-f may be equipped with antennas 2934-a through 2934-x, and the user equipment 115-g may be equipped with antennas 2952-a through 2952-n. At the base station 105-f, a transmitter processor 2920 may receive data from a data source.

The transmitter processor 2920 may process the data. The transmitter processor 2920 may also generate reference symbols, and a cell-specific reference signal. A transmit (TX) multiple-input multiple-output (MIMO) processor 2930 may perform spatial processing (e.g., precoding) on data symbols, control symbols, and/or reference symbols, if applicable, and may provide output symbol streams to the transmit modulators 2932-a through 2932-x. Each modulator 2932 may process a respective output symbol stream (e.g., for OFDM, etc.) to obtain an output sample stream. Each modulator 2932 may further process (e.g., convert to analog, amplify, filter, and upconvert) the output sample stream to obtain a downlink (DL) signal. In one example, DL signals from modulators 2932-a through 2932-x may be transmitted via the antennas 2934-a through 2934-x, respectively. The transmitter processor 2920 may receive information from a processor 2940. The processor 2940 may be configured to generate flexible waveforms through altering a chip rate and/or utilizing a bandwidth scaling factor; this may be done dynamically in some cases. The processor 2940 may also provide for different alignment and/or offsetting procedures. The processor 2940 may also utilize scaling and/or chip rate information to perform measurements on the other subsystems, perform handoffs to the other subsystems, perform reselection, etc. The processor 2940 may invert the effects of time stretching associated with the use of flexible bandwidth through parameter scaling. In some embodiments, the processor 2940 may be implemented as part of a general processor, the transmitter processor 2920, and/or the receiver processor 2938. The processor 2940 may be coupled with a memory 2942.

In some embodiments, processor 2940 and/or Tx processor 2920 may be configured to facilitate higher data rates in broadcast channel transmissions. For example, processor 2940 may be configured to identify a target rate for a broadcast channel of a first bandwidth carrier system, where the target rate is higher than a scaled rate for the broadcast channel. The scaled rate may be a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the first bandwidth carrier system is a flexible bandwidth carrier system, the bandwidth scaling factor corresponds to the flexible bandwidth carrier system, and the second bandwidth carrier system is a normal bandwidth carrier system. In some embodiments, the target rate refers to an information data rate and the information data rate is substantially the same as the rate for the broadcast channel of the second bandwidth carrier system. The processor 2940 and/or Tx processor 2920 may be configured to identify and/or utilize different optimized schedules for system and master information transmission, different channelization codes and channels, and/or different scaled spreading factors to facilitate higher data rates in broadcast channel transmissions. Broadcast information of the first bandwidth carrier system may be transmitted at the target rate to one or more user equipment 115-*g* through Tx processor 2920.

At the user equipment 115-*g*, the user equipment antennas 2952-*a* through 2952-*n* may receive the DL signals from the base station 105-*f* and may provide the received signals to the demodulators 2954-*a* through 2954-*n*, respectively. Each demodulator 2954 may condition (e.g., filter, amplify, downconvert, and digitize) a respective received signal to obtain input samples. Each demodulator 2954 may further process the input samples (e.g., for OFDM, etc.) to obtain received symbols. A MIMO detector 2956 may obtain received symbols from all the demodulators 2954-*a* through 2954-*n*, perform MIMO detection on the received symbols if applicable, and provide detected symbols. A receive processor 2958 may process (e.g., demodulate, deinterleave, and decode) the detected symbols, providing decoded data for the user equipment 115-*g* to a data output, and provide decoded control information to a processor 2980, or memory 2982.

On the uplink (UL), at the user equipment 115-*g*, a transmitter processor 2964 may receive and process data from a data source. The transmitter processor 2964 may also generate reference symbols for a reference signal. The symbols from the transmitter processor 2964 may be precoded by a transmit MIMO processor 2966 if applicable, further processed by the demodulators 2954-*a* through 2954-*n* (e.g., for SC-FDMA, etc.), and be transmitted to the base station 105-*f* in accordance with the transmission parameters received from the base station 105-E The transmitter processor 2964 may also be configured to generate flexible waveforms through altering a chip rate and/or utilizing a bandwidth scaling factor; this may be done dynamically in some cases. The transmitter processor 2964 may receive information from processor 2980. The processor 2980 may provide for different alignment and/or offsetting procedures. The processor 2980 may also utilize scaling and/or chip rate information to perform measurements on the other subsystems, perform handoffs to the other subsystems, perform reselection, etc. The processor 2980 may invert the effects of time stretching associated with the use of flexible bandwidth through parameter scaling. At the base station 105-*f*, the UL signals from the user equipment 115-*g* may be received by the antennas 2934, processed by the demodulators 2932, detected by a MIMO detector 2936 if applicable, and further processed by a receive processor. The receive processor 2938 may provide decoded data to a data output and to the processor 2980. In some embodiments, the processor 2980 may be implemented as part of a general processor, the transmitter processor 2964, and/or the receiver processor 2958.

In some embodiments, processor 2980 and/or RX processor 2958 may be configured for receiving broadcast information transmitted through the broadcast channel of the first bandwidth carrier system at the target rate. The processor 2980 and/or RX processor 2958 may be configured to identify and/or utilize different optimized schedules for system and master information transmission, different channelization codes and channels, and/or different scaled spreading factors to facilitate higher data rates in broadcast channel transmissions. The processor 2980 and/or RX processor 2958 may process the broadcast information to identify candidate cells for communication with the user equipment.

Figure 30A:
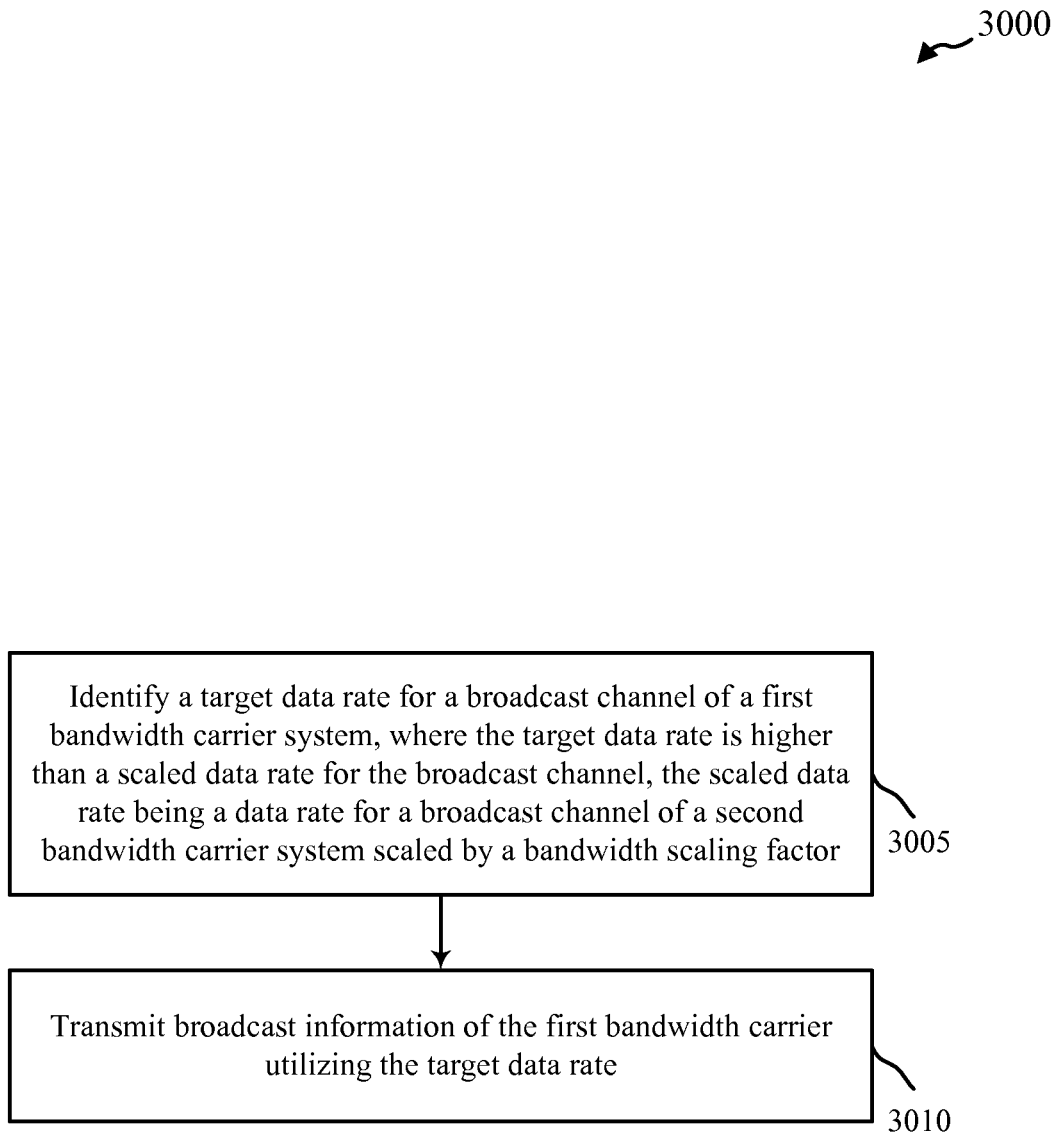
FIG. 30A shows a flow diagram of a method utilized by some base stations for providing higher data rate for broadcast channels in flexible bandwidth carrier systems in accordance with various embodiments.

Turning to FIG. 30A, a flow diagram is shown of a method 3000 for providing higher data rate for broadcast channels in flexible bandwidth carrier systems in accordance with various embodiments. Method 3000 may be implemented utilizing various wireless communications devices including, but not limited to: a base station 105 as seen in FIG. 1, FIGS. 2A and 2B, FIG. 3, FIG. 27, and/or FIG. 29; a device 400 as seen in FIG. 4A; and/or a device 400-*a* as seen in FIG. 4B. In some embodiments, the base station 105 includes the controller 120. In some embodiments, method 3000 may be implemented utilizing various wireless communications devices including, but not limited to: a core network 130 and/or controller 120 as seen in FIG. 1, and/or a core network 130-*a* and/or a controller 120-*a* as seen in FIG. 27.

At block 3005, a target rate may be identified for a broadcast channel of a first bandwidth carrier system employing time dilation, where the target rate is higher than a scaled rate for the broadcast channel. The scaled rate may be a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. In other embodiments, both the first and the second bandwidth carrier systems are the same kind of bandwidth carrier system. In some embodiments, the target rate refers to an information data rate and the information data rate is substantially the same as the rate for the broadcast channel of the second bandwidth carrier system.

At block 3010, once the target rate is identified, broadcast information of the first bandwidth carrier system may be transmitted utilizing the target rate. The broadcast information may include one or more of signal strength information for access, service provider information, and neighboring cells information. The broadcast information may include information that is utilized for one or more of PLMN selection, cell selection/reselection, and handover from one cell to another.

Some embodiments of the method 3000 include adding an additional broadcast channel of the first bandwidth carrier system so that the broadcast information is transmitted through both broadcast channels of the first bandwidth carrier system using the target rate. Some embodiments include utilizing a location of each SIB and/or MIB transmitted in a radio frame cycle for the broadcast channel of the first bandwidth carrier system to facilitate transmitting the broadcast information using the target rate. The location of each SIB and/or MIB may be scheduled in the radio frame cycle.

Some embodiments of the method 3000 include mapping SIBs and/or MIBs to particular radio frames in the radio frame cycle, where the duration of the radio frames is based on the bandwidth scaling factor.

Some embodiments of the method 300 include utilizing a scaled spreading factor with respect to one or more primary broadcast channels of the first bandwidth carrier system to facilitate transmitting the broadcast information using the target rate, where the scaled spreading factor is scaled by the bandwidth scaling factor or by a fraction of the bandwidth scaling factor. In some embodiments, the primary broadcast channels are UMTS PCCPCHs.

Figure 30B:
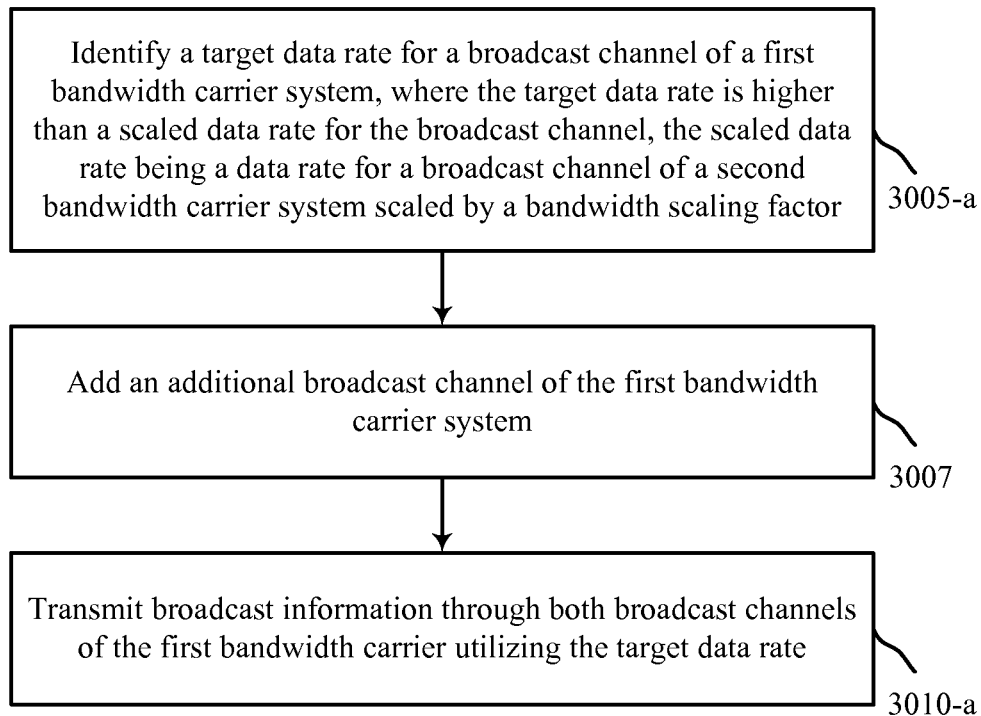
FIG. 30B shows a flow diagram of another method utilized by some base stations for providing higher data rate for broadcast channels in flexible bandwidth carrier systems in accordance with various embodiments.

Turning to FIG. 30B, a flow diagram is shown of a method 3000-*a* for providing higher data rate for broadcast channels in flexible bandwidth carrier systems in accordance with various embodiments. Method 3000-*a*, like method 3000 above, may be implemented utilizing various wireless communications devices including, but not limited to: a base station 105 as seen in FIG. 1, FIGS. 2A and 2B, FIG. 3, FIG. 27, and/or FIG. 29; a device 400 as seen in FIG. 4A; and/or a device 400-*a* as seen in FIG. 4B. In some embodiments, method 3000-*a* may be implemented utilizing various wireless communications devices including, but not limited to: a core network 130 and/or controller 120 as seen in FIG. 1, and/or a core network 130-*a* and/or a controller 120-*a* as seen in FIG. 27. Method 3000-*a* may include one or more aspects of method 3000 of FIG. 30A.

At block 3005-*a*, a target rate may be identified for a broadcast channel of a first bandwidth carrier system employing time dilation, where the target rate is higher than a scaled rate for the broadcast channel. The scaled rate may be a rate for a broadcast channel of a second bandwidth carrier system scaled by a bandwidth scaling factor. The bandwidth scaling factor may be an integer value or a rational value. The target rate may be a target data rate or a target repetition rate. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. In other embodiments, both the first and the second bandwidth carrier systems are the same kind of bandwidth carrier system. In some embodiments, the target rate refers to an information data rate and the information data rate is substantially the same as the rate for the broadcast channel of the second bandwidth carrier system.

At block 3007, an additional broadcast channel is added. The additional broadcast channel may be a primary broadcast channel such as a UMTS PCCPCH. At block 3010-*a*, once the target rate is identified and the additional channel broadcast added, broadcast information of the first bandwidth carrier system may be transmitted through both broadcast channels utilizing the target rate. In some embodiments, more than one broadcast channel is added and the broadcast information is transmitted through all the available broadcast channels.

Figure 30C:
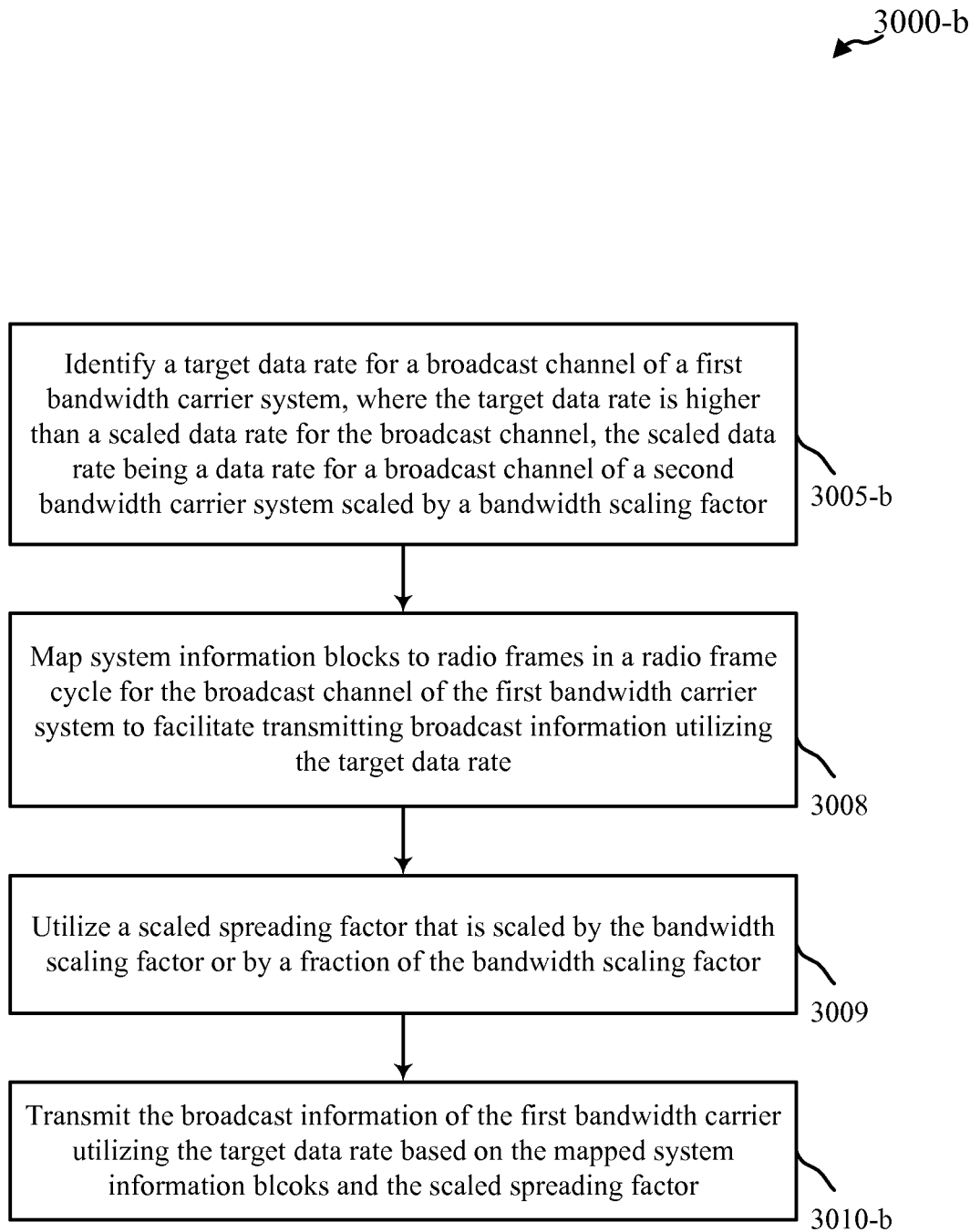
FIG. 30C shows a flow diagram of yet another method utilized by some base stations for providing higher data rate for broadcast channels in flexible bandwidth carrier systems in accordance with various embodiments.

Turning to FIG. 30C, a flow diagram is shown of a method 3000-*b* for providing higher data rate for broadcast channels in flexible bandwidth carrier systems in accordance with various embodiments. Method 3000-*b*, like methods 3000 and 3000-*a* above, may be implemented utilizing various wireless communications devices including, but not limited to: a base station 105 as seen in FIG. 1, FIGS. 2A and 2B, FIG. 3, FIG. 27, and/or FIG. 29; a device 400 as seen in FIG. 4A; and/or a device 400-*a* as seen in FIG. 4B. In some embodiments, method 3000-*b* may be implemented utilizing various wireless communications devices including, but not limited to: a core network 130 and/or controller 120 as seen in FIG. 1, and/or a core network 130-*a* and/or a controller 120-*a* as seen in FIG. 27. Method 3000-*b* may include one or more aspects of method 3000 of FIG. 30A.

At block 3005-*b*, a target rate may be identified for a broadcast channel of a first bandwidth carrier system employing time dilation, where the target rate is higher than a scaled rate for the broadcast channel. The scaled rate may be a rate for a broadcast channel of a second bandwidth carrier system scaled by a bandwidth scaling factor. The target rate may be a target data rate or a target repetition rate. The bandwidth scaling factor may be an integer value or a rational value. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. In other embodiments, both the first and the second bandwidth carrier systems are the same kind of bandwidth carrier system. In some embodiments, the target rate refers to an information data rate and the information data rate is substantially the same as the rate for the broadcast channel of the second bandwidth carrier system.

At block 3008, SIBs and/or MIBs may be mapped to radio frames in a radio frame cycle for the broadcast channel of the first bandwidth carrier system to facilitate transmitting broadcast information utilizing the target rate. At block 3009, a scaled spreading factor may be utilized, where the scaled spreading factor is scaled by the bandwidth scaling factor of the first bandwidth carrier system or by a fraction of the bandwidth scaling factor of the first bandwidth carrier system. At block 3010-*b*, broadcast information of the first bandwidth carrier system may be transmitted utilizing the target rate based on the mapped SIBs and/or MIBs and the scaled spreading factor.

Figure 31A:
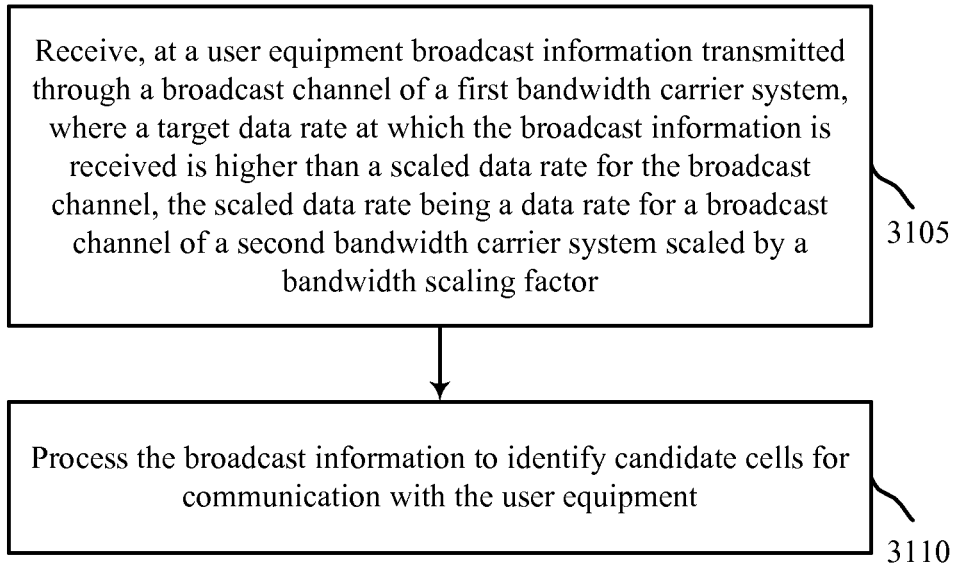
FIG. 31A shows a flow diagram of a method utilized by some user equipment for providing higher data rate for broadcast channels in flexible bandwidth carrier systems in accordance with various embodiments.

Turning to FIG. 31A, a flow diagram is shown of a method 3100 for providing higher data rate for broadcast channels in flexible bandwidth carrier systems in accordance with various embodiments. Method 3100 may be implemented utilizing various wireless communications devices including, but not limited to: a user equipment 115 as seen in FIG. 1, FIGS. 2A and 2B, FIG. 3, FIG. 27, FIG. 28, and/or FIG. 29; a device 400 as seen in FIG. 4A; and/or a device 400-*a* as seen in FIG. 4B.

At block 3105, a user equipment may receive broadcast information transmitted through a broadcast channel of a first bandwidth carrier system employing time dilation, wherein a target rate at which the broadcast information is received is higher than a scaled rate for the broadcast channel. The scaled rate is a rate for a broadcast channel of a second bandwidth carrier system scaled by a bandwidth scaling factor. The target rate may be a target data rate or a target repetition rate. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. In other embodiments, both the first and the second bandwidth carrier systems are the same kind of bandwidth carrier system.

At block 3110, the broadcast information may be processed to identify candidate cells for communication with the user equipment. The broadcast information may include one or more of signal strength information for access, service provider information, and neighboring cells information. The broadcast information may be utilized by the user equipment to perform one or more of PLMN selection, cell selection/reselection, and handover from one cell to another.

Some embodiments of the method 3100 may include receiving the broadcast information at the target rate through the broadcast channel of the first bandwidth carrier system and through an additional broadcast channel of the first bandwidth carrier system.

Some embodiment of the method 3100 may include receiving a radio frame cycle for the broadcast channel of the first bandwidth carrier system, where system and/or master information blocks are mapped to radio frames in the radio frame cycle based on the target rate and the duration of the radio frames is based on the bandwidth scaling factor.

Some embodiments of the method 3100 may include receiving the broadcast information at the target rate based on a scaled spreading factor with respect to one or more primary broadcast channels for the broadcast channel of the first bandwidth carrier system, where the scaled spreading factor is scaled by the bandwidth scaling factor or by a fraction of the bandwidth scaling factor. In some embodiment, the primary broadcast channels are UMTS PCCPCHs.

Figure 31B:
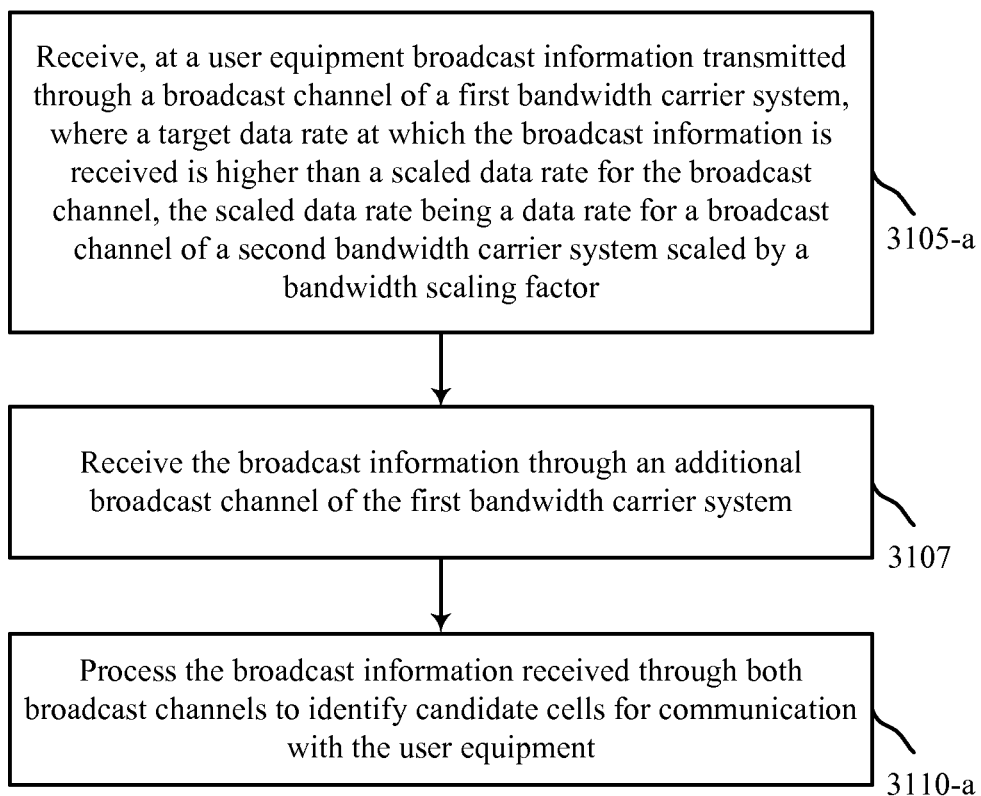
FIG. 31B shows a flow diagram of another method utilized by some user equipment for providing higher data rate for broadcast channels in flexible bandwidth carrier systems in accordance with various embodiments.

Turning to FIG. 31B, a flow diagram is shown of a method 3100-*a* for providing higher data rate for broadcast channels in flexible bandwidth carrier systems in accordance with various embodiments. Method 3100-*a*, like method 3100 above, may be implemented utilizing various wireless communications devices including, but not limited to: a user equipment 115 as seen in FIG. 1, FIGS. 2A and 2B, FIG. 3, FIG. 27, FIG. 28, and/or FIG. 29; a device 400 as seen in FIG. 4A; and/or a device 400-*a* as seen in FIG. 4B. Method 3100-*a* may include one or more aspects of method 3100 of FIG. 31A.

At block 3105-*a*, a user equipment may receive broadcast information transmitted through a broadcast channel of a first bandwidth carrier system employing time dilation, wherein a target rate at which the broadcast information is received is higher than a data rate for the broadcast channel. The data rate is a rate for a broadcast channel of a second bandwidth carrier system scaled by a bandwidth scaling factor. The target rate may be a target data rate or a target repetition rate. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. In other embodiments, both the first and the second bandwidth carrier systems are the same kind of bandwidth carrier system.

At block 3107, the broadcast information may be received at the target rate through the broadcast channel of the first bandwidth carrier system and through an additional the broadcast channel of the first bandwidth carrier system. In some embodiments, the broadcast information is received through more than two broadcast channels of the first bandwidth carrier system. The broadcast channels may be primary broadcast channels such as UMTS PCCPCHs.

At block 3110-*a*, the broadcast information received through both broadcast channels may be processed to identify candidate cells for communication with the user equipment. The broadcast information may include one or more of signal strength information for access, service provider information, and neighboring cells information. The broadcast information may be utilized by the user equipment to perform one or more of PLMN selection, cell selection/reselection, and handover from one cell to another.

Figure 31C:
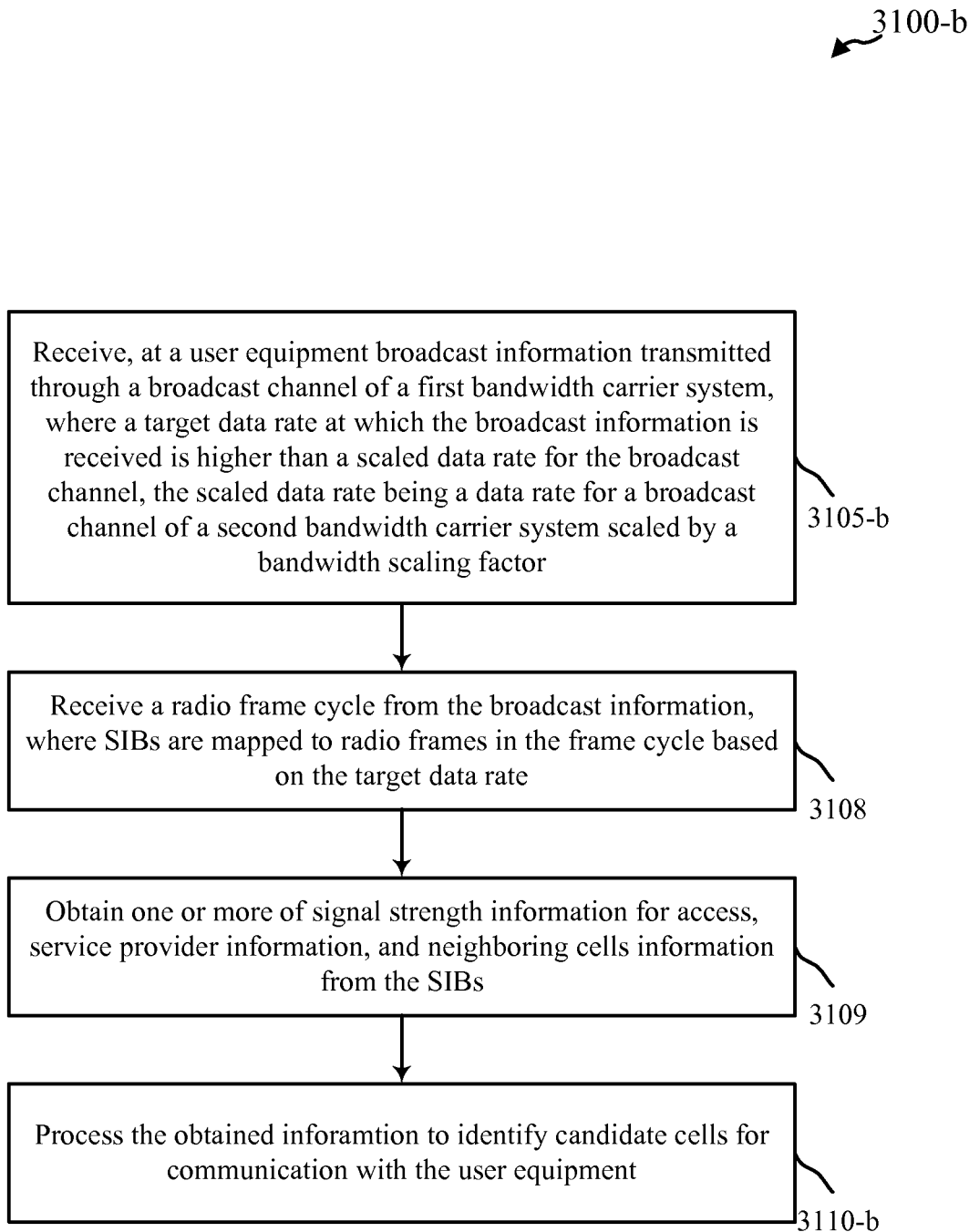
FIG. 31C shows a flow diagram of yet another method utilized by some user equipment for providing higher data rate for broadcast channels in flexible bandwidth carrier systems in accordance with various embodiments.

Turning to FIG. 31C, a flow diagram is shown of a method 3100-*b* for providing higher data rate for broadcast channels in flexible bandwidth carrier systems in accordance with various embodiments. Method 3100-*b*, like methods 3100 and 3100-*a* above, may be implemented utilizing various wireless communications devices including, but not limited to: a user equipment 115 as seen in FIG. 1, FIGS. 2A and 2B, FIG. 3, FIG. 27, FIG. 28, and/or FIG. 29; a device 400 as seen in FIG. 4A; and/or a device 400-*a* as seen in FIG. 4B. Method 3100-*b* may include one or more aspects of method 3000 of FIG. 31A.

At block 3105-*b*, a user equipment may receive broadcast information transmitted through a broadcast channel of a first bandwidth carrier system employing time dilation, wherein a target rate at which the broadcast information is received is higher than a scaled rate for the broadcast channel. The scaled rate is a rate for a broadcast channel of a second bandwidth carrier system scaled by a bandwidth scaling factor. The target rate may be a target rate or a target repetition rate. In some embodiments, the first bandwidth carrier system is a flexible bandwidth carrier system (e.g., with time dilation), the bandwidth scaling factor corresponds to the flexible bandwidth carrier system, and the second bandwidth carrier system is a normal bandwidth carrier system. In other embodiments, both the first and the second bandwidth carrier systems are the same kind of bandwidth carrier system.

At block 3108, a radio frame cycle for the broadcast channel of the first bandwidth carrier system is received, where system and/or master information blocks are mapped to radio frames in the radio frame cycle based on the target rate and the duration of the radio frames is based on the bandwidth scaling factor. At block 3109, from the information blocks, one or more of signal strength information for access, service provided information, and neighboring cells information may be obtained.

At block 3110-*b*, the information obtained from the system and/or master information blocks may be processed to identify candidate cells for communication with the user equipment. The information obtained may be utilized by the user equipment to perform one or more of PLMN selection, cell selection, and handover from one cell to another.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for data communication, comprising:
identifying a target rate for a broadcast channel of a flexible bandwidth carrier system that employs time dilation by dilating a transmission time interval (TTI) of the flexible bandwidth carrier with respect to a normal bandwidth carrier system, wherein the target rate is higher than a scaled rate for the broadcast channel, the scaled rate being a rate for a broadcast channel of the normal bandwidth carrier system scaled by a bandwidth scaling factor that corresponds to the flexible bandwidth carrier system; and
transmitting broadcast information of the flexible bandwidth carrier system using the target rate.

2. The method of claim 1, wherein the target rate is a target data rate.

3. The method of claim 1, wherein the target rate is a target repetition rate.

4. The method of claim 1, further comprising:
adding an additional broadcast channel of the flexible bandwidth carrier system; and
transmitting the broadcast information through both broadcast channels of the flexible bandwidth carrier system using the target rate.

5. The method of claim 1, wherein:
the target rate is an information data rate, and
the information data rate is substantially the same as the rate for the broadcast channel of the normal bandwidth carrier system.

6. The method of claim 1, further comprising:
utilizing a location of each information block transmitted in a radio frame cycle for the broadcast channel of the flexible bandwidth carrier system to facilitate transmitting the broadcast information using the target rate.

7. The method of claim 6, further comprising:
scheduling the location of each information block in the radio frame cycle.

8. The method of claim 6, wherein the information block is a system information block (SIB).

9. The method of claim 6, wherein the information block is a master information block (MIB).

10. The method of claim 1, further comprising:
mapping information blocks to radio frames in a radio frame cycle for the broadcast channel of the flexible bandwidth carrier system to facilitate transmitting the broadcast information using the target rate, wherein a duration of the radio frames is based on the bandwidth scaling factor.

11. The method of claim 1, further comprising:
utilizing a scaled spreading factor with respect to one or more Primary Common Control Physical Channels (PCCPCHs) for the broadcast channel of the flexible bandwidth carrier system to facilitate transmitting the broadcast information using the target rate, wherein the scaled spreading factor is scaled by the bandwidth scaling factor or by a fraction of the bandwidth scaling factor.

12. The method of claim 1, wherein the broadcast information includes one or more of signal strength information for access, service provider information, and neighboring cells information.

13. The method of claim 1, wherein the bandwidth scaling factor is an integer value or a rational value.

14. A method for data communication, comprising:
receiving, at a user equipment, broadcast information transmitted through a broadcast channel of a flexible bandwidth carrier system that employs time dilation by dilating a transmission time interval (TTI) of the flexible bandwidth carrier with respect to a normal bandwidth carrier system, wherein a target rate at which the broadcast information is received is higher than a scaled rate for the broadcast channel, the scaled rate being a rate for a broadcast channel of the normal bandwidth carrier system scaled by a bandwidth scaling factor that corresponds to the flexible bandwidth carrier system; and
processing the broadcast information to identify candidate cells for communication with the user equipment.

15. The method of claim 14, wherein the target rate is a target data rate.

16. The method of claim 14, wherein the target rate is a target repetition rate.

17. The method of claim 14, wherein receiving the broadcast information comprises:
receiving the broadcast information at the target rate through the broadcast channel of the flexible bandwidth carrier system and through an additional broadcast channel of the flexible bandwidth carrier system.

18. The method of claim 14, wherein receiving the broadcast information comprises:
receiving one or more of signal strength information for access, service provider information, and neighboring cells information.

19. The method of claim 14, wherein receiving the broadcast information comprises:
receiving a radio frame cycle for the broadcast channel of the flexible bandwidth carrier system, wherein information blocks are mapped to radio frames in the radio frame cycle based on the target rate and a duration of the radio frames is based on the bandwidth scaling factor.

20. The method of claim 19, wherein the information blocks comprise at least one system information block (SIB).

21. The method of claim 19, wherein the information blocks comprise at least one master information block (MIB).

22. The method of claim 14, wherein receiving the broadcast information comprises:
receiving the broadcast information at the target rate based on a scaled spreading factor with respect to one or more Primary Common Control Physical Channels (PCCPCHs) for the broadcast channel of the flexible bandwidth carrier system, wherein the scaled spreading factor is scaled by the bandwidth scaling factor or by a fraction of the bandwidth scaling factor.

23. A wireless communications system, comprising:
means for identifying a target rate for a broadcast channel of a flexible bandwidth carrier system that employs time dilation by dilating a transmission time interval (TTI) of the flexible bandwidth carrier with respect to a normal bandwidth carrier system, wherein the target rate is higher than a scaled rate for the broadcast channel, the scaled rate being a rate for a broadcast channel of the normal bandwidth carrier system scaled by a bandwidth scaling factor that corresponds to the flexible bandwidth carrier system; and
means for transmitting broadcast information of the flexible bandwidth carrier system using the target rate.

24. The wireless communications system of claim 23, wherein the target rate is a target data rate.

25. The wireless communications system of claim 23, wherein the target rate is a target repetition rate.

26. The wireless communications system of claim 23, further comprising:
means for adding an additional broadcast channel of the flexible bandwidth carrier system; and
means for transmitting the broadcast information through both broadcast channels of the flexible bandwidth carrier system using the target rate.

27. The wireless communications system of claim 23, wherein:
the target rate is an information data rate, and the information data rate is substantially the same as the rate for the broadcast channel of the normal bandwidth carrier system.

28. The wireless communications system of claim 23, further comprising:
means for utilizing a location of each information block transmitted in a radio frame cycle for the broadcast channel of the flexible bandwidth carrier system to facilitate transmitting the broadcast information using the target rate.

29. The wireless communications system of claim 28, further comprising:
means for scheduling the location of each information block in the radio frame cycle.

30. The wireless communications system of claim 29, wherein the information block is a system information block (SIB).

31. The wireless communications system of claim 29, wherein the information block is a master information block (MIB).

32. The wireless communications system of claim 23, further comprising:
means for mapping information blocks to radio frames in a radio frame cycle for the broadcast channel of the flexible bandwidth carrier system to facilitate transmitting the broadcast information using the target rate, wherein a duration of the radio frames is based on the bandwidth scaling factor.

33. The wireless communications system of claim 23, further comprising:

means for utilizing a scaled spreading factor with respect to one or more Primary Common Control Physical Channels (PCCPCHs) for the broadcast channel of the flexible bandwidth carrier system to facilitate transmitting the broadcast information using the target rate, wherein the scaled spreading factor is scaled by the bandwidth scaling factor or by a fraction of the bandwidth scaling factor.

34. The wireless communications system of claim 23, wherein the broadcast information includes one or more of signal strength information for access, service provider information, and neighboring cells information.

35. The wireless communications system of claim 23, wherein the bandwidth scaling factor is an integer value or a rational value.

36. A wireless communications system, comprising:
means for receiving, at a user equipment, broadcast information transmitted through a broadcast channel of a flexible bandwidth carrier system that employs time dilation by dilating a transmission time interval (TTI) of the flexible bandwidth carrier with respect to a normal bandwidth carrier system, wherein a target rate at which the broadcast information is received is higher than a scaled rate for the broadcast channel, the scaled rate being a rate for a broadcast channel of the normal bandwidth carrier system scaled by a bandwidth scaling factor that corresponds to the flexible bandwidth carrier system; and
means for processing the broadcast information to identify candidate cells for communication with the user equipment.

37. The wireless communications system of claim 36, wherein the target rate is a target data rate.

38. The wireless communications system of claim 36, wherein the target rate is a target repetition rate.

39. The wireless communications system of claim 36, wherein the means for receiving the broadcast information comprise:
means for receiving the broadcast information at the target rate through the broadcast channel of the flexible bandwidth carrier system and through an additional broadcast channel of the flexible bandwidth carrier system.

40. The wireless communications system of claim 36, wherein the means for receiving the broadcast information comprise:
means for receiving one or more of signal strength information for access, service provider information, and neighboring cells information.

41. The wireless communications system of claim 36, wherein the means for receiving the broadcast information comprise:
means for receiving a radio frame cycle for the broadcast channel of the flexible bandwidth carrier system, wherein information blocks are mapped to radio frames in the radio frame cycle based on the target rate and a duration of the radio frames is based on the bandwidth scaling factor.

42. The wireless communications system of claim 41, wherein the information blocks comprise at least one system information block (SIB).

43. The wireless communications system of claim 41, wherein the information blocks comprise at least one master information block (MIB).

44. The wireless communications system of claim 36, wherein the means for receiving the broadcast information comprise:
means for receiving the broadcast information at the target rate based on a scaled spreading factor with respect to one or more Primary Common Control Physical Channels (PCCPCHs) for the broadcast channel of the flexible bandwidth carrier system, wherein the scaled spreading factor is scaled by the bandwidth scaling factor or by a fraction of the bandwidth scaling factor.

45. A wireless communications device, comprising:
at least one processor communicatively coupled with a memory, the memory comprising executable code that, when executed by the at least one processor, causes the at least one processor to:
identify a target rate for a broadcast channel of a flexible bandwidth carrier system that employs time dilation by dilating a transmission time interval (TTI) of the flexible bandwidth carrier with respect to a normal bandwidth carrier system, wherein the target rate is higher than a scaled rate for the broadcast channel, the scaled rate being a rate for a broadcast channel of the normal bandwidth carrier system scaled by a bandwidth scaling factor that corresponds to the flexible bandwidth carrier system; and
transmit broadcast information of the flexible bandwidth carrier system using the target rate.

46. The wireless communications device of claim 45, wherein the target rate is a target data rate.

47. The wireless communications device of claim 45, wherein the target rate is a target repetition rate.

48. The wireless communications device of claim 45, wherein the executable code causes the at least one processor to:
add an additional broadcast channel of the flexible bandwidth carrier system; and
transmit the broadcast information through both broadcast channels of the flexible bandwidth carrier system using the target rate.

49. The wireless communications device of claim 45, wherein:
the target rate is an information data rate, and
the information data rate is substantially the same as the rate for the broadcast channel of the normal bandwidth carrier system.

50. The wireless communications device of claim 45, wherein the executable code causes the at least one processor to:
utilize a location of each information block transmitted in a radio frame cycle for the broadcast channel of the flexible bandwidth carrier system to facilitate transmitting the broadcast information using the target rate.

51. The wireless communications device of claim 50, wherein the executable code causes the at least one processor to:
schedule the location of each information block in the radio frame cycle.

52. The wireless communications device of claim 51, wherein the information block is a system information block (SIB).

53. The wireless communications device of claim 51, wherein the information block is a master information block (MIB).

54. The wireless communications device of claim 45, wherein the executable code causes the at least one processor to:
map information blocks to radio frames in a radio frame cycle for the broadcast channel of the flexible bandwidth carrier system to facilitate transmitting the broadcast information using the target rate, wherein a duration of the radio frames is based on the bandwidth scaling factor.

55. The wireless communications device of claim 45, wherein the executable code causes the at least one processor to:
utilize a scaled spreading factor with respect to one or more Primary Common Control Physical Channels (PCCPCHs) for the broadcast channel of the flexible bandwidth carrier system to facilitate transmitting the broadcast information using the target rate, wherein the scaled spreading factor is scaled by the bandwidth scaling factor or by a fraction of the bandwidth scaling factor.

56. The wireless communications device of claim 45, wherein the broadcast information includes one or more of signal strength information for access, service provider information, and neighboring cells information.

57. The wireless communications device of claim 45, wherein the bandwidth scaling factor is an integer value or a rational value.

58. A wireless communications device, comprising:
at least one processor communicatively coupled with a memory, the memory comprising executable code that, when executed by the at least one processor, causes the wireless communications device to:
receive broadcast information transmitted through a broadcast channel of a flexible bandwidth carrier system that employs time dilation by dilating a transmission time interval (TTI) of the flexible bandwidth carrier with respect to a normal bandwidth carrier system, wherein a target rate at which the broadcast information is received is higher than a scaled rate for the broadcast channel, the scaled rate being a rate for a broadcast channel of the normal bandwidth carrier system scaled by a bandwidth scaling factor that corresponds to the flexible bandwidth carrier system; and
process the broadcast information to identify candidate cells for communication with the user equipment.

59. The wireless communications device of claim 58, wherein the target rate is a target data rate.

60. The wireless communications device of claim 58, wherein the target rate is a target repetition rate.

61. The wireless communications device of claim 58, wherein the executable code causes the wireless communications device to:
receive the broadcast information at the target rate through the broadcast channel of the flexible bandwidth carrier system and through an additional broadcast channel of the flexible bandwidth carrier system.

62. The wireless communications device of claim 58, wherein the executable code causes the wireless communications device to:
receive, through the broadcast information, one or more of signal strength information for access, service provider information, and neighboring cells information.

63. The wireless communications device of claim 58, wherein the executable code causes the wireless communications device to:
receive, through the broadcast information, a radio frame cycle for the broadcast channel of the flexible bandwidth carrier system, wherein information blocks are mapped to radio frames in the radio frame cycle based on the target rate and a duration of the radio frames is based on the bandwidth scaling factor.

64. The wireless communications device of claim 63, wherein the information blocks comprise at least one system information block (SIB).

65. The wireless communications device of claim 63, wherein the information blocks comprise at least one master information block (MIB).

66. The wireless communications device of claim 58, wherein the executable code causes the wireless communications device to:
receive the broadcast information at the target rate based on a scaled spreading factor with respect to one or more Primary Common Control Physical Channels (PCCPCHs) for the broadcast channel of the flexible bandwidth carrier system, wherein the scaled spreading factor is scaled by the bandwidth scaling factor or by a fraction of the bandwidth scaling factor.

67. A computer program product for data communication, comprising:
a non-transitory computer-readable medium comprising:
code configured to identify a target rate for a broadcast channel of a flexible bandwidth carrier system that employs time dilation by dilating a transmission time interval (TTI) of the flexible bandwidth carrier with respect to a normal bandwidth carrier system, wherein the target rate is higher than a scaled rate for the broadcast channel, the scaled rate being a rate for a broadcast channel of the normal bandwidth carrier system scaled by a bandwidth scaling factor that corresponds to the flexible bandwidth carrier system; and
code configured to transmit broadcast information of the flexible bandwidth carrier system using the target rate.

68. The computer program product of claim 67, wherein the target rate is a target date rate.

69. The computer program product of claim 67, wherein the target rate is a target repetition rate.

70. The computer program product of claim 67, wherein the non-transitory computer-readable medium comprises:
code configured to add an additional broadcast channel of the flexible bandwidth carrier system; and
code configured to transmit the broadcast information through both broadcast channels of the flexible bandwidth carrier system using the target rate.

71. The computer program product of claim 67, wherein:
the target rate is an information data rate, and
the information data rate is substantially the same as the rate for the broadcast channel of the normal bandwidth carrier system.

72. The computer program product of claim 67, wherein the non-transitory computer-readable medium comprises:
code configured to utilize a location of each information block transmitted in a radio frame cycle for the broadcast channel of the flexible bandwidth carrier system to facilitate transmitting the broadcast information using the target rate.

73. The computer program product of claim 72, wherein the non-transitory computer-readable medium comprises:
code configured to schedule the location of each information block in the radio frame cycle.

74. The computer program product of claim 73, wherein the information block is a system information block (SIB).

75. The computer program product of claim 73, wherein the information block is a master information block (MIB).

76. The computer program product of claim 67, wherein the non-transitory computer-readable medium comprises:
code configured to map information blocks to radio frames in a radio frame cycle for the broadcast channel of the flexible bandwidth carrier system to facilitate transmitting the broadcast information using the target rate, wherein a duration of the radio frames is based on the bandwidth scaling factor.

77. The computer program product of claim 67, wherein the non-transitory computer-readable medium comprises:
code configured to utilize a scaled spreading factor with respect to one or more Primary Common Control Physical Channels (PCCPCHs) for the broadcast channel of the flexible bandwidth carrier system to facilitate transmitting the broadcast information using the target rate, wherein the scaled spreading factor is scaled by the bandwidth scaling factor or by a fraction of the bandwidth scaling factor.

78. The computer program product of claim 67, wherein the broadcast information includes one or more of signal strength information for access, service provider information, and neighboring cells information.

79. The computer program product of claim 67, wherein the bandwidth scaling factor is an integer value or a rational value.

80. A computer program product for data communication, comprising:
a non-transitory computer-readable medium comprising:
code configured to receive, at a user equipment, broadcast information transmitted through a broadcast channel of a flexible bandwidth carrier system that employs time dilation by dilating a transmission time interval (TTI) of the flexible bandwidth carrier with respect to a normal bandwidth carrier system, wherein a target rate at which the broadcast information is received is higher than a scaled rate for the broadcast channel, the scaled rate being a rate for a broadcast channel of the normal bandwidth carrier system scaled by a bandwidth scaling factor that corresponds to the flexible bandwidth carrier system; and
code configured to process the broadcast information to identify candidate cells for communication with the user equipment.

81. The computer program product of claim 80, wherein the target rate is a target data rate.

82. The computer program product of claim 80, wherein the target rate is a target repetition rate.

83. The computer program product of claim 80, wherein the non-transitory computer-readable medium comprises:
code configured to receive the broadcast information at the target rate through the broadcast channel of the flexible bandwidth carrier system and through an additional broadcast channel of the flexible bandwidth carrier system.

84. The computer program product of claim 80, wherein the non-transitory computer-readable medium comprises:
code configured to receive, through the broadcast information, one or more of signal strength information for access, service provider information, and neighboring cells information.

85. The computer program product of claim 80, wherein the non-transitory computer-readable medium comprises:
code configured to receive, through the broadcast information, a radio frame cycle for the broadcast channel of the flexible bandwidth carrier system, wherein information blocks are mapped to radio frames in the radio frame cycle based on the target rate and a duration of the radio frames is based on the bandwidth scaling factor.

86. The computer program product of claim 85, wherein the information blocks comprise at least one system information block (SIB).

87. The computer program product of claim 85, wherein the information blocks comprise at least one master information block (MIB).

88. The computer program product of claim 80, wherein the non-transitory computer-readable medium comprises:
code configured to receive the broadcast information at the target rate based on a scaled spreading factor with respect to one or more Primary Common Control Physical Channels (PCCPCHs) for the broadcast channel of the flexible bandwidth carrier system, wherein the scaled spreading factor is scaled by the bandwidth scaling factor or by a fraction of the bandwidth scaling factor.

* * * * *